(12) United States Patent  (10) Patent No.: US 8,358,468 B2
Hamasaki et al.  (45) Date of Patent: Jan. 22, 2013

(54) REFLECTING SHEET

(75) Inventors: Shinya Hamasaki, Tokyo (JP); Yuuichi Arito, Tokyo (JP); Kenji Takasa, Tokyo (JP); Tsumoru Kuwabara, Tokyo (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 431 days.

(21) Appl. No.: 12/663,171

(22) PCT Filed: Jun. 5, 2008

(86) PCT No.: PCT/JP2008/060340
§ 371 (c)(1),
(2), (4) Date: Jan. 22, 2010

(87) PCT Pub. No.: WO2008/149919
PCT Pub. Date: Dec. 11, 2008

(65) Prior Publication Data
US 2010/0165472 A1  Jul. 1, 2010

(30) Foreign Application Priority Data

| Jun. 5, 2007 | (JP) | 2007-149407 |
| Jun. 5, 2007 | (JP) | 2007-149408 |
| Jun. 29, 2007 | (JP) | 2007-173263 |
| Jun. 29, 2007 | (JP) | 2007-173264 |
| Oct. 22, 2007 | (JP) | 2007-274454 |
| Feb. 8, 2008 | (JP) | 2008-029527 |
| Feb. 8, 2008 | (JP) | 2008-029528 |
| Mar. 26, 2008 | (JP) | 2008-081876 |
| Mar. 26, 2008 | (JP) | 2008-081877 |

(51) Int. Cl.
*G02B 27/10* (2006.01)
*G02B 5/136* (2006.01)
*G02B 27/12* (2006.01)
*G02B 5/08* (2006.01)
(52) U.S. Cl. ......... 359/627; 359/546; 359/640; 359/884
(58) Field of Classification Search .................. 359/546, 359/618–629, 634, 636–640, 871, 883–884
See application file for complete search history.

(56) References Cited

U.S. PATENT DOCUMENTS

| 5,844,731 A | 12/1998 | Kabumoto et al. |
| 2005/0129649 A1* | 6/2005 | Kurosawa et al. ......... 424/70.12 |
| 2007/0171671 A1 | 7/2007 | Kurokawa et al. |
| 2007/0206299 A1 | 9/2007 | Akaishi |

FOREIGN PATENT DOCUMENTS

| JP | 6-89160 B2 | 11/1994 |
| JP | 2925745 B2 | 5/1999 |

(Continued)

*Primary Examiner* — Dawayne A Pinkney
(74) *Attorney, Agent, or Firm* — Birch, Stewart, Kolasch & Birch, LLP

(57) ABSTRACT

A reflecting sheet of the invention includes at least a surface layer portion and an inner layer portion, where the surface layer portion contains at least 0.3 g/m² to 20 g/m² of an inorganic powder and a polyolefin resin (C), the inner layer portion contains a polyolefin resin (A) and at least one kind of resins (B) incompatible with the polyolefin resin (A) at temperatures enabling stretching of the polyolefin resin(A), the surface layer portion meets $(n_1-n_2)/n_2 \geqq 0.20$ ($n_1$: refractive index of the inorganic powder, $n_2$: refractive index of the polyolefin resin (C)), and the inner layer portion has voids.

71 Claims, 11 Drawing Sheets

FOREIGN PATENT DOCUMENTS

| | | |
|---|---|---|
| JP | 2001-290009 A | 10/2001 |
| JP | 2001-338505 A | 12/2001 |
| JP | 2004-185972 A | 7/2004 |
| JP | 2004-252384 A | 9/2004 |
| JP | 2005-4195 A | 1/2005 |
| JP | 2005-241919 A | 9/2005 |
| JP | 2006-21373 A | 1/2006 |
| JP | 2007-72429 A | 3/2007 |
| JP | 2007-86098 A | 4/2007 |
| JP | 2007-114587 A | 5/2007 |
| JP | 2007-121814 A | 5/2007 |
| JP | 3928395 B2 | 6/2007 |
| WO | WO-2005/083475 A1 | 9/2005 |
| WO | WO-2005/096036 A1 | 10/2005 |

* cited by examiner

REFLECTING SHEET

TECHNICAL FIELD

The present invention relates to a reflecting sheet of a resin composition containing pores inside thereof, and more particularly, to a reflecting sheet suitable for a reflector used in a backlight of a liquid crystal display device and the like.

BACKGROUND ART

The liquid crystal does not emit by itself, and a light source is required to use the liquid crystal as a display device. A liquid crystal display device is comprised of a liquid crystal panel formed of a liquid crystal, orientation plates, electrodes, polarizers, etc. and an apparatus for applying light to the panel such as a lighting device generally referred to as a backlight and the like, and uses a reflecting sheet to reflect the light of the lamp toward the screen efficiently or the like.

The backlights of the liquid crystal display device are generally classified into two types broadly i.e. the edge light type backlight and direct type backlight.

The edge light type backlight is a backlight usually used in small-size liquid crystal display devices used in cellular telephones, personal digital assistants, etc. The edge light type backlight is often comprised of a light source such as an LED, cold-cathode tube, etc. a light guide plate made of a transparent resin such as acrylic resins, etc. formed in the shape of a wedge, and a reflecting sheet disposed on the side face of the light guide plate on the opposite side to the liquid crystal panel. In the edge light type backlight, the light from the light source such as an LED, cold-cathode tube, etc. disposed on the end face of the light guide plate is applied from the end face of the light guide plate. The light incident to the light guide plate comes out of the light guide plate from the side face of the light guide plate in the process of passing through the guide light plate. The light transmitted from the side face on the liquid crystal panel side of the light guide plate lights the liquid crystal panel, but the light transmitted from the side face on the opposite side to the liquid crystal panel side of the light guide plate is not able to light the liquid crystal panel. Therefore, a reflecting sheet for reflecting the light is installed on the side face on the opposite side to the liquid crystal panel of the light guide plate to reflect the light coming out of the side face of the light guide plate onto the liquid crystal panel side, and thus using the reflecting sheet is usually performed to irradiate the liquid crystal panel effectively with the light from the light source.

The direct type backlight is a backlight where a plurality of light source lamps such as cold-cathode tubes, etc. is installed on the opposite side to the display surface of the liquid crystal panel, and is used in large screen liquid crystal display devices used in large-size televisions and the like. In the large screen liquid crystal display device, since the edge light type backlight is limited in intensity of the light source lamp in increasing the brightness to the satisfied level, the direct type backlight using a plurality of light source lamps is usually used. The light of the light source lamp is emitted to the opposite side to the liquid crystal side, and therefore, in the direct type backlight, it is usually implemented to provide the reflecting sheet on the opposite side to the light crystal side of the light source lamp so as to irradiate the liquid crystal panel effectively with the light of the light source.

Recently, moving pictures have often been displayed in personal computers as well as televisions, and the liquid crystal display device is required to be brighter. Therefore, in the backlight used in the liquid crystal display device, reflecting sheets with a reflectance of 90% or more are used in many cases. To increase the brightness of the liquid crystal display device, the output of the light source such as the cold-cathode tube tends to increase, and there is a tendency that the temperature of the backlight being used is higher. Therefore, the resin used in the reflecting sheet is required to have heat resistance of 80° C. approximately close to the heat resistance temperature of the liquid crystal material. The reflecting sheet used in the backlight of the liquid crystal display device is thus required to be a reflecting sheet of a resin composition that is easy to form into a sheet and that is excellent also in heat resistance. Further, in the backlight used in the large screen liquid crystal display device such as the large-size television, the reflecting sheet with a large area is exposed to strong light over the long term. Therefore, the reflecting sheet is required to be low in discoloration and degradation due to the light of the light source, and is hard to cause deformation such as curling, etc. due to increases in temperature and moisture over long periods.

In sheets of resins containing pores and/or voids inside thereof, when the light is applied, it has been known well that the sheets look white by the light being reflected, or show pearl-like shines. The reason why the resin containing pores and/or voids inside thereof reflects the light well is considered as described below. The refractive index of the resin ranges approximately from 1.4 to 1.6, the refractive index of air is about 1, and the reflectance caused by the difference in the refractive index between the resin and air is only about 4%. However, in the sheet of a resin containing many pores and/or voids inside thereof, since many interfaces exist between the resin and air inside the sheet, the light applied to the sheet is reflected many time inside the sheet. As a result, in the sheet of a resin containing many pores and/or voids inside thereof, the applied light is reflected in the most part inside the sheet, and as a result, it is considered that the reflectance increases as the entire sheet.

Further, since many pores and voids contained inside the resin are usually different in shape and size from one another, the light reflected in the interface of the pores and voids is seldom reflected collectively in one direction, and the directions of reflected light vary with the pores and voids. Therefore, the reflection of light applied to the resin sheet containing many pores and voids inside thereof tends to be diffuse reflection where the incident light beams are reflected in every directions. As a sheet of a resin composition containing pores and voids inside thereof, there have been known (a) sheets obtained by stretching the resin with an inorganic powder added thereto, cleaving the interface between the resin and the inorganic powder, and forming pores inside the resin, and (b) sheets obtained by dissolving pressurized inert gas in the resin, reducing the pressure to cause foaming, and forming voids inside the resin.

As the resin sheet of (a), for example, Patent Document 1 discloses a white sheet of polyethylene terephthalate with a void rate of from 7% to 30% formed by melting, extruding and two-way stretching a polyethylene terephthalate resin containing 5 percent to 30 percent by weight of fine-particle calcium carbonate. Such a reflecting sheet contains the inorganic powder such as calcium carbonate and barium sulfate with a high ratio of several tens of percent by volume to the entire reflecting sheet. Therefore, although the void rate of from 7% to 30%, the reflecting sheet has a high density of 0.8 g/cm$^3$ or more, and is required to be light weight. Further, Patent Document 2 discloses a white polyolefin film containing calcium carbonate in the inner layer portion and surface layer portion. In such a reflecting sheet, since a large amount of inorganic powder is used such as calcium carbonate, the density is 0.7 g/cm³ or more and thus high, the refractive index of calcium carbonate in the surface layer portion is low, and excellent reflective performance is not obtained.

As the resin sheet of (b), for example, Patent Document 3 discloses an optical reflecting sheet containing fine voids inside thereof formed by dissolving an inert gas such as a carbon dioxide gas in thermoplastic polyester under pressurized atmosphere, and then, heating at normal pressure for foaming. This reflecting sheet is made of resin without containing an inorganic powder, but the manufacturing processes of the sheet tend to be large-scale complicated processes, because it is necessary to keep the resin sheet in an atmosphere of pressurized inert gas for a predetermined time so as to dissolve the inert gas in the resin sheet, and processes of heating and foaming are required after removing the resin sheet with the inert gas dissolved therein and restoring to the normal pressure. Further, in Patent Document 3, voids are formed by fine foaming of polyester. The voids are fine foam but have void diameters ranging from 5 μm to 10 μm at minimum. It is required to contain many fine voids to obtain high reflective performance. Therefore, the sheet thickness ranges from 0.8 mm to 1.2 mm and is thus thick. Thinner sheets with excellent reflective performance are desired for crystal liquid display.

In contrast to diffusion reflection, such reflection is referred to as regular reflection where the angle of light incident on the reflecting surface and the reflection angle are symmetry, and the reflecting surface has a mirror-shaped surface. As a resin sheet causing regular reflection, there is known (c) polyester resin sheets obtained by coating the sheet surface with silver or the like with a high reflectance by a method of deposition, etc.

In the reflecting sheet of (c), metal particles such as silver, etc. to coat the surface of the resin sheet are tend to coagulate by heat of the light source lamp being used or the like, and to be oxidized by trace acidic gas component contained in air, and it is known that the sheets cause discoloration of metal such as silver, etc. and deterioration of the reflectance. Therefore, it is carried out that the particles of metal such as silver, etc. applied onto the sheet surface are coated with a resin to prevent contact with air, the processes are required to apply light coatings of metal and resin to the surface of the resin sheet several times, and the manufacturing processes of the sheet tend to be large-scale complicated processes. The reflecting sheet of this example is a mirror-shaped sheet for causing regular reflection, and in the direct type backlight used in the large screen liquid crystal display device of the large-size television, it is known that light beams of a plurality of arranged light source lamps interfere with one another and are apt to cause uneven lightness in the liquid crystal screen. Therefore, the direct type backlight usually uses the reflecting sheet for causing diffusion reflection.

Although the reflecting sheets of (a) and (b) as described above are the sheets for causing diffusion reflection, (a) has the problem of the heavy weight due to the use of a large amount of inorganic particles in the sheet as described above, and (b) has the problem that the sheet thickness is 0.8 mm to 1.2 mm and thus high because the void diameters are large. Desired are reflecting sheets of diffusion reflection with such problems solved.

Further, Patent Document 4 discloses a reflecting sheet made of a resin composition containing 50 or more percent by volume to less than 80 percent by volume of a polypropylene resin, and 20 or more percent by volume to less than 50 percent by volume of a resin that causes phase separation from the polypropylene resin at temperatures enabling stretching of the polypropylene resin. This Document provides the reflecting sheet which has a high reflectance of 90% or more without containing inorganic particles using a normal simplified resin stretching manufacturing apparatus. However, in the manufacturing method for monolayer extrusion film forming or the like, there are cases that anisotropy occurs in the total reflection index by light incident direction, and there is the case of requiring control of the reflecting sheet direction in handling.

Meanwhile, the conventional reflecting sheet is generally used in the shape of a flat plate, but for the purpose of increasing reflection efficiency, often undergoes mechanical folding processing or cut-folding processing or is processed in two-dimensional curved form to use. Moreover, for the purpose of further enhancing reflective performance, it is also proposed to process the reflecting sheet in optimal form in accordance with the usage mode of the backlight. For example, in the LED direct type backlight scheme, to enhance reflection efficiency, proposed is a reflecting sheet processed to be folded in concave form immediately below LEDs in accordance with the arrangement of a high number of LEDs arranged in the shape of a lattice pattern. When the reflection efficiency is improved and the lamp images of LEDs, etc. are apt to disappear by devising the shape and controlling the reflection direction, it is possible to shorten the distance between the lamp and diffusion plate, and it is also possible to form thinner backlight units. Patent Document 6 discloses a lighting device provided with a light emitting element having a concave-shaped reflecting layer. Further, Patent Document 7 discloses a concave-shaped reflecting sheet where a plurality of reflecting surface portions is disposed adjacent to one another, and surface sides between adjacent reflecting surface portions are continuous in the ridge line. In the LED backlight scheme, the diffusion plate is usually disposed on the three-dimensional processed concave-shaped reflecting sheet. When the diffusion plate is directly disposed on the reflecting sheet, in the reflecting sheets proposed in Patent Documents 6 and 7, the ridge line portion where the reflecting surfaces on the upper surface of the reflecting sheet are adjacent to one another is directly in contact with the diffusion plate, produces shade, and becomes a cause of fluctuations in brightness or the occurrence of lamp image. Therefore, measures are required to provide a suitable clearance between the reflecting sheet and diffusion plate by providing the diffusion plate with an appropriate support member.

Meanwhile, the edge light type backlight is used in small-size liquid crystal display devices such as mobile type devices, and is particularly required to thin the display device itself, and the three-dimensional processed shape in the entire sheet increases the thickness of the device and is not desired. Accordingly, a method is proposed of providing the sheet surface with a fine three-dimensional structure surface, and thereby controlling the reflection direction. For example, Patent Document 5 proposes an optical sheet where the light output in the slanting direction from the back of a light guide plate is reflected off the optical sheet with a metal thin film formed on the surface thereof having a concavo-convex pattern, and is applied again perpendicularly to the back of the light guide plate. In order to perform fine shaping to control the reflection direction, for example, there is a method of using a UV curable resin and curing the resin on the substrate surface by UV to provide the shape. However, such a method is complicated and expensive, and further has the problem of adhesion to the substrate surface. As an easy and inexpensive method, there is a press compression forming using a shaping die or a thermal compression forming for performing roll compression forming using a roll with a shaping die. However, the conventional reflecting sheet obtained by performing two-way stretching on a sheet made of inorganic material and polypropylene has large thermal shrinkage at thermoforming temperatures and is hard to obtain formed components in desired form. Further, there are problems that the reflective performance degrades by the sheet being thinner due to compression forming, or by formed pores and/or voids being crushed due to stretching, and the like. Furthermore, the reflecting sheets obtained by biaxial stretching of polyethylene terephthalate or fine foaming of the resin have problems that the resin deforms significantly due to properties of the polyethylene terephthalate resin when the temperature is increased to the softening temperature, and thus are hard to undergo surface fine processing by compression forming.

Patent Document 1: Japanese Laid-Open Patent Publication No. H06-89160
Patent Document 2: Japanese Laid-Open Patent Publication No. 2005-004195
Patent Document 3: Japanese Patent Gazette No. 2925745
Patent Document 4: International Publication No. 2005/096036 Pamphlet
Patent Document 5: Japanese Laid-Open Patent Publication No. 2001-338505
Patent Document 6: Japanese Laid-Open Patent Publication No. 2004-185972
Patent Document 7: Japanese Patent Gazette No. 3928395

DISCLOSURE OF INVENTION

The present invention was made in view of such respects, and it is an object of the invention to provide a reflecting sheet having low anisotropy of the total reflection index in the light incident direction, high reflectance and lighter weight. Further, it is another object to provide a reflecting sheet low in discoloration due to light of a light source.

A reflecting sheet of the invention is characterized by including at least a surface layer portion and an inner layer portion, where the surface layer portion contains at least 0.3 g/m$^2$ to 20 g/m$^2$ of an inorganic powder and a polyolefin resin (C), the inner layer portion contains a polyolefin resin (A) and at least one kind of resins (B) incompatible with the polyolefin resin (A) at temperatures enabling stretching of the polyolefin resin(A), the surface layer portion meets $(n_1-n_2)/n_2 \geqq 0.20$ ($n_1$: refractive index of the inorganic powder, $n_2$: refractive index of the polyolefin resin (C)), and the inner layer portion has voids.

The reflecting sheet of the invention is low in anisotropy of the total reflection index in the light incident direction, while having excellent reflection performance and reduced weight, and thus has features. Further, by providing the surface of the reflecting sheet with a fine three-dimensional shape, it is possible to control the reflection direction and provide more effective reflection efficiency. Further, the reflecting sheet has a shape of convex portions, and is thereby able to provide more effective reflection efficiency. Furthermore, when the reflecting sheet is in used in display devices, the reflecting sheet exhibits high reflective performance, and enables actualization of the display devices for suppressing fluctuations in brightness by shade of the ridge line area or the occurrence of lamp image, and showing uniform high brightness.

BRIEF DESCRIPTION OF DRAWINGS

FIG. 1(a) is a view showing before forming and FIG. 1(b) is a cross-sectional view of a sheet after forming;

BEST MODE FOR CARRYING OUT THE INVENTION

Figure 1:
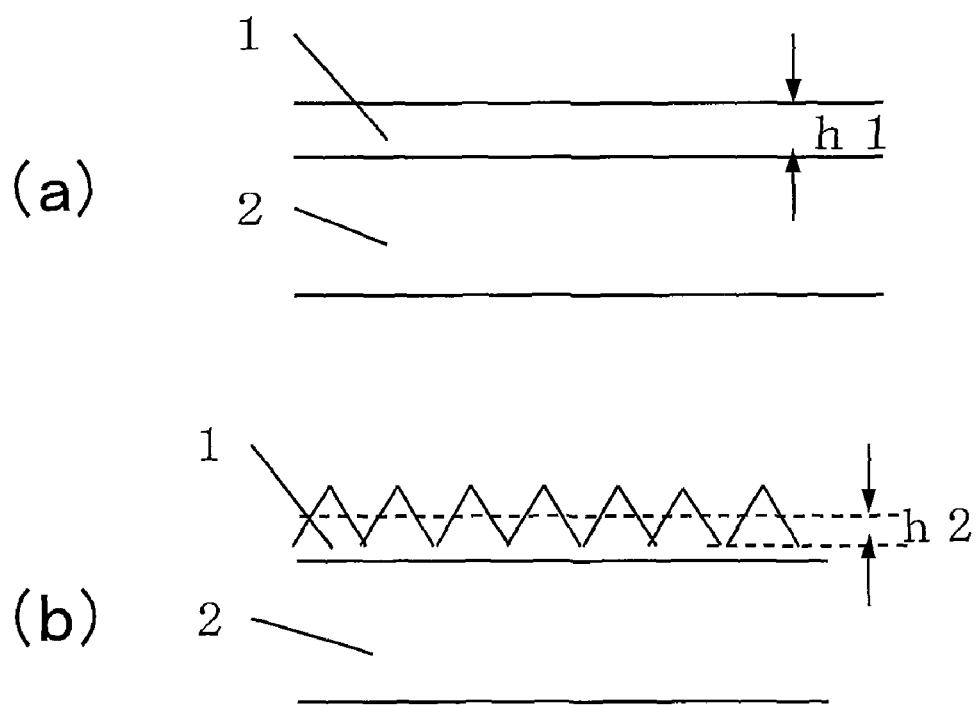
FIG. 1 contains views showing the relationship in thickness of a surface layer portion between before and after forming of the invention.

Embodiments of the invention will specifically be described below with reference to accompanying drawings. In addition, there are cases of distinguishing a film with a thickness of 200 μm or less from a sheet with a thickness exceeding 200 μm and thus using different terms, but in this description, the aforementioned film and sheet are both referred to as sheets.

(Resin Composition Constituting a Reflecting Sheet Inner Layer Portion)

The resin composition constituting an inner layer portion of a reflecting sheet of the invention contains a polyolefin resin (A), and at least one kind of resins (B) incompatible with the polyolefin resin (A) at temperatures enabling stretching of the polyolefin resin (A). The polyolefin resin is polymers obtained by polymerizing olefins such as ethylene, propylene, methyl pentene, etc. Preferable examples include polyethylene, polypropylene and polymethyl pentene. Among the examples, polypropylene resins are particularly preferable from the viewpoints of heat resistance and formability.

The polypropylene resins are polypropylene resins formed of polymers of propylene monomers alone or copolymers of propylene monomers and monomers of ethylene or the like copolymerizable with the propylene monomer. Preferable polypropylene resins are polypropylene resins with a melt flow rate of 0.1 g/min. to 10 g/min. where the melt flow rate is measured at a temperature of 230° C. with a load of 21.2 N by the method of JISK7210. The melt flow rate is preferably 0.1 g/min. or more from the viewpoints of load on an extruder in melting and forming the polypropylene resin and discoloration of the resin composition by heat, and preferably 10 g/min. or less from the viewpoints of viscosity of the resin and formability.

As the resin (B) (hereinafter, also referred to as "resin (B)" simply) incompatible with the polyolefin resin (A) at temperatures enabling stretching of the polyolefin resin (A), used are polyethylene resins, polystyrene resins, polymethyl methacrylate resins, polycarbonate resins, polymethyl pentene resins, polycyclo-olefin resins such as polynorbornene resins, polyester resins, polyamide resins and the like. Preferable among the resins are resins with the modulus of elasticity higher that of the polyolefin resin at temperatures enabling stretching of the polyolefin resin, and examples of such resins include polycarbonate resins, polymethyl pentene resins, polycyclo-olefin resins such as polynorbornene resins, polyester resins and polyamide resins. It is preferable to melt and mix at least one kind of resin from among the resins with the olefin resin, and it is most preferable to use polycarbonate resins.

In the invention, it is preferable that the polyolefin resin (A) is in an amount of from 30 percent to 80 percent by weight relative to the total inner layer portion resin composition. Further, from the viewpoints of tension and stretchability in stretching the resin, the ratio of the polyolefin resin (A) is preferably 30 percent by weight or more relative to the total inner layer portion resin composition. Meanwhile, to obtain reflecting sheets with high average total reflection index of 95% or more by stretching the sheet of extruded inner layer portion resin composition and forming voids inside the sheet, the ratio of the polyolefin resin (A) is preferably 80 percent by weight or less relative to the total inner layer portion resin composition, and more preferably 70 percent by weight or less. The average total reflection index referred to herein is the average value in both directions when the total reflection index is measured for the light with a wavelength of 550 nm incident in each of the MD direction and the TD direction. From the viewpoint of decreasing the stretching tension, the content of the resin (B) is preferably 70 percent by weight or less relative to the total inner layer portion resin composition. From the viewpoint of increasing the number of voids and void volume of the sheets to obtain high average total reflection index of 95% or more, the resin (B) is preferably in an amount of from 20 percent to 70 percent by weight relative to the total inner layer portion resin composition, and more preferably in an amount of from 30 percent to 60 percent by weight. When the inner layer portion resin composition is formulated, the conversion between percent by weight and percent by volume can be calculated from the density of basic properties of each resin. For example, the density of the polypropylene resin ranges from 0.89 g/cm$^3$ to 0.91 g/cm$^3$, the density of the polycarbonate resin is 1.2 g/cm$^3$, and the conversion can be calculated from the values with ease when necessary.

The reflecting sheet inner layer portion of the invention is obtained by melting and mixing the polyolefin resin (A) in an amount of from 40 percent to 80 percent by weight and the resin (B) in an amount of 20 percent to 60 percent by weight, extruding in the shape of a sheet an inner layer portion resin composition with the so-called sea-island structure where islands of the resin (B) are dispersed in the sea of the polyolefin resin, and then, performing stretching, and heat relaxation treatment as required. Alternately, the inner layer portion is co-extruded in the shape of a sheet together with the surface layer portion using a multi-manifold die or feed block die, subjected to stretching and heat relaxation treatment as required, and is thus obtained.

When pellets of the polyolefin resin (A) and resin (B) are melted and extruded using an extruder such as a two-way extruder or the like, the resin (B) harder than the polyolefin resin (A) is finely split into a dispersed phase with a size of the order of several micrometers from resin pellets with the normal size of the order of several millimeters by shearing strength due to rotation of the screw, when being passed through clearances between the cylinder and screw of the extruder and clearances between screws inside the extruder. By setting the shape of the screw of the extruder, cylinder temperature, the number of revolutions of the screw, etc. as appropriate, it is possible to adjust the average value and distributions of the size of split resin (B).

Preferable among the resins (B) are resins with the modulus of elasticity higher that of the polyolefin resin (A) at temperatures enabling stretching of the polyolefin resin (A). The reason is considered as described below. The present invention is to stretch a sheet of a resin composition at temperatures enabling stretching of the polyolefin resin (A), cleave the interface between the resin (B) phase and the polyolefin resin (A) phase in the inner layer portion resin composition, and therefore form voids inside the sheet. When the modulus of elasticity of the resin (B) is higher than the modulus of elasticity of the polyolefin resin (A) at temperatures for stretching the sheet, since the deformation amount of the resin (B) phase due to stretching strength is smaller than the deformation amount of the polyolefin resin (A) phase, it is considered that the interface between resin (B) phase and the polyolefin resin (A) phase tends to cleave.

Further, the fact that the modulus of elasticity of the resin (B) is higher the modulus of elasticity of the polyolefin resin at temperatures enabling stretching of the polyolefin resin is considered contributing significantly to shaping workability of the reflecting sheet. Ordinary biaxial oriented polypropylene causes large heat shrinkage and becomes deformed when the temperature is increased to near the stretching temperature, and by the presence of the resin (B) with the modulus of elasticity higher that of the polyolefin resin around the stretching temperatures, it is considered that heat distortion is suppressed and that heat formability is improved. Moreover, the presence of the resin (B) also improves heat resistance when the sheet is used as a reflecting material, and further, contributes to increases in strength of the reflecting sheet.

Herein, the modulus of elasticity of each resin is confirmed by the tensile property test as described in JISK71612. For example, in the case of the polypropylene resin that is most preferable among the polyolefin resins (A), preferable are resins with the modulus of elasticity in the tensile property test at 150° C. being higher than that of polypropylene. The inner layer portion of the invention is not required to be stretched at this temperature, and it is possible to select the stretching temperature corresponding to the formulation of the resin (A) and resin (B).

Polycarbonate resins that are preferable examples of the resin (B) of the invention can be used from among aromatic polycarbonates, linear polycarbonates, and branched-chain polycarbonates alone or in combination thereof. Preferable polycarbonate resins are polycarbonate resins with a melt flow rate of 0.1 g/10 min. to 50 g/10 min. where the melt flow rate is measured at a temperature of 300° C. with a load of 11.8 N by the method of JISK7210. The melt flow rate of the polycarbonate resin is preferably 0.1 g/10 min. or more from the viewpoint of obtaining uniform mixing with the polyolefin resin, and preferably 50 g/10 min. or less from the viewpoint of promoting formation of voids in stretching.

Examples of the resin (B) except polycarbonate resins are polyamide resins. Polyamide resins can be used from among polyamide 66, polyamide 6, polyamide 610, polyamide 612, polyamide 11, polyamide 12, aromatic polyamide and the like alone or in combination thereof. Preferable among the polyamide resins are polyamide resins with a melting point of 300° C. or less from the viewpoint of dispersion property when extruded by the extruder.

In the invention, it is possible to use polystyrene resins in addition to the polyolefin resin (A) and resin (B). Preferable polystyrene resins are polystyrene resins with a melt flow rate of 0.1 g/10 min. to 20 g/10 min. where the melt flow rate is measured at a temperature of 200° C. with a load of 49 N by the method of JISK7210. Addition of 5 percent by weight or less of the polystyrene resin relative to the entire inner layer portion resin composition produces effects of more simplifying the processes and facilities for manufacturing the reflecting sheet, such as reducing the rotation torque of the extruder to melt and blend the entire inner layer portion resin composition without significantly impairing transparency of the entire inner layer portion resin composition, decreasing the tension in stretching the sheet to generate voids inside the sheet and the like. The ratio of the polystyrene resin relative to the entire inner layer portion resin composition is preferably 5 percent by weight or less, from the viewpoint of sufficiently obtaining the effects of reducing the rotation torque of the extruder and decreasing the orientation tension of the sheet, and from the viewpoint of obtaining optically uniform sheets.

Used in the invention is the inner layer portion resin composition of a mixture of the polyolefin resin (A), resin (B) and when necessary, polystyrene resin, and to the inner layer portion resin composition may be added a cleavage nucleator, UV absorbing agent, light stabilizer, heat stabilizer, nucleator, antistatic agent, and other inorganic powder as required. Examples used as the inorganic powder are calcium carbonate, magnesium carbonate, zinc carbonate, titanium oxide, zinc oxide, barium sulfate, cerium oxide, tungstic titanium trioxide, strontium titanate, zinc sulfate, basic lead carbonate, mica titanium, antimony oxide, magnesium oxide, calcium phosphate, silica, alumina, mica, talc, and kaolin.

(Composition Constituting a Reflecting Sheet Surface Layer Portion)

The composition constituting a reflecting sheet surface layer portion contains at least 0.3 g/m² to 20 g/m² of an inorganic powder and a polyolefin resin (C).

The polyolefin resin (C) may be the same as the polyolefin resin (A) of the inner layer portion, or a different kind of polyolefin resin may be used. Preferable kinds in the polyolefin resin (C) are the same resin as the polyolefin resin (A), and propylene resins are particularly preferable. Further, in the surface layer portion, it is preferable to contain the polyolefin resin (C) in an amount of 80 percent by volume or more.

(Inorganic Powder Used in the Reflecting Sheet Surface Layer Portion)

Preferable as the inorganic powder used in the reflecting sheet surface layer portion are powders which are capable of forming voids while acting as nucleuses by themselves to scatter the light, have a difference in the refractive index from the resin, and meet $(n_1-n_2)/n_2 \geq 0.20$ ($n_1$: refractive index of the inorganic powder, $n_2$: refractive index of the polyolefin resin (C)).

As an example of the polyolefin resin (C), the refractive index of polypropylene resin is 1.49, the refractive index of polyethylene resin is 1.51, and others can be known from basic properties of each resin from handbooks. As the refractive index of the inorganic powder, the index of titanium oxide is 2.7, the index of zinc oxide is 1.9, and others can be known from basic properties of each inorganic compound from handbooks. As the inorganic powder meeting the above-mentioned relationship, used preferably are titanium oxide, zinc oxide and the like. Further, to suppress deterioration of the polyolefin resins (A) and (C), it is preferable that zinc oxide and titanium oxide are contained, also from the viewpoint of having UV absorbing ability. These inorganic powders may be used alone or in combination of two or more. Further, as long as the inorganic powder having the above-mentioned relationship in refractive index is contained, other inorganic powder may be combined to use. In addition, the refractive index of the resin can be measured using a prism refractometer.

The inorganic powder in the invention may undergo surface modification as necessary. Particularly, zinc oxide and titanium oxide are generally beforehand given surface modification using alumina, silica, etc. and may be used, or a surface modifying agent such as stearic acid, zinc stearate may be further added. Further, as well as the inorganic powders, added as required are a UV absorbing agent, light stabilizer, heat stabilizer, nucleator, antistatic agent and the like.

Preferable as a particle size of the inorganic powder in the invention is in the range of 10 nm to 5000 nm in the average particle size. When the average particle size is 10 nm or more, it is possible to obtain improvements in reflectance and effects of improving anisotropy of the reflectance due to the incident direction. When the average particle size is 5000 nm or less, it is possible to ensure adequate formability and shape maintenance. The average particle size ranges preferably from 10 nm to 3000 nm, and more preferably from 15 nm to 2000 nm.

The content of the inorganic powder in the invention is characterized by being contained in the range of 0.05 g/m² to 20 g/m² in the surface layer portion. When the content is 0.05 g/m² or more, it is possible to obtain improvements in reflectance and effects of improving anisotropy of the reflectance due to the incident direction. When the content is 20 g/m² or less, it is possible to obtain a reflecting sheet with adequately reduced weight. The preferable range is from 0.3 g/m² to 20 g/m², and particularly preferably from 0.4 g/m² to 10 g/m².

As the concentration of the inorganic powder in the surface layer portion in the invention, preferable is the range of 0.1 percent to 70 percent by weight relative to the resin composition (b). When the concentration is 0.1 percent by weight or more, it is possible to add an adequate amount of inorganic powder without thickening the surface layer portion. When the concentration is 70 percent by weight or less, it is possible to ensure sufficient formability and shape maintenance. Further, the concentration ranges more preferably from 0.3 percent to 70 percent by weight, particularly preferably from 2 percent to 70 percent by weight, and most preferably from 2 percent to 60 percent by weight.

(Structure of the Reflecting Sheet)

The reflecting sheet of the invention is required to be formed of at least the surface layer portion and inner layer portion, and thus two or more layers, and for example, may have a three-layer structure of surface layer portion/inner layer portion/surface layer portion, or may further have another layer such as a light resistant layer on the surface of the surface layer portion. In addition, when the sheet is comprised of two layers i.e. the surface layer portion and inner layer portion, a layer used on the light source side of the reflecting sheet is defined as the surface layer portion, and a layer used on the opposite side to the light source is defined as the inner layer portion. When the sheet is comprised of three or more layers, the sheet is only required to have the surface layer portion and inner layer portion as described in the invention within the three layers. For example, when the light resistant layer is provided on the topmost layer, the structure may be topmost layer portion (heat resistant layer)/surface layer portion/inner layer portion.

In the reflecting sheet of the invention, reflection of light occurs in the interface between air and the resin using the difference in refractive index between air and the resin. Since the refractive index of the resin is approximately 1.4 to 1.6, and the refractive index of air is about 1, the reflectance of the light caused by the difference in refractive index between air and the resin is about 4% at the maximum in a single reflection. However, by preparing the structure containing many pores and voids in the inner layer portion, it is possible to cause many interfaces to exist. By this means, reflection in the sheet inner layer portion is repeated many times, and it is possible to obtain high reflectance. As one of parameters to evaluate the structure containing pores and voids, there are weighing and density.

The inner layer portion of the reflecting sheet of the invention has the structure containing pores inside thereof, and exhibits reflective performance by the pore structure. As the pore structure of the inner layer portion, the density of the inner layer portion is preferably in the range of 0.1 g/cm$^3$ to 0.7 g/cm$^3$. When the density is 0.1 g/cm$^3$ or more, it is possible to retain the sufficient strength. When the density is 0.7 g/cm$^3$ or less, it is possible to form a structure with many fine pores and obtain high reflectance.

The thickness of the inner layer portion preferably ranges from 10 μm to 900 μm. When the thickness is 10 μm or more, it is possible to develop excellent reflective performance. When thickness is 900 μm or less, it is possible to ensure satisfactory lightweight. Further, the thickness ranges more preferably from 15 μm to 700 μm, and particularly preferably from 20 μm to 600 μm.

The surface layer portion of the reflecting sheet of the invention is required to contain at least an inorganic powder and polyolefin resin (C), and may have structures having pores around the inorganic powder or separately.

The thickness of the surface layer portion in the invention preferably ranges from 2 μm to 90 μm. When the thickness is 2 μm or more, it is possible to obtain improvements in reflectance and effects of improving anisotropy of the reflectance due to the incident direction. When the thickness is 90 μm or less, it is possible to ensure satisfactory lightweight. Further, the thickness ranges more preferably from 2 μm to 70 μm, and particularly preferably from 3 μm to 50 μm.

The weighing of the entire reflecting sheet of the invention preferably ranges from 10 g/m$^2$ to 500 g/m$^2$. When the weighing is 10 g/m$^2$ or more, it is possible to develop excellent reflective performance. When the weighing is 500 g/m$^2$ or less, it is possible to ensure satisfactory lightweight. Further, the weighing ranges more preferably from 20 g/m$^2$ to 400 g/m$^2$, and particularly preferably from 40 g/m$^2$ to 300 g/m$^2$.

In the reflecting sheet in the invention, the entire density including the surface layer portion and inner layer portion ranges preferably from 0.1 g/cm$^3$ to 0.75 g/cm$^3$. When the density is 0.1 g/cm$^3$ or more, it is possible to hold the sufficient strength as the reflecting sheet, and since the resin amount is adequate, heat forming is made ease because heat melting does not occur in any portion in heat forming. Further, when the density is 0.75 g/cm$^3$ or less, it is possible to form the structure with many fine pores and obtain high reflectance, while assuring excellent lightweight. The density ranges more preferably from 0.15 g/cm$^3$ to 0.5 g/cm$^3$, and particularly preferably from 0.2 g/cm$^3$ to 0.45 g/cm$^3$.

In the reflecting sheet of the invention, the average total reflection index is 90% or more when light with a wavelength of 550 nm is applied. This is because the index of 90% or more enables sufficient brightness to be obtained when the reflecting sheet is installed in the liquid crystal backlight. The average total reflection index is more preferably 95% or more. The average total reflection index referred to herein is the average value in both directions when the total reflection index is measured for the light with a wavelength of 550 nm incident in each of the MD direction and the TD direction.

In the reflecting sheet of the invention, the heat shrinkage percentage is preferably 15% or less in any of the MD and TD directions at 150° C. for 30 minutes. The shrinkage percentage is more preferably 14% or less, and particularly preferably 13% or less.

The inventors of the invention found out that the reflectance of the reflecting sheet is further increased by 0.5% to 1% as compared with the reflecting sheet having the similar weighing and density by controlling the heat shrinkage percentage in both directions of the sheet to within the particular value or less. Then, improvements in reflectance of this order are practically meaningful significant differences in property in the technical field of the reflecting sheet.

In the reflecting sheet of the invention, anisotropy of the total reflection index due to the incident direction is preferably 2% or less when light with a wavelength of 550 nm is applied. In other others, when it is assumed that the total reflection index is $R_1$ in the direction in which the total reflection index is the maximum and that the total reflection index is $R_2$ in the direction perpendicular to the direction, the difference between $R_1$ and $R_2$ is 2.0% or less. When the anisotropy in the reflection index is 2% or less, the reflecting sheet installed in the liquid crystal backlight in any direction does not cause any difference in brightness, and it is possible to install the sheet in any direction. The anisotropy is more preferably 1% or less, and particularly preferably 0.6% or less.

In the reflecting sheet of the invention, the yellowing factor is preferably 10 or less in a high pressure mercury lamp light resistance test. Herein, the high pressure mercury lamp light resistance test is obtained from the yellowing factor of the sheet before and after irradiation when the sheet is exposed to an irradiation amount of 100 mW/cm$^2$ for 500 seconds. The yellowing factor is more preferably 8 or less, and particularly preferably 6 or less.

The reflecting sheet of the invention is characterized by having the surface layer portion and inner layer portion i.e. two or more layers, and the surface layer portion and inner layer portion may be bonded and integrated, or may be obtained by laminating separate sheets. As a manufacturing method of the integrated reflecting sheet of two or more layers, examples are a manufacturing method of extruding the surface layer portion and inner layer portion separately to form films and laminate the films, another manufacturing method of preparing the inner layer portion, and then, forming the surface layer portion by coating, and still another manufacturing method of forming integrally the surface layer portion and inner layer portion by co-extrusion, and then, stretching for cleaving.

Preferable among the methods is the method of forming integrally the surface layer portion and inner layer portion by co-extrusion, and then, stretching for cleaving. Particularly, in performing co-extrusion, it is preferable to perform co-extrusion using three layers of surface layer portion/inner layer portion/surface layer portion, or more. By providing three or more layers, it is possible to prepare the sheet excellent in handling property without curling. Herein, respective compositions of the surface layer portions may be the same or different from each other. Described below is an example of the method of manufacturing a reflecting sheet with two kinds in three layers of surface layer portion/inner layer portion/surface layer portion by co-extrusion.

As the manufacturing method by co-extrusion, respective materials of the surface layer portion and the inner layer portion are subjected to co-extrusion. At this point, the melted and blended material resin composition is extruded in the shape of a sheet from a die attached to the front end of the extruder, and a gear pump may be used in between the extruder and the die to stabilize the amount of extruded resin composition. A twin screw extruder is preferable for extrusion of the inner layer portion in terms of kneading property and dispersing property of the resin. Used preferably is a co-extrusion method using a main extruder for the inner phase portion, and sub-extruder for the surface layer portion. In the invention, it is preferable to set operating conditions of the extruder and die so that the temperature of the extruded resin is in the range of 200° C. to 300° C.

Used as an extrusion die are laminate dies such as a T die, finish tail die, etc. for sheet forming. Herein, used as the laminate die are common laminate dies such as a feed block die, multi-manifold die, etc. The inner layer portion and surface layer portion are laminated inside the die and extruded. The sub-extruder may be either a single screw extruder or a two screw extruder, and is selected in consideration of the composition of the inner layer portion, extrusion suitability and the like. Herein, by adjusting the temperature of the die properly, it is possible to provide the inner layer portion with the sea-island structure that the resin (B) is dispersed in the shape of an island in the sea of the polyolefin resin (A).

For example, the reflecting sheet of the invention can be manufactured by the steps of (i) co-extruding a resin component (a) containing the polyolefin resin (A) and at least one kind of resins (B) incompatible with the polyolefin resin (A) at temperatures enabling stretching of the polyolefin resin (A), and a resin composition (b) containing at least a polyolefin resin (C) and an inorganic powder, and (ii) performing two-way stretching on the sheet obtained in the step (i) to cleave. In this case, when the reflecting sheet has a three-layer structure, it is preferable to supply the resin composition (b) to the die as a raw material of the surface layer portion, further apply the resin composition (a) as a raw material of the inner layer portion, and co-extrude the materials.

In the invention, the thickness of the surface layer portion extruded in performing co-extrusion is preferably in the range of 10 μm to 400 μm. Herein, the thickness of the surface layer portion is the thickness of one side in three layers of surface layer portion/inner layer portion/surface layer portion. When the thickness is 10 μm or more, it is possible to perform co-extrusion with stability irrespective of the thickness of the inner layer portion. When the thickness is 400 μm or less, it is possible to obtain the reflecting sheet with lightweight. The thickness is more preferably in the range of 10 μm to 300 μm, and particularly preferably in the range of 20 μm to 300 μm. Further, in the case of three layers, the thicknesses of the surface layer portions may be the same as or different from each other as required.

In the invention, the thickness of the inner layer portion extruded in performing co-extrusion is preferably in the range of 50 μm to 4000 μm. When the thickness is 50 μm or more, it is possible to prepare the reflecting sheet with higher reflective performance by subsequent two-way stretching. When the thickness is 4000 μm or less, it is possible to ensure uniform temperature control and stretchability of the sheet in subsequent two-way stretching. The thickness is more preferably in the range of 100 μm to 3000 μm, and particularly preferably in the range of 100 μm to 2500 μm.

In the invention, the thickness of the surface layer portion in performing co-extrusion preferably ranges from 1% to 20% relative to the entire thickness of co-extruded sheet containing the surface layer portion and inner layer portion. Herein, the thickness of the surface layer portion is the thickness of one side in three layers of surface layer portion/inner layer portion/surface layer portion. By controlling the thickness of the surface layer portion to within 20% or less relative to the entire thickness, the ratio of the inner layer portion stretched and cleaved increases, and it is possible to prepare the reflecting sheet with lighter weight and lower density. Further, in order to enable more stable extrusion and subsequent stretching, the thickness of the surface layer portion is preferably 1% or more of the entire thickness, more preferably ranges from 2% to 15%, and most preferably from 3% to 10%.

In the invention, it is a feature of performing two-way stretching on the co-extruded sheet to cleave. Herein, it is preferable to cool and solidify the sheet extruded from the die using a cooling roller or the like and then stretch using a stretching machine. In the stretching step, it is preferable to perform stretching at lower temperatures as possible so as to generate pores in the inner layer portion of the sheet. When stretching is performed at high temperatures, there is the tendency that generation of pores is hard to occur inside the inner layer portion sheet as compared with the case of stretching at low temperatures, and it is preferable to increase the stretching rate as compared with the case of stretching at low temperatures. Further, the surface layer portion does not need to be cleaved, and the inner layer portion is only required to be cleaved.

In the invention, it is possible to adopt general two-way stretching methods. In other words, it is possible to perform longitudinal-transverse successive two-way stretching, transverse-longitudinal successive two-way stretching, and concurrent two-way stretching, and subsequently to the two-way stretching, it is possible to further perform re-stretching in either or both of the longitudinal and transverse directions. Preferable is longitudinal-transverse successive two-way stretching or concurrent two-way stretching. The longitudinal-transverse successive two-way stretching is comprised of a longitudinal stretching step of passing the sheet through a plurality of rollers with different speeds to stretch the sheet in the MD direction, and a transverse stretching step of stretching the sheet in the TD direction using a clip tenter or the like. Meanwhile, the concurrent two-way stretching is a method of stretching concurrently in the MD direction and TD direction using a pantograph stretching machine or the like. More preferable is the most universal longitudinal-transverse successive two-way stretching method.

In the stretch ratio in two-way stretching, it is preferable that the ratio is 1.5 time or more in each of the MD direction and the TD direction, while the area stretch ratio is between 3 times and 50 times. It is more preferable that the ratio is 2 times or more in each of the MD direction and the TD direction, while the area ratio is between 4 times and 30 times. Further, heat shrinkage treatment may be performed after stretching when necessary.

In the invention, it is preferable to apply heat shrinkage of 10% or more in both of the longitudinal direction and the transverse direction or either one of the longitudinal direction and the transverse direction after performing two-way stretching on the co-extruded composition sheet and forming pores. Performed preferably is heat shrinkage of 15% or more, and performed particularly preferably is heat shrinkage of 20% or more.

Herein, in order to reduce the heat shrinkage percentage, to cause the two-way stretched sheet to undergo such heat shrinkage, for example, a relaxation heat treatment method may be implemented as shown by (1) to (4) described below.

(1) Without restraining the edge portions of the sheet, the sheet is allowed to cause heat shrinkage at appropriate temperatures in an over. The temperatures at this point are between 130° C. and 170° C. The temperature and time in this case are set corresponding to kinds of the resin composition, composition ratio, and forming conditions (particularly, stretching conditions). When the treatment temperature is low, the effect is small. Further, when the treatment temperature is excessively high, the polyolefin resin shrinks largely, or softens or melts, and the reflectance conversely decreases. Accordingly, the temperature ranges preferably from 140° C. to 160° C., and particularly preferably from 145° C. to 155° C. Meanwhile, the treatment time varies with the treatment temperature, and ranges from 5 seconds to 1 hour. When the treatment time is short, the effect is small, while when the treatment time is long, the reflectance decreases, or disadvantage occurs industrially. The treatment time preferably ranges from 10 seconds to 10 minutes.

(2) By restraining the edge portions of the sheet, the sheet is allowed to shrike to an appropriate shrinkage ratio while being restrained under particular conditions. This method is preferable in the respect that it is possible to obtain the uniform sheet in flatness and the like after the heat treatment. The conditions are the same as in above-mentioned (1). In this case, the restraint direction of the sheet can be only the longitudinal direction or the transverse direction, or both of the length and transverse directions. The restraint in the longitudinal direction can be performed by using a roll longitudinal stretching machine with a low-speed roll and a high-speed roll, and slowing the high-speed roll than the low-speed roll in the opposite manner to stretching. Further, the restrain in the transverse direction can be performed by using a tenter transverse stretching machine and shrinking the distance between tenter clips as the tenter runs. Further, the restraint in both longitudinal and transverse directions can be performed by using a tenter type concurrent two-way stretching machine, and concurrently shrinking the length and width as the tenter runs.

Further, this relaxation heat treatment can be performed after cooling the sheet to a predetermined temperature or successively without cooling. The cooling temperature in cooling is not limited particularly, but is effective when selected from the range of room temperature to the crystallization temperature of PP. As a method of successively performing without cooling, it is possible to perform the method by using the tenter transverse stretching machine to use the heat treatment zone after transverse stretching, and shrinking the distance between tenter clips as the tenter runs.

(3) In a combination with the two-way stretching method, transverse direction restraint relaxation heat treatment is performed successively inside the tenter after longitudinal-transverse successive two-way stretching. This method is a preferable method. In cooling before the relaxation heat treatment, it is possible to implement the cooling by providing a cooling zone in between the stretching zone and relaxation heat treatment zone inside the tenter.

(4) When two-way stretching is the longitudinal-transverse successive two-way stretching method, and the relationship of the stretch ratio between MD and TD is MD≦TD, after performing transverse stretching, relaxation heat treatment is applied to cause heat shrinkage of 10% or more (preferably 15% or more, and more preferably 20% or more) in the transverse direction relative to the transverse stretch ratio at temperatures near the transverse stretching temperature. For example, after stretching 3 times in the longitudinal direction and 4 to 5 times in the transverse direction, the relaxation heat treatment is performed for 10% or more in the transverse direction.

(Fine Three-Dimensional Structure Surface)

The reflecting sheet of the invention may have a fine three-dimensional structure surface on the surface layer portion. In this case, to apply the fine structure surface efficiently, as the polyolefin resin (C) of the surface layer portion, polypropylene resins with an isotactic index (mmmm pentad %) ranging from 55 mole % to 85 mole % are preferable from the viewpoint of easiness in obtaining the sharp shape. The index ranges more preferably from 60 mole % to 70 mole %. The isotactic index (mmmm pentad %) is an isotactic fraction on a pentad basis in a polypropylene molecular chain measured using nuclear magnetic resonance spectrum by isotropic carbon (13C-NMR) according to the method published in Macromolecules, 6, 925 (1973) by A. Zambelli, et al. In other words, the isotactic index is the fraction of propylene unit monomers where five propylene unit monomers in the meso configuration are continuous. Preferable specific examples as the polypropylene resin (A) of the surface layer portion of the invention include transparent types of "Prime TPO" manufactured by Prime Polymer Co., Ltd. and the like.

The thickness of the surface layer portion is determined by the shape of the fine structure surface. The thickness of the surface layer portion is increased in a deep shape. When the depth is larger than the thickness of the surface layer portion, the shape may reach the inner layer portion, but is not particularly inconvenient when the shape does not have any actually significant effect on reflective performance and any problem does not occur in use. However, in order to obtain forming workability, uniformity in shape, and uniform reflectability, it is preferable that the shape does not reach the inner layer portion and that a desired shape is formed in the resin of the surface layer portion, and the thickness of the surface layer portion of the reflecting sheet before being provided with the shape is determined to an appropriate value from the shape to provide. In other words, the thickness (h1) of the surface layer portion before forming is preferably the average thickness (h2) of the shaped portion after forming or more (h1≧h2). This relationship is shown in FIG. 1. The average thickness (h2) of the shaped portion is the thickness when concaves and convexes by shaping are made flat. In FIG. 1, (a) shows the shape of before forming, and FIG. 1(b) shows the shape after forming. In FIG. 1, reference numeral 1 denotes the surface layer portion, and reference numeral 2 denotes the inner layer portion.

Figure 2:
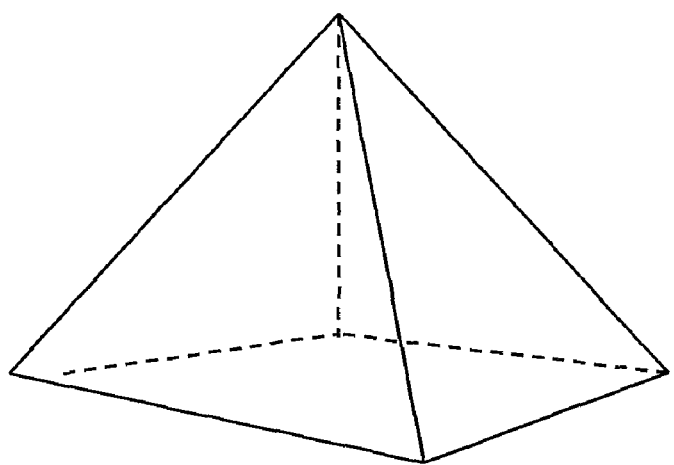
FIG. 2 is a view showing an example of a shape of three-dimensional fine structure of the invention.
Figure 3:
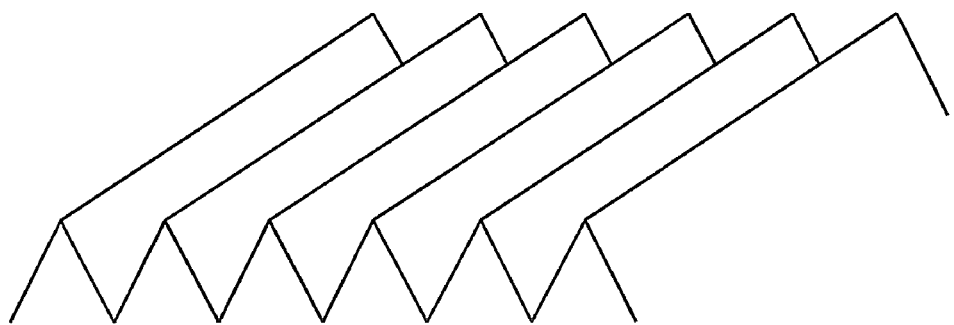
FIG. 3 is a view showing another example of the shape of three-dimensional fine structure of the invention.

The shape of the fine structure is not limited particularly, as long as the fine structure surface is a reflecting surface to control the reflection direction of light. For illustrative purposes, the shape of the section including the vertex of a single structure forming the fine structure surface is substantially a triangle, semicircle, arc form and the like. Further, the examples include a structure where a single element of the structure is, for example, a four-sided pyramid as exemplified in FIG. 2, and the element is regularly arranged on the sheet surface to form a single fine structure surface. In this case, the four-sided pyramid may be a conical form, or may be a poly-sided pyramid such as a three-sided pyramid, five-sided pyramid, six-sided pyramid and the like. Further, as shown in FIG. 3, the examples include a shape where the shape of the section including the vertex is, for example, a triangle, and this shape is regularly arranged in the surface with the same shape in one direction in the surface. Furthermore, the examples include a structure surface formed of a combination of each shape exemplified as described above. Moreover, the structure surface of section in the shape of a Fresnel lens formed of a saw-shaped aggregate is also preferable from the viewpoint of controlling the reflection direction of light.

Preferable shapes of the fine structure surface in the invention are that the section including the vertex of a single structure forming the fine structure surface is substantially a triangle, while the vertex angle ranges from 30° to 150°. The meaning of "substantially a triangle" is because the vertex of a triangle may be rounded to some extent by forming processing, and such a triangle is also included in substantial triangles. As a shape of the triangle, isosceles triangles or equilateral triangles are selected corresponding to the purpose. The vertex angle ranges more preferably from 50° to 120°. The length of the base of the triangle in this case is preferably in the range of 10 μm to 1000 μm, in consideration of diffusion reflectability and the effect of the fine shape, and more preferably in the range of 30 μm to 500 μm. The height of the triangle is preferably in the range of 10 μm to 150 μm in consideration of reflective performance, etc. and more preferably in the range of 30 μm to 100 μm.

(Method of Forming Processing for the Fine Structure Surface)

The two-way stretched sheet is subjected to post-treatment such as heat treatment when necessary to provide thermal dimensional stability, and then, provided with the fine structure surface. In this forming, adopted preferably is heat forming such as press forming, roll forming or the like. These types of forming are capable of coping with both of batch forming from the sheet-feed type and successive forming fed from the roll shape.

In press forming, a die with the fine structure surface formed therein is fixed to one side of the press surface, and the above-mentioned sheet is set on the die surface and compressed and processed. In this case, the press temperature ranges from 140° C. to 160° C., the press time ranges from 1 second to 10 minutes, and the press pressure ranges from 1 kg/cm$^2$ and 100 kg/cm$^2$. These forming conditions are set at appropriate conditions from the thickness of a sample, forming rate, die shape, cooling method after press and the like. Further, in the case of heating the press surface on which the die is set to the forming temperature, while cooling the other press surface, since the backside of the sheet is kept in cooling state, cooling is faster after press, the forming rate is increased, it is further possible to suppress heat deformation of the inner layer portion in press processing, and the case is preferable from the aforementioned viewpoints.

Figure 4:
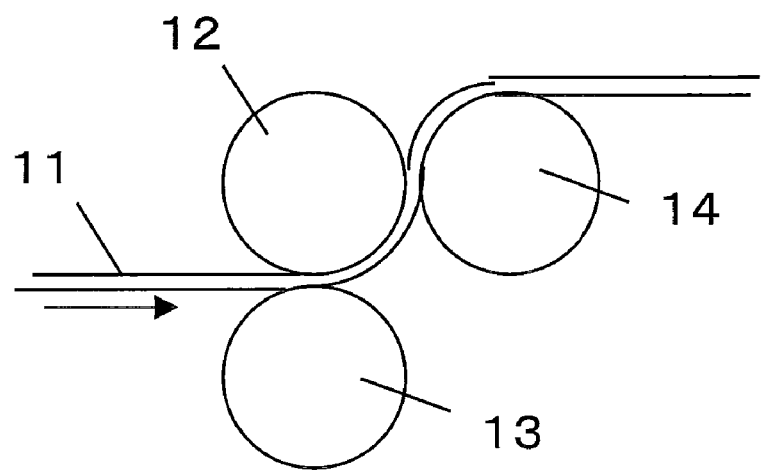
FIG. 4 is a view showing an example of a roll forming method for manufacturing a reflecting sheet of the invention.
Figure 5:
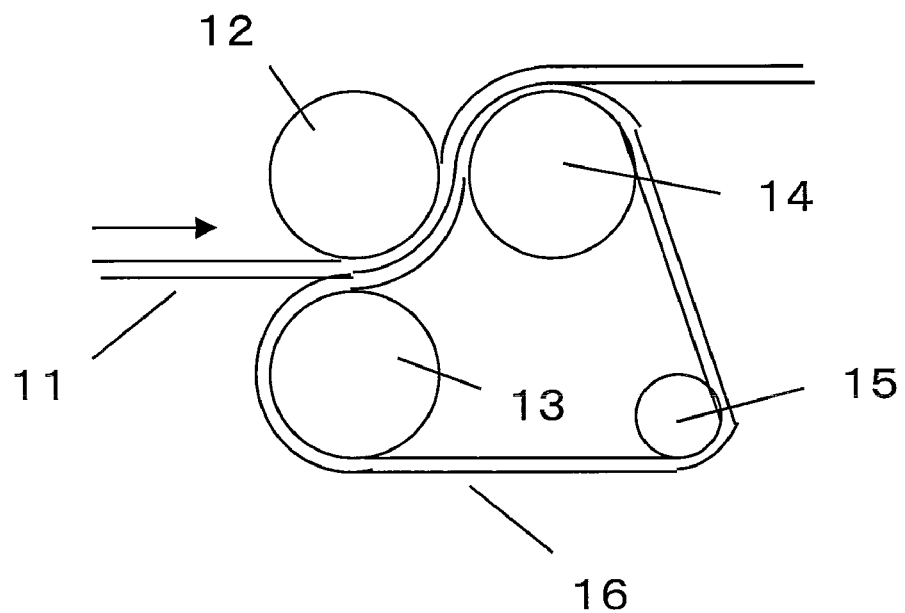
FIG. 5 is a view showing another example of the roll forming method for manufacturing a reflecting sheet of the invention.

FIGS. 4 and 5 show examples of the roll forming method. In the example as shown in FIG. 4, a sheet 11 is passed between a pair of rolls of a roll 12 with the fine shape formed on its surface heated to the forming temperature and a cooling roll 13, and the shape of the roll surface is heat-transferred to the sheet while being compressed. The transferred sheet is further cooled by the roll 14. The cooling roll may be a metal or elastic rubber roll. In the example as shown in FIG. 5, a cooling metal belt is passed over cooling rolls 13, 14 and 15, and cooling and compression is performed using the metal cooling belt 16. In this method, cooling and compression is performed over the roll surface, and it is possible to implement forming efficiently. The roll temperature, roll speed, and compression pressure are set at appropriate conditions from the thickness of a sample, die shape, cooling method after compression and the like.

(Property and Shape of the Reflecting Sheet Having Asperities)

The reflecting sheet of the invention may have convex portions on the surface (at least one of main surfaces). The shape of the convex portion is not limited particularly when the shape is a three-dimensional convex form with respect to the sheet surface, and examples of the shape include structures of poly-sided prisms such as a quadratic prism, hexagonal prism, etc. a cylinder, a part of a spherical form such as a semi-sphere, poly-sided pyramid forms such as a triangular pyramid, quadrilateral pyramid, etc. and a form of a part of a spherical form such as a semi-sphere or a poly-sided pyramid form where the vertex portion is made flat or arc form. From the viewpoints of forming workability, uniformity in reflection direction, and efficiency, preferable structures include a part of a spherical form such as a semi-sphere, poly-sided pyramid forms, and a form of a part of a spherical form such as a semi-sphere or a poly-sided pyramid form where the vertex portion is made flat or arc form. More preferable structures include a part of a spherical form such as a semi-sphere, and a form of a part of a spherical form such as a semi-sphere or a poly-sided pyramid form where the vertex portion is made flat or arc form. The most preferable structures include a part of a spherical form such as a semi-sphere, and a form where the vertex of a poly-sided pyramid is rounded in arc form.

In the above-mentioned shapes, when the dimensions of the convex portion are shown by the longitudinal direction and the perpendicular direction perpendicular to the longitudinal direction of the bottom portion, the length in each of the longitudinal direction and perpendicular direction is in the range of 1 mm to 50 mm, and preferably in the range of 10 mm to 30 mm. Further, the height of the convex portion is in the range of 0.5 mm to 20 mm, and preferably in the range of 1 mm to 10 mm. The dimensions and height are determined by the type of backlight, and the number and arrangement of lights. When the dimensions and height exceed the above-mentioned ranges, the effect of the shape is small, or the reflectance of the shape portion of the convex portion degrades, and the desired effects are not obtained.

Figure 6:
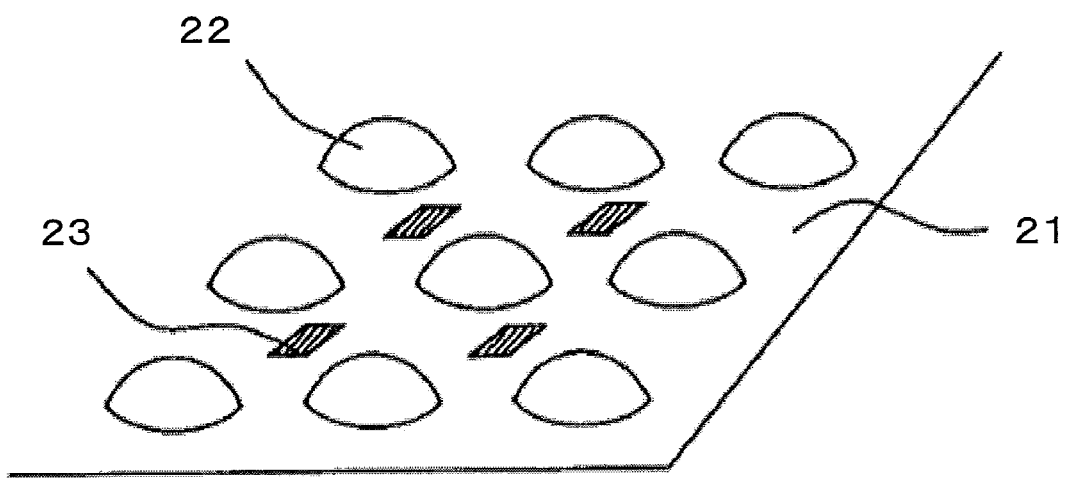
FIG. 6 is a view showing an example of the reflecting sheet in placing LEDs.

Further, in the respect of whether the sheet has convex portions or not, the thickness of the sheet is allowed to be constant or not constant, as long as there is not any significant difference in reflectance. Further, the present invention is characterized by having convex portions, but it is also possible to reverse the front and back sides of the sheet to use the concave portions as the reflecting surfaces according to the usage pattern. When LEDs are used as a backlight light source and the reflecting sheet of the invention is used as a reflecting material thereof, as positions in which the LEDs are arranged, optimal positions are selected from the viewpoint of reflection efficiency. For example, as shown in FIG. 6, when convex portions 22 of the reflecting sheet 21 are reflecting surfaces and the shape of the convex portion 22 is a spherical form or at least a part of a poly-sided pyramid form, holes 23 in which LEDs are disposed are made in positions in the flat portion spaced an equal distance apart from another shape, and the LEDs are provided therein. Further, when the reflecting surfaces are concave portions, illustrative examples include making a hole for an LED in the center of the concave portion to place the LED. Furthermore, the shape may adopt a form having both of the convex portions and concave portions with respect to the flat portion. In this case, it is also possible to use both the convex portions and the concave portions as the reflecting surfaces.

Figure 7:
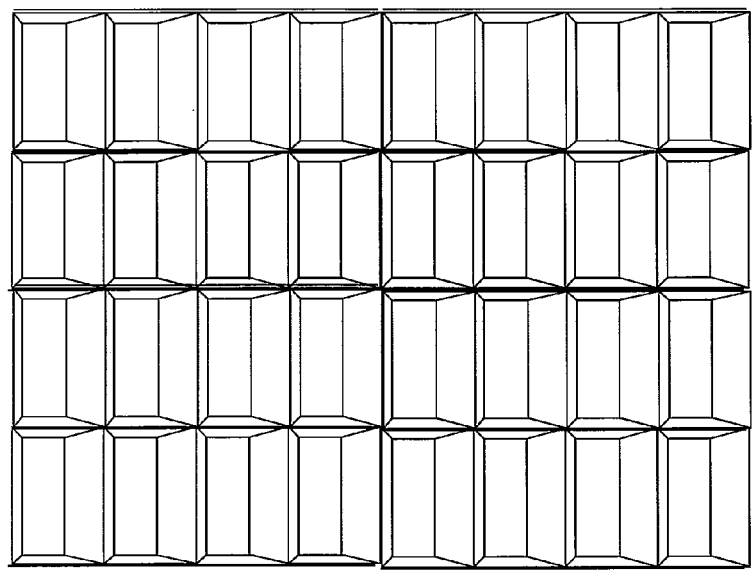
FIG. 7 is a plan view showing another example of the reflecting sheet in placing LEDs.
Figure 8:
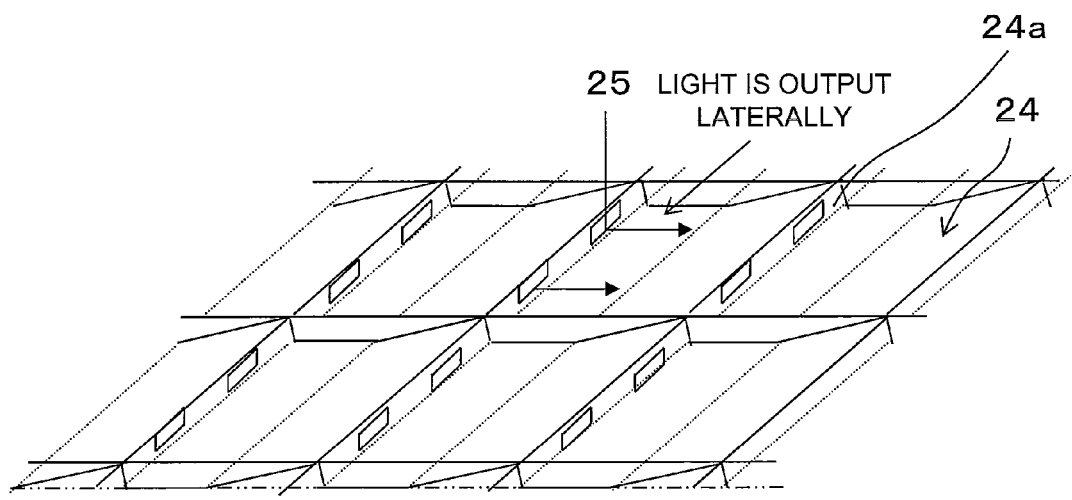
FIG. 8 is a perspective view of the reflecting sheet as shown in FIG. 7.

Further, when the LED light source is installed in the lateral direction with respect to the backlight, convexes and concaves of the reflecting sheet are formed in the form as shown in FIG. 7, and each LED 25 may be installed on one side face 24a of the concave portion of the reflecting sheet as shown in FIG. 8. In this case, the light from the LED 25 is output in the lateral direction with respect to the screen, strikes the reflecting sheet, is reflected and output toward the screen side.

(Formation Method of Convex Portions)

The two-way stretched sheet is subjected to post-treatment such as heat treatment when necessary to provide thermal dimensional stability, and then, the concave portions are formed. For this forming, it is possible to adopt ordinary heat forming techniques such as ordinary vacuum forming, air-pressure forming, heat compression forming and the like. In the invention, the forming method is not limited particularly, but the vacuum forming method and air-pressure forming method are recommended as the preferable method from the viewpoints of productivity, forming workability, and uniformity in thickness after forming.

The vacuum forming is a forming method for heating and softening the sheet-shaped resin to come into intimate contact with a die of a desired shape, sucking air between the sheet and die from a suction opening provided under the die to reduce the pressure, thereby making a state close to a vacuum, causing the sheet to adhere to the shape of the die, and creating the intended shape. The formed components of the invention are capable of supporting both of batch forming from the sheet-feed type and successive forming fed from the roll shape.

The air-pressure forming is a method for bringing the heated softened sheet into intimate contact with a die by compressed air of 1 kg/cm to 5 kg/cm, and thereby obtaining a predetermined shape, and has features that it is possible to present a sharp design and surface property of equal to injection molding by using the surface in contact with the die as the surface of the product, and that forming can be performed with higher pressure than in vacuum forming. The formed components of the invention are capable of supporting both of batch forming from the sheet-feed type and successive forming fed from the roll shape. Accordingly, when importance is placed on the surface property of the die surface, or forming requires high pressure, this air-pressure forming is used, and when significant importance is not placed thereon, the vacuum forming is recommended in terms of productivity, operability and the like.

(Shape of the Reflecting Sheet with a Plurality of Concave Portions and Hole Portions to Expose Emitters)

The reflecting sheet of the invention has a plurality of concave portions and ridge lines among the concave portions when necessary, where each of the concave portions has a bottom with a hole portion to expose an emitter and reflecting surfaces connecting the bottom and the ridge lines, and may have a plurality of bulge portions on the ridge lines.

The ridge lines (ridges) are areas that exist among the concave portions and that constitute the flat surface. The reflecting surface is a surface with performance of reflecting the light from the emitter (light source). The emitter is a spot-shaped light source, and examples of the emitter include LEDs from the viewpoint of practical use.

Figure 9:
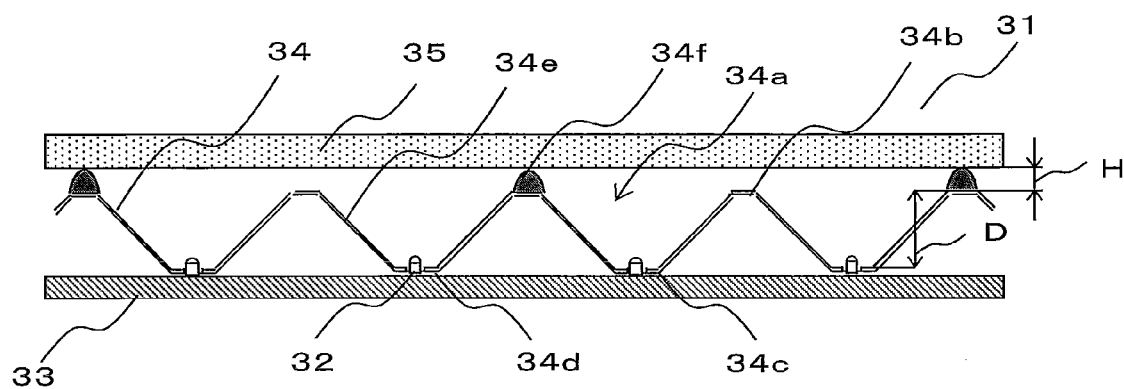
FIG. 9 is a side elevational view showing a part of a backlight unit that is a lighting device provided with a reflecting sheet according to an embodiment of the invention.

FIG. 9 is a side elevational view showing a part of a backlight unit that is a lighting device provided with the reflecting sheet according to the embodiment of the reflecting sheet having a plurality of concave portions and hole portions to expose emitters. The backlight unit 31 as shown in FIG. 9 is mainly comprised of a circuit board 33 having light emitting diodes (LEDs) 32 that are emitters installed a predetermined distance apart from one another, a reflecting sheet 34 disposed on the circuit board 33 to expose the LEDs 32 (to be exposed through hole portions as described later), and a diffusion plate 35 disposed on the reflecting sheet 34.

The reflecting sheet 34 is a sheet-shaped material, and includes a plurality of concave portions 34a, and ridge lines 34b existing among the concave portions 34a. Further, in the concave portion 34a, the reflecting sheet 34 has a bottom 34d with a hole portion 34c to expose the LED 32, and reflecting surfaces 34e to connect the bottom 34d and ridge lines 34b. Further, the reflecting sheet 34 has a plurality of bulge portions 34f on the ridge lines 34b. In FIG. 9, a single bulge 34f is provided every two ridge lines 34b. Further, the diffusion plate 35 comes into contact with the bulge portions 34f, and by the bulge portions 34f, the reflecting sheet 34 and diffusion plate 35 are spaced a predetermined distance apart from each other.

The shape of the bulge portion 34f is preferably a part of a pyramid shape where the front end portion is pointed, conical form, semi-sphere, sphere, or an elliptic sphere in consideration of the respect of minimizing the contact area with the diffusion plate, and more preferably a part of a semi-sphere, sphere, or an elliptic sphere in consideration of the strength and formability. A height H of the bulge portion 34f is preferably set as appropriate in terms of reducing fluctuations in brightness or lamp image. From the viewpoints of suppression of the occurrence of lamp image and the strength of the reflecting sheet 34, the height H of the bulge portion 34f is preferably in the range of $1/20$ to $1/2$ of the depth of the concave portion 34a, and more preferably in the range of $1/10$ to $1/3$. In terms of the respect of minimizing the effect of the bulge portions 34f on an image, a width of the bulge portion 34f does preferably not exceed the width of the ridge line 34b in a position where the portion 34f is located. Further, the position where the bulge portion 34 is located is preferably arranged in a position in which ridge lines 34b intersect one another where reflecting surfaces 34e with the minimum effect of the bulge portions 34f on the image are connected to one another. By thus providing the bulge portions 34f, the light reflected by the reflecting surface 34e is further reflected by the bulge portion 34f. Therefore, high reflective performance is exerted, and it is possible to suppress the occurrence of fluctuations in brightness or lamp image due to the shade of ridge line areas, while showing uniform high brightness.

Figure 10:
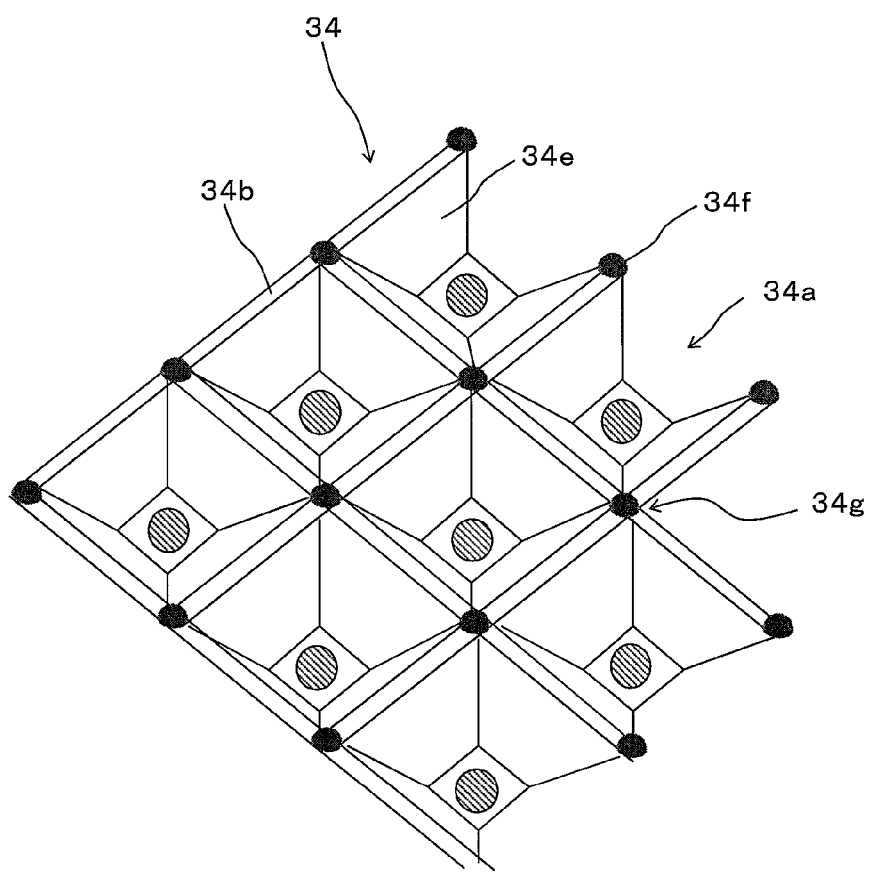
FIG. 10 is a perspective view showing the reflecting sheet according to the embodiment of the invention.
Figure 11:
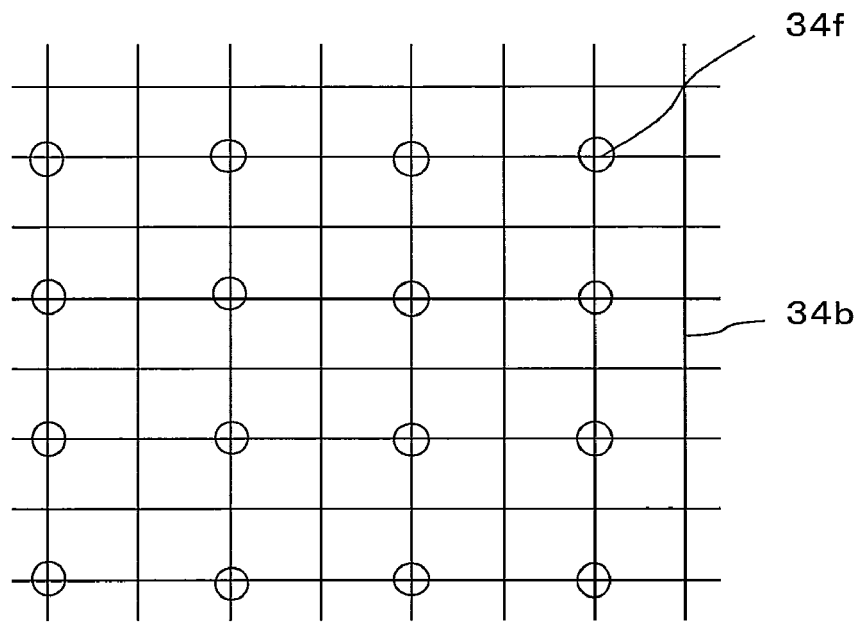
FIG. 11 is a schematic view showing locations of bulge portions in the reflecting sheet according to the embodiment of the invention.
Figure 12:
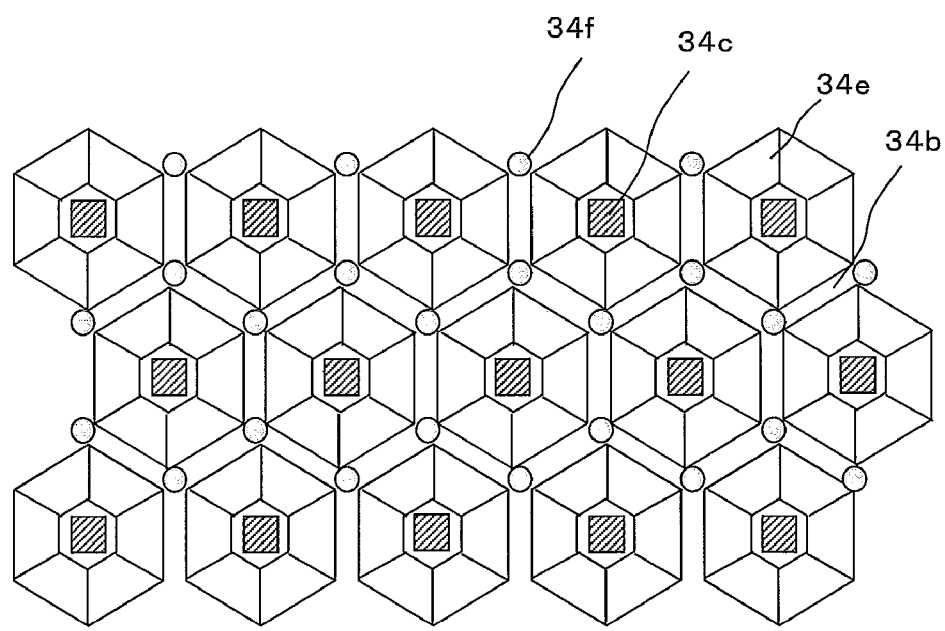
FIG. 12 is a plan view showing another example of the reflecting sheet according to the embodiment of the invention.

FIG. 10 is a perspective view of the reflecting sheet according to the embodiment of the invention. In the reflecting sheet as shown in FIG. 10, the shape of the concave portion 34 is a polygon, more specifically, a rectangle in a planar view. Further, in the reflecting sheet 34 as shown in FIG. 10, the bulge portions 34f are provided in positions 34g where the ridge lines 34b interest one another. In addition, the arrangement positions of the bulge portions 34 and the number of arranged portions 34f are not particularly limited. For example, as shown in FIG. 11, the bulge portions 34f may be provided every two intersection positions of the ridge lines 34b, and can be determined as appropriate from the size and shape of the backlight, or the shape, size and the number of reflecting surfaces. Further, the shape of the concave portion 34a in a planar view is not limited particularly. It is preferably performed to make the shape of the concave portion 34a polygon in a planar view, and for example, as shown in FIG. 12, the shape may be a hexagon, and can be determined from the arrangement state of the LEDs and the like.

Figure 13:
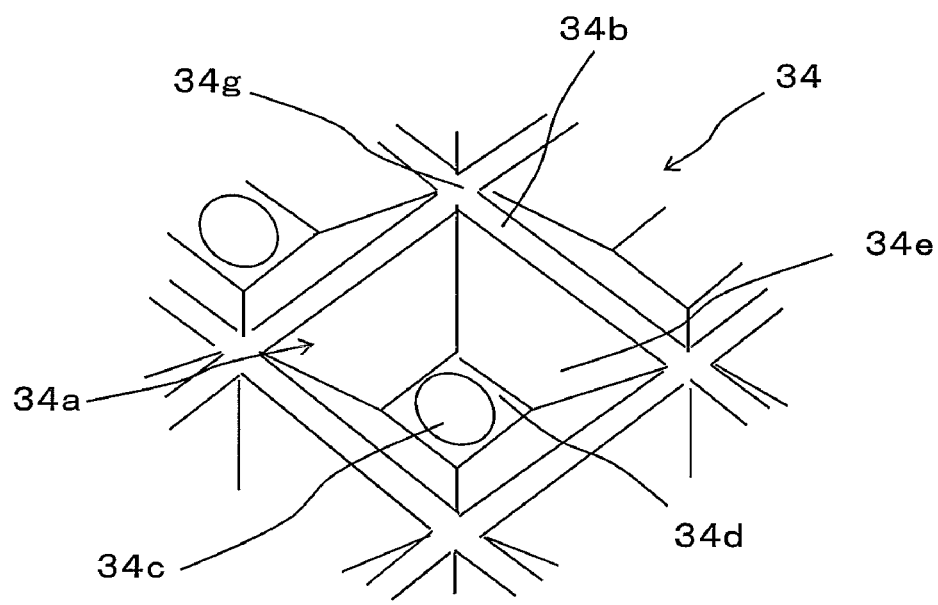
FIG. 13 is a perspective view showing a concave portion of the reflecting sheet according to the embodiment of the invention.

FIG. 13 is a view showing the concave portion of the reflecting sheet. The concave portion 34a has the bottom 34d with the hole portion 34c to expose the LED 32, and reflecting surfaces 34e to connect the bottom 34d and ridge lines 34b. The bulge portions are provided in the intersect positions 34g of the ridge lines 34b. In the bottom 34d, the hole portion 34c in the shape of a circle or rectangle is provided to expose the LED 32. The shape and size of the hole portion can be modified as appropriate corresponding to the LED being used. The ridge lines 34b are preferably of a flat plane with a width to some extent because the bulge portions are provided in the intersect position 34g. In addition, for the ridge lines 34b, to minimize the shade of the ridge lines, the width is preferably as narrow as possible. The width of the ridge line 34b is preferably in the range of 1/100 to 1/5 of the maximum width (herein, the diagonal line of the rectangle) of the concave portion 34a, and more preferably in the range of 1/50 to 1/10.

Figure 14:
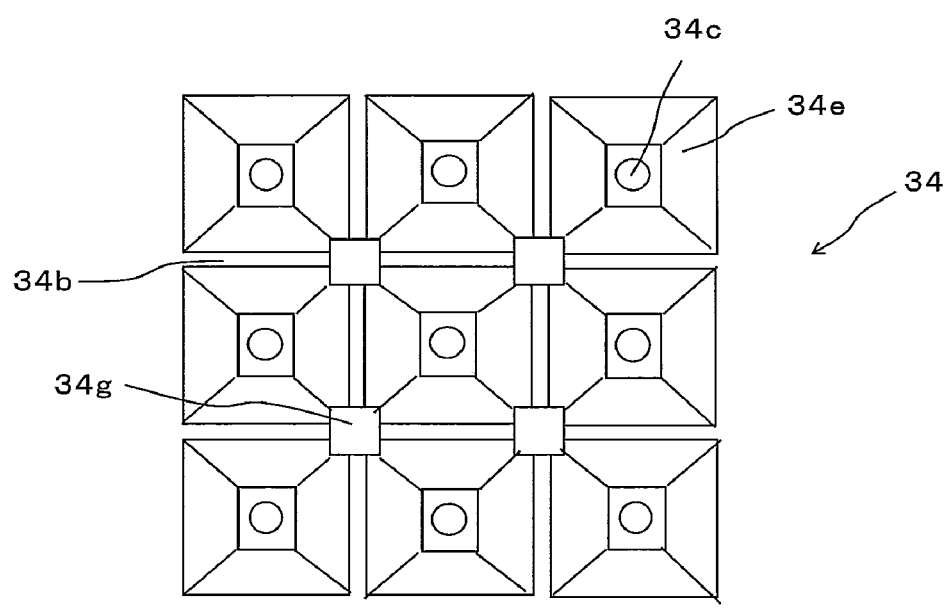
FIG. 14 is a plan view showing still another example of the reflecting sheet according to the embodiment of the invention.

The position 34g where the ridge lines 34b interest one another is preferably of a flat plane because the bulge portion is provided in this position. Generally, this portion can be specified as a part of the ridge line 34b as shown in FIGS. 10, 12 and 13. Alternately, this portion may be in an arbitrary shape, in consideration of provision of the bulge portion, or strength and formability. In FIG. 14, the portion is a rectangle with sides larger than the width of the ridge line 34b. This portion may be a polygon other than a rectangle, or circle. In addition, from the viewpoint of suppressing fluctuations in brightness, the width of the bulge portion does preferably not exceed three times the width of the ridge line 34b at the maximum width.

The reflecting surface 34e is a flat surface in FIG. 13, but may be a curved surface. The shape of the reflecting surface 34e including the curvature can be determined as appropriate from emission properties of the LEDs and reflectance properties of the used reflecting sheets. Further, a thickness of the reflecting surface 34e can be determined as appropriate from the types of materials, mechanical properties, self-strength required as a structure, required thickness from reflection properties and the like. For example, in the sheet-shaped reflecting sheet, sheets with a thickness of 0.1 mm to 2 mm are usually used.

(Forming Method of the Reflecting Sheet with a Plurality of Concave Portions and Hole Portions to Expose Emitters)

The reflecting sheet with a plurality of concave portions and hole portions to expose emitters can be formed by various method using resin materials. For example, the sheet can be formed by heat forming from a sheet-shaped material. In heat forming of the sheet material, it is possible to apply ordinary heat forming techniques such as vacuum forming, air-pressure forming, heat compression forming or the like. In each forming method, the bulge portions may be separately formed by injection molding or the like, and secured to the reflecting surfaces after forming the reflecting surfaces. Alternately, the bulge portions may be formed integrally concurrently with forming of the reflecting surfaces by providing the die with bulge portion shapes. In consideration of productivity, preferable is the method of integrally forming the bulge portions concurrently with forming of the reflecting surfaces. Further, in terms of easiness in supporting large screens, productivity, cost efficiency, and easiness in thinning and reducing the weight, it is preferable to heat-form a sheet-shaped material to obtain the reflecting sheet, and it is more preferable to obtain the reflecting sheet by the vacuum forming method, air-pressure forming method or a method of combination of both of the methods.

The method of combination of vacuum forming and air-pressure forming is to perform vacuum forming, and then, while keeping the heated state, perform air-pressure forming continuously, and this method is generally applied to forming of complicated shapes and forming of materials with high forming stress.

Described next are Examples that were carried out to clarify the effects of the invention.

<Evaluation Method>

Described first are items of physical properties to evaluate for the reflecting sheet and their evaluation methods.

(1) Thickness

Thicknesses of reflecting sheets were measured using a PEACOCK thickness gauge. Further, in reflecting sheets prepared by co-extrusion, the thickness of each layer was measured by cross-section observation using a digital microscope made by Keyence Corporation.

(2) Total Reflection Index/Average Total Reflection Index

The total reflection indexes of reflecting sheets were measured with an incident angle of 8 degrees using the spectrophotometer UV-3150 made by Shimadzu Corporation and an integrating sphere sample mount (Shimadzu Corporation MPC2200). The relative reflectance was measured in the range of wavelengths from 400 nm to 700 nm with the reflectance of a standard whiteboard (Labsphere, Inc. Spectralon) of polytetrafluoroethylene being 100%. The total reflection index was a measurement value when light with a wavelength of 550 nm was applied in each of the MD direction and TD direction of the sheet. The average total reflection index is the average value of both indexes. Further, a value of reflection anisotropy is a difference between the total reflection index in the MD direction and the total reflection index in the TD direction.

(3) Weighing

The weighing was obtained by cutting the sheet into 50 mm squares, and measuring the weight.

(4) Density

The sheet was cut into 50 mm squares, the weight and the average of total five thicknesses in the center and center portion in each side were obtained, and the density was calculated.

(5) Light Resistance Test

The sheet was cut into 50 mm squares, and exposed to an irradiation amount of 100 mW/cm$^2$ for 500 seconds using the high pressure mercury lamp (SEIMYUNGVACTRON SMTD51H-1), and light resistance was examined using the yellowing factor of the sheet before and after irradiation.

(6) Yellowing Factor

Colorimetry was performed using the spectral colorimeter (Konica Minolta Holdings, Inc. CM-2600d), and yellowness was calculated according to JISZ8722, JISK7105. The yellowing factor was calculated from the difference in yellowness between before and after the light resistance test.

(7) Stretchability Test

A co-extruded sheet was stretched three times in the MD direction (longitudinal direction) at a temperature of 155° C. using a roll longitudinal stretching machine, and the obtained sheet was sampled in the MD direction by 3 m, and used as a transverse-stretching prior sheet. The transverse-stretching prior sheets were subjected to transverse stretching (stretching in the TD direction) at a predetermined stretch ratio (4 times, 6 times and n=5 for each condition) at 155° C., and the stretchability was examined according to the presence or absence of rupture.

(8) Heat Shrinkage Percentage

The sheet was cut into 150 mm squares, placed in an oven, and removed after heating at 150° C. for 30 minutes, and the heat shrinkage percentage was measured from a change in dimensions between before and after heating.

(9) Measurement of Refractive Index

As a method of measuring the refractive index of the resin, the refractive index was obtained using Metricon Corporation model 2010 prism coupler placed in a 25° C. thermostatic chamber. The samples were aged in the 25° C. thermostatic chamber for implementing measurement for 24 hours and used. The wavelength distribution graph of the refractive index was obtained using the Cauchy formula from measurement results in wavelengths of 532 nm, 632.8 nm and 824 nm using the apparatus, and the refractive index in the wavelength of 589 nm was obtained and used as the refractive index of the resin. Used as refractive indexes of inorganic powders were values described in handbook.

As a result, the refractive index of a polypropylene resin (Prime Polymer Co., Ltd. E-105GM) used in the surface layer of the Examples was 1.49. For the refractive index of the inorganic powder used in the surface layer of the Examples, the refractive index of titanium oxide is 2.7, the refractive index of zinc oxide was 1.9, and the refractive index of calcium carbonate was 1.6.

(10) Weighing of the Inner Layer Portion (Examples 17, 18, Comparative Examples 2, 3)

The sheet was cut into 50 mm squares, and the weight was first measured. Next, the weight of the surface layer portion was calculated from the thickness of the surface layer portion, constituent resins, kinds of additives, and the amount, the weight of the surface layer portion was subtracted from the total weight, and the weighing of the inner layer portion was obtained by calculation.

(11) Density of the Inner Layer Portion (Examples 17, 18, Comparative Examples 2, 3)

The thickness of the inner layer portion was obtained from the sample where the weighing of the inner layer portion was obtained, and the volume of the inner layer portion was calculated. The density was obtained by calculation from the volume and the above-mentioned weighing.

(12) Weighing of the Reflecting Sheet Having Concave Portions

A plurality of structure portions when necessary was cut from the sheet so that the concave portions were in the range of about 0.5 g to 1 g, and the weight was measured. The sum total of areas of the front sides and back sides of all the cutout concave portions were obtained from dimensions of the shape by calculation, the arithmetic mean of the front sides and back sides was assumed to be the area of the reflecting sheet, the previously obtained weight was divided by this area, and the resultant value was the weighing of the concave portion of the invention. When the structure of the invention was a laminate structure having the surface layer portion, the weight of the surface layer portion was calculated from the resin forming the surface layer portion, kinds of additives and the amount, the weighing of the surface layer portion was subtracted from the total weighing, and the weighing of the reflecting sheet was thus obtained.

(13) Density of the Reflecting Sheet Having Concave Portions

For each structure portion of the concave portion cut in (12), the thickness was measured in three points uniformly, and the arithmetic mean of thicknesses of three points was assumed to be the thickness of the structure portion. In the same method as in (12), the average value of the areas of the structure portions was obtained, the volume was obtained by multiplying the area by the thickness, and the weight of the structure portion was divided by the volume to obtain the density. This calculation was performed on each of all the cutout concave portions, the arithmetic mean thereof was calculated, and the resultant was the density of the reflecting sheet of the invention. When the structure of the invention is a laminate structure having a protective layer, the average value (average value of three points as in (3)) of the thickness of the surface layer portion was subtracted from the entire thickness, the thickness of the reflecting sheet was obtained, the volume was obtained by multiplying the area obtained in the same way as in (12) by the thickness, the weight except the surface layer portion was obtained by the method obtained in (12), the weight was divided by the volume, and the density was thus obtained.

Reference Example 1

A raw-material resin of a mixture of 62 percent by volume (55 percent by weight) of a polypropylene resin (Prime Polymer Co., Ltd. E-105GM) and 38 percent by volume (45 percent by weight) of a polycarbonate resin (CHIMEI-ASAHI Corporation WONDERLITE PC110) was melted using a same-direction rotary two-way extruder with the cylinder diameter of 25 mm and the ratio between the cylinder and the diameter of 48 under operating conditions that the cylinder temperature was 250° C. and that the number of revolutions of the screw was 100 rpm, and extruded from a sheet die with the lip width of 400 mm and clearance of 1.6 mm via a gear pump with the temperature adjusted to 250° C. The extruded melted resin was received in a pair of pinch rollers set for 80° C., the resin was cooled and solidified while the melted resin was stretched in the extrusion direction, and a sheet with a thickness of 1.4 mm was prepared.

Figure 15:
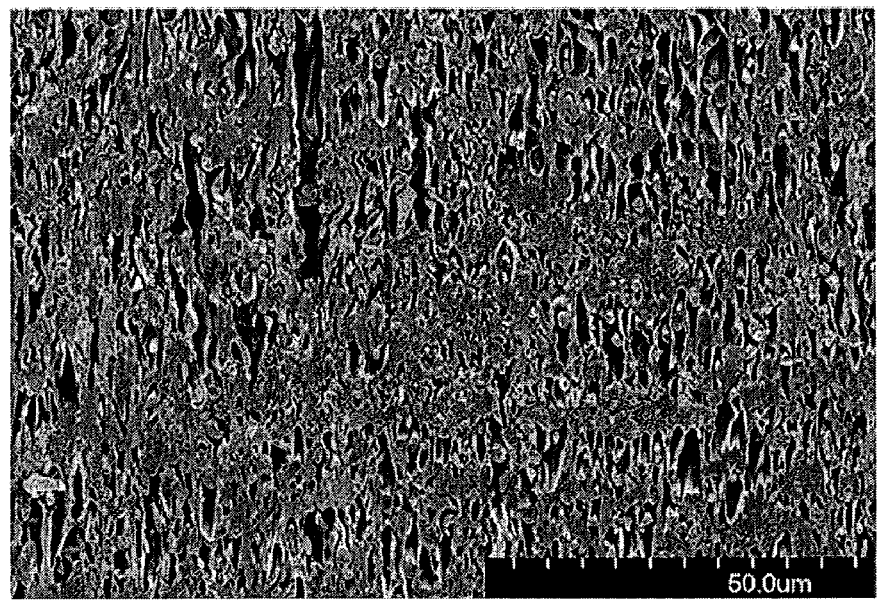
FIG. 15 is a cross-sectional view perpendicular in the MD direction of the sheet of an inner layer portion of the invention.

The obtained sheet was stretched three times in the MD direction (longitudinal direction) at the temperature of 155° C. using a roll longitudinal stretching machine, and then, stretched three times in the TD direction (transverse direction) at the temperature of 155° C. using tenter transverse stretching, and the inner layer portion sheet with a thickness of 430 µm was obtained. The thickness, weighing and density of the inner layer portion were respectively 430 µm, 190 g/m$^2$, and 0.44 g/cm$^3$. The MD total reflection index and TD total reflection index of the inner layer portion sheet were respectively 99.2% and 93.4%, the average total reflection index was 96.3% and the reflectance anisotropy was 5.8%. Further, the yellowing factor by the light resistance test was 15. The inner layer portion sheet was cut in cross section perpendicular to the MD direction to perform SEM observation, and the structure had voids inside (FIG. 15).

Example 1

A mixture obtained by blending 97 percent by weight of a polypropylene resin (Prime Polymer Co., Ltd. E-105GM) and 3 percent by weight of titanium oxide (TAYCA Corporation, JR600A, average particle size: 250 nm) as an inorganic powder was kneaded with a Laboplast mill at 210° C. at 40 rpm for 10 minutes, the obtained compound was formed to a film of about 37 µm by press at 210°, and obtained was the surface layer portion sheet with the content of inorganic powder of 1.11 g/m$^2$. This surface layer portion sheet was laminated on the inner layer portion sheet as described in Reference Example 1, and obtained was a laminated two-layer reflecting sheet. The thickness, weighing and density of the obtained two-layer reflecting sheet were respectively 467 μm, 225 g/m², and 0.48 g/cm³. The MD total reflection index and TD total reflection index of the two-layer reflecting sheet were respectively 99.0% and 98.8%, the average total reflection index was 98.9%, and the reflectance anisotropy was 0.2%. Further, the yellowing factor by the light resistance test was 4. Furthermore, in this Example, polypropylene was used as the resin of the surface layer portion, titanium oxide was used as the inorganic powder, and the relationship in refractive index was $(n_{1(inorganic)}-n_{2(resin)})/n_{2(resin)}=0.81$ ($n_1$: refractive index of titanium oxide, $n_2$: refractive index of polypropylene).

Example 2

Using titanium oxide (TAYCA Corporation, MT500SAS, average particle size: 35 nm) as an inorganic powder, in the same way as in Example 1, the surface layer portion sheet was obtained where the thickness was 33 μm and the content of inorganic powder was 0.99 g/m². This surface layer portion sheet was laminated on the inner layer portion sheet as described in Reference Example 1, and obtained was a laminated two-layer reflecting sheet. The thickness, weighing and density of the obtained two-layer reflecting sheet were respectively 463 μm, 221 g/m², and 0.48 g/cm³. The MD total reflection index and TD total reflection index of the two-layer reflecting sheet were respectively 98.7% and 98.4%, the average total reflection index was 98.6%, and the reflectance anisotropy was 0.3%. Further, the yellowing factor by the light resistance test was 1. In this Example, polypropylene was used as the resin of the surface layer portion, titanium oxide was used as the inorganic powder, and the relationship in refractive index was $(n_{1(inorganic)}-n_{2(resin)})/n_{2(resin)}=0.81$ ($n_1$: refractive index of titanium oxide, $n_2$: refractive index of polypropylene).

Example 3

Using zinc oxide (Sakai Chemical Industry Co., Ltd. NAnofine 50SD, average particle size: 20 nm) as an inorganic powder, in the same way as in Example 1, the surface layer portion sheet was obtained where the thickness was 34 μm and the content of inorganic powder was 1.02 g/m². This surface layer portion sheet was laminated on the inner layer portion sheet as described in Reference Example 1, and obtained was a laminated two-layer reflecting sheet. The thickness, weighing and density of the obtained two-layer reflecting sheet were respectively 464 μm, 222 g/m², and 0.48 g/cm³. The MD total reflection index and TD total reflection index of the two-layer reflecting sheet were respectively 98.6% and 95.5%, the average total reflection index was 97.1%, and the reflectance anisotropy was 3.1%. Further, the yellowing factor by the light resistance test was 4. In this Example, polypropylene was used as the resin of the surface layer portion, zinc oxide was used as the inorganic powder, and the relationship in refractive index was $(n_{1(inorganic)}-n_{2(resin)})/n_{2(resin)}=0.31$ ($n_1$: refractive index of zinc oxide, $n_2$: refractive index of polypropylene).

Reference Example 2

Without using an inorganic powder in the surface layer portion, in the same way as in Example 1, the surface layer portion sheet with a thickness of 38 μm was obtained. This surface layer portion sheet was laminated on the inner layer portion sheet as described in Reference Example 1, and obtained was a laminated two-layer reflecting sheet. The thickness, weighing and density of the obtained two-layer reflecting sheet were respectively 468 μm, 224 g/m², and 0.48 g/cm³. The MD total reflection index and TD total reflection index of the two-layer reflecting sheet were respectively 98.8% and 93.7%, the average total reflection index was 96.3%, and the reflectance anisotropy was 5.1%. Further, the yellowing factor by the light resistance test was 15.

Table 1 below shows the results obtained in Examples 1 to 3, and Reference Examples 1 and 2 as described above. As can be seen from Table 1, by the surface layer portion containing an inorganic powder also in the laminated structure, the average total reflection index is enhanced, and the reflection anisotropy is drastically improved. It is further understood that heat resistance is also enhanced dramatically.

TABLE 1

|  |  | Example 1 | Example 2 | Example 3 | Reference Example 1 | Reference Example 2 |
|---|---|---|---|---|---|---|
|  | Preparation Method | Laminate | Laminate | Laminate | Only inner layer portion | Laminate |
| Inner layer portion | Thickness (μm) | 430 | 430 | 430 | 430 | 430 |
|  | Composition | PP/PC = 55/45 w % | PP/PC = 55/45 w % | PP/PC = 55/45 w % | PP/PC = 55/45 w % | PP/PC = 55/45 w % |
| Surface layer portion | Thickness (μm) | 37 | 33 | 34 | — | 38 |
|  | Kind of inorganic powder, primary particle size | TiO2 (250 nm) | TiO2 (35 nm) | ZnO (20 nm) | — | None |
|  | Inorganic powder concentration | 3% | 3% | 3% | — | 0% |
|  | Inorganic powder content (g/m²) | 1.11 | 0.99 | 1.02 | — | 0 |
|  | Surface layer portion $(n_{inorganic}-n_{resin})/n_{resin}$ | 0.81 | 0.81 | 0.31 | — | — |
| Total | Thickness (μm) | 467 | 463 | 464 | 430 | 468 |
|  | Weighing (g/m²) | 225 | 221 | 222 | 190 | 224 |
|  | Density (g/cm³) | 0.48 | 0.48 | 0.48 | 0.44 | 0.48 |
| Reflection performance | MD total reflection index (%) | 99.0 | 98.7 | 98.6 | 99.2 | 98.8 |
|  | TD total reflection index (%) | 98.8 | 98.4 | 95.5 | 93.4 | 93.7 |
|  | Average total reflection index (%) | 98.9 | 98.6 | 97.1 | 96.3 | 96.3 |
|  | Reflection anisotropy (MD − TD, %) | 0.2 | 0.3 | 3.1 | 5.8 | 5.1 |

TABLE 1-continued

| | Example 1 | Example 2 | Example 3 | Reference Example 1 | Reference Example 2 |
|---|---|---|---|---|---|
| Light resistance test — Yellowing factor | 4 | 1 | 4 | 15 | 15 |

Example 4

Used as an inner layer portion raw material was a raw-material resin of a mixture of 62 percent by volume (55 percent by weight) of a polypropylene resin (Prime Polymer Co., Ltd. E-105GM) and 38 percent by volume (45 percent by weight) of a polycarbonate resin (CHIMEI-ASAHI Corporation WONDERLITE PC110). This raw-material resin was melted using the same-direction rotary two-way extruder with the cylinder diameter of 25 mm and the ratio between the cylinder and the diameter of 48 under operating conditions that the cylinder temperature was 250° C. and that the number of revolutions of the screw was 100 rpm, and supplied to a multi-manifold die via the gear pump with the temperature adjusted to 250° C. Further, used as a surface layer portion raw material was a mixture obtained by blending 95 percent by weight of the polypropylene resin (Prime Polymer Co., Ltd. E-105GM) and 5 percent by weight of titanium oxide (TAYCA Corporation, JR600A, average particle size: 250 nm) as an inorganic powder. The mixture was melted using a single-way extruder with the cylinder diameter of 32 mm and the ratio between the cylinder and the diameter of 24 under operating conditions that the cylinder temperature was 210° C. and that the number of revolutions of the screw was 100 rpm, and supplied to the multi-manifold die. Herein, each raw material was supplied to the multi-manifold die so that the ratio of surface layer portion/inner layer portion/surface layer portion=1/6/1, merged, and extruded with the lip width of 400 mm and clearance of 1.9 mm. The extruded melted resin was received in a pair of pinch rollers set for 80° C., the resin was cooled and solidified while the melted resin was stretched in the MD direction, and a two-kind three-layer co-extruded sheet with a thickness of 1.8 mm was obtained. The obtained co-extruded sheet was stretched three times in the MD direction (longitudinal direction) at the temperature of 155° C. using the roll longitudinal stretching machine, and a transverse-stretching prior sheet was cut from the stretched sheet and subjected to the stretchability test. As a result, the stretchability acceptances were 100% in both four-time stretching and six-time stretching.

Figure 16:
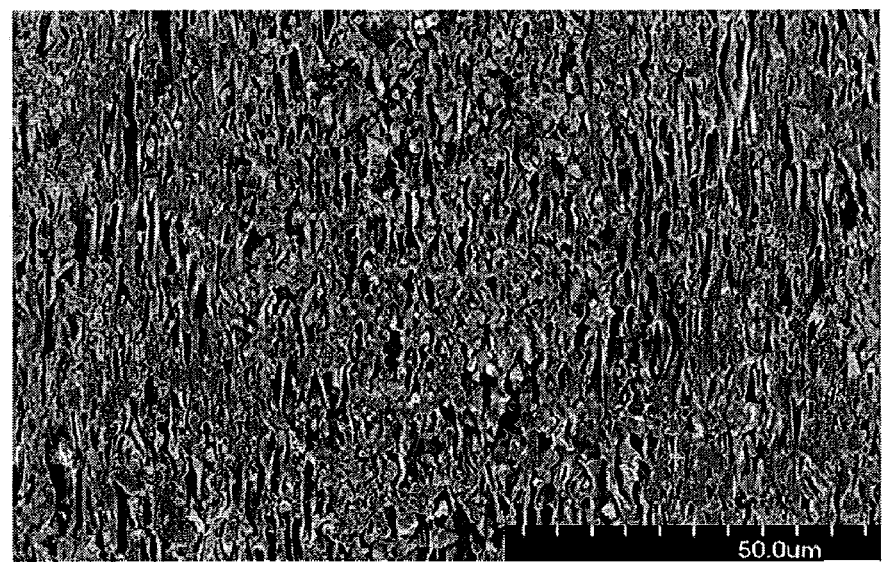
FIG. 16 is another cross-sectional view perpendicular in the MD direction of the sheet of the inner layer portion of the invention.

Further, the co-extruded sheet obtained by co-extrusion was stretched three times in the MD direction (longitudinal direction) at the temperature of 155° C. using the roll longitudinal stretching machine, and then, stretched three times in the TD direction (transverse direction) at the temperature of 155° C. using tenter transverse stretching, and obtained was a two-kind three-layer co-extruded reflecting sheet with the inorganic powder content of 1.85 g/m² having voids in the inner layer portion. The thickness, weighing and density of the obtained two-kind three-layer reflecting sheet were respectively 409 μm, 234 g/m², and 0.57 g/cm³. The MD total reflection index and TD total reflection index of the reflecting sheet were respectively 98.6% and 98.4%, the average total reflection index was 98.5%, and the reflectance anisotropy was 0.2%. Further, the yellowing factor by the light resistance test was 2. The two-kind three-layer reflecting sheet was cut in cross section perpendicular to the MD direction to perform SEM observation, and the structure had voids inside (FIG. 16). Furthermore, in this Example, polypropylene was used as the resin of the surface layer portion, titanium oxide was used as the inorganic powder, and the relationship in refractive index was $(n_{1(inorganic)}-n_{2(resin)})/n_{2(resin)}=0.81$ ($n_1$: refractive index of titanium oxide, $n_2$:refractive index of polypropylene).

Example 5

Using 10 percent by weight of titanium oxide (TAYCA Corporation, MT500SAS, average particle size: 35 nm) as an inorganic powder, a two-kind three-layer co-extruded sheet was obtained in the same way as in Example 4. The obtained co-extruded sheet was stretched three times in the MD direction (longitudinal direction) at the temperature of 155° C. using the roll longitudinal stretching machine, and a transverse-stretching prior sheet was cut from the stretched sheet and subjected to the stretchability test. As a result, the stretchability acceptances were 100% in both four-time stretching and six-time stretching.

Further, the co-extruded sheet obtained by co-extrusion was stretched three times in the MD direction (longitudinal direction) at the temperature of 155° C. using the roll longitudinal stretching machine, and then, stretched three times in the TD direction (transverse direction) at the temperature of 155° C. using tenter transverse stretching, and obtained was a two-kind three-layer co-extruded reflecting sheet with the inorganic powder content of 4.2 g/m². The thickness, weighing and density of the obtained two-kind three-layer reflecting sheet were respectively 433 μm, 241 g/m², and 0.56 g/cm³. The MD total reflection index and TD total reflection index of the reflecting sheet were respectively 97.9% and 97.7%, the average total reflection index was 97.8%, and the reflectance anisotropy was 0.2%. Further, the yellowing factor by the light resistance test was 1. Furthermore, in this Example, polypropylene was used as the resin of the surface layer portion, titanium oxide was used as the inorganic powder, and the relationship in refractive index was $(n_{1(inorganic)}-n_{2(resin)})/n_{2(resin)}=00.81$ ($n_1$: refractive index of titanium oxide, $n_2$:refractive index of polypropylene).

Example 6

Using 5 percent by weight of zinc oxide (Sakai Chemical Industry Co., Ltd. Nanofine 50SD, average particle size: 20 nm) as an inorganic powder, a two-kind three-layer co-extruded sheet was obtained in the same way as in Example 4. The obtained co-extruded sheet was stretched three times in the MD direction (longitudinal direction) at the temperature of 155° C. using the roll longitudinal stretching machine, and a transverse-stretching prior sheet was cut from the stretched sheet and subjected to the stretchability test. As a result, the stretchability acceptances were 100% in both four-time stretching and six-time stretching.

Further, the co-extruded sheet obtained by co-extrusion was stretched three times in the MD direction (longitudinal direction) at the temperature of 155° C. using the roll longitudinal stretching machine, and then, stretched three times in the TD direction (transverse direction) at the temperature of 155° C. using tenter transverse stretching, and obtained was a two-kind three-layer co-extruded reflecting sheet with the inorganic powder content of 1.9 g/m². The thickness, weighing and density of the obtained two-kind three-layer reflecting sheet were respectively 453 μm, 268 g/m², and 0.59 g/cm³. The MD total reflection index and TD total reflection index of the reflecting sheet were respectively 99.1% and 95.8%, the average total reflection index was 97.5%, and the reflectance anisotropy was 3.3%. Further, the yellowing factor by the light resistance test was 2. Furthermore, in this Example, polypropylene was used as the resin of the surface layer portion, zinc oxide was used as the inorganic powder, and the relationship in refractive index was $(n_{1(inorganic)} - n_{2(resin)})/n_{2(resin)} = 0.31$ ($n_1$: refractive index of zinc oxide, $n_2$: refractive index of polypropylene).

Reference Example 3

Without adding an inorganic powder to the surface layer portion, a two-kind three-layer co-extruded sheet was obtained in the same way as in Example 4. The obtained co-extruded sheet was stretched three times in the MD direction (longitudinal direction) at the temperature of 155° C. using the roll longitudinal stretching machine, and a transverse-stretching prior sheet was cut from the stretched sheet and subjected to the stretchability test. As a result, the stretchability acceptances were 100% in both four-time stretching and six-time stretching.

Further, the co-extruded sheet obtained by co-extrusion was stretched three times in the MD direction (longitudinal direction) at the temperature of 155° C. using the roll longitudinal stretching machine, and then, stretched three times in the TD direction (transverse direction) at the temperature of 155° C. using tenter transverse stretching, and a two-kind three-layer co-extruded reflecting sheet was obtained. The thickness, weighing and density of the obtained two-kind three-layer reflecting sheet were respectively 414 μm, 227 g/m², and 0.55 g/cm³. The MD total reflection index and TD total reflection index of the reflecting sheet were respectively 99.6% and 94.5%, the average total reflection index was 97.1%, and the reflectance anisotropy was 5.1%. Further, the yellowing factor by the light resistance test was 14.

Example 7

A co-extruded sheet was prepared in the same composition as in Example 4 using a feed block die in co-extrusion instead of using the multi-manifold die. The obtained co-extruded sheet was stretched three times in the MD direction (longitudinal direction) at the temperature of 155° C. using the roll longitudinal stretching machine, and a transverse-stretching prior sheet was cut from the stretched sheet and subjected to the stretchability test. As a result, the stretchability acceptances were 100% in both four-time stretching and six-time stretching.

Further, the co-extruded sheet obtained by co-extrusion was stretched three times in the MD direction (longitudinal direction) at the temperature of 155° C. using the roll longitudinal stretching machine, and then, stretched three times in the TD direction (transverse direction) at the temperature of 155° C. using tenter transverse stretching, and obtained was a two-kind three-layer co-extruded reflecting sheet with the inorganic powder content of 1.45 g/m². The thickness, weighing and density of the obtained two-kind three-layer reflecting sheet were respectively 389 μm, 217 g/m², and 0.56 g/cm³. The MD total reflection index and TD total reflection index of the reflecting sheet were respectively 99.1% and 98.7%, the average total reflection index was 98.9%, and the reflectance anisotropy was 0.4%. Further, the yellowing factor by the light resistance test was 3. Furthermore, in this Example, polypropylene was used as the resin of the surface layer portion, titanium oxide was used as the inorganic powder, and the relationship in refractive index was $(n_{1(inorganic)} - n_{2(resin)})/n_{2(resin)} = 0.81$ ($n_1$: refractive index of titanium oxide, $n_2$: refractive index of polypropylene).

Reference Example 4

Without adding an inorganic powder to the surface layer portion, a two-kind three-layer co-extruded sheet was obtained in the same way as in Example 7. The obtained co-extruded sheet was stretched three times in the MD direction (longitudinal direction) at the temperature of 155° C. using the roll longitudinal stretching machine, and a transverse-stretching prior sheet was cut from the stretched sheet and subjected to the stretchability test. As a result, the stretchability acceptances were 100% in both four-time stretching and six-time stretching.

Further, the co-extruded sheet obtained by co-extrusion was stretched three times in the MD direction (longitudinal direction) at the temperature of 155° C. using the roll longitudinal stretching machine, and then, stretched three times in the TD direction (transverse direction) at the temperature of 155° C. using tenter transverse stretching, and a two-kind three-layer co-extruded reflecting sheet was obtained. The thickness, weighing and density of the obtained two-kind three-layer reflecting sheet were respectively 415 μm, 225 g/m², and 0.54 g/cm³. The MD total reflection index and TD total reflection index of the reflecting sheet were respectively 99.0% and 96.5%, the average total reflection index was 97.8%, and the reflectance anisotropy was 2.5%. Further, the yellowing factor by the light resistance test was 13.

Reference Example 5

A raw-material resin of a mixture of 62 percent by volume (55 percent by weight) of a polypropylene resin (Prime Polymer Co., Ltd. E-105GM) and 38 percent by volume (45 percent by weight) of a polycarbonate resin (CHIMEI-ASAHI Corporation WONDERLITE PC110) was melted using the same-direction rotary two-way extruder with the cylinder diameter of 25 mm and the ratio between the cylinder and the diameter of 48 under operating conditions that the cylinder temperature was 250° and that the number of revolutions of the screw was 100 rpm, and extruded from a single-layer sheet die with the lip width of 400 mm and clearance of 1.6 mm via a gear pump with the temperature adjusted to 250° C. The extruded melted resin was received in a pair of pinch rollers set for 80° C., the resin was cooled and solidified while the melted resin was stretched in the extrusion direction, and a single-layer sheet with a thickness of about 1.4 mm was prepared. The obtained single-layer extruded sheet was stretched three times in the MD direction (longitudinal direction) at the temperature of 155° C. using the roll longitudinal stretching machine, and a transverse-stretching prior sheet was cut from the stretched sheet and subjected to the stretchability test. As a result, the stretchability acceptances were 20% and 0% respectively in four-time stretching and six-time stretching.

Further, the single-layer extruded sheet obtained by single-layer extrusion was stretched three times in the MD direction (longitudinal direction) at the temperature of 155° C. using the roll longitudinal stretching machine, and then, stretched three times in the TD direction (transverse direction) at the temperature of 155° C. using tenter transverse stretching, and a single-layer extruded reflecting sheet was obtained. The thickness, weighing and density of the obtained single-layer extruded reflecting sheet were respectively 430 µm, 198 g/m$^2$, and 0.44 g/cm$^3$. The MD total reflection index and TD total reflection index of the reflecting sheet were respectively 99.2% and 93.4%, the average total reflection index was 96.3%, and the reflectance anisotropy was 5.8%. Further, the yellowing factor by the light resistance test was 15.

Reference Example 6

The single-layer extruded sheet of Reference Example 5 was stretched in three times in the MD direction (longitudinal direction) at the temperature of 150° C. using the roll longitudinal stretching machine, opposite ends were cut from the longitudinal stretched sheet by 30 mm, and prepared was a transverse-stretching prior sheet with a width of 310 mm. The transverse-stretching prior sheet was subjected to the stretchability test. As a result, the stretchability acceptances were 100% and 80% respectively in four-time stretching and six-time stretching. It is understood that the single-layer extruded sheet needs to be cut in opposite end portions to maintain stretchability. In contrast thereto, in the co-extruded sheet, it is possible to perform transverse stretching in high ratios without cutting the opposite end portions, and to significantly improve the yield.

Example 8

Using 9.2 percent by weight of titanium oxide (TAYCA Corporation, JR600A, average particle size: 250 nm) as an inorganic powder, a two-kind three-layer co-extruded sheet was obtained in the same way as in Example 4. In this case, each raw material was supplied so that the radio of surface layer portion/inner layer portion/surface layer portion=1/10/1, and the co-extruded sheet was prepared. The thickness of the surface layer portion on the upper side of the obtained sheet was 7.1% of the entire thickness. The obtained co-extruded sheet was stretched three times in the MD direction (longitudinal direction) at the temperature of 155° C. using the roll longitudinal stretching machine, and a transverse-stretching prior sheet was cut from the stretched sheet and subjected to the stretchability test. As a result, the stretchability acceptances were 100% in both four-time stretching and six-time stretching.

Further, the co-extruded sheet obtained by co-extrusion was stretched three times in the MD direction (longitudinal direction) at the temperature of 155° C. using the roll longitudinal stretching machine, and then, stretched three times in the TD direction (transverse direction) at the temperature of 155° C. using tenter transverse stretching, and obtained was a two-kind three-layer co-extruded reflecting sheet with the inorganic powder content of 1.47 g/m$^2$. The thickness, weighing and density of the obtained two-kind three-layer reflecting sheet were respectively 411 µm, 201 g/m$^2$, and 0.49 g/cm$^3$. The MD total reflection index and TD total reflection index of the reflecting sheet were respectively 98.6% and 98.4%, the average total reflection index was 98.5%, and the reflectance anisotropy was 0.2%. Further, the yellowing factor by the light resistance test was 2. Furthermore, in this Example, polypropylene was used as the resin of the surface layer portion, titanium oxide was used as the inorganic powder, and the relationship in refractive index was $(n_{1(inorganic)} - n_{2(resin)})/n_{2(resin)} = 0.81$ ($n_1$: refractive index of titanium oxide, $n_2$: refractive index of polypropylene).

Example 9

The co-extruded sheet obtained in Example 8 was stretched three times in the MD direction (longitudinal direction) at the temperature of 155° C. using the roll longitudinal stretching machine, and then, stretched six times in the TD direction (transverse direction) at the temperature of 155° C. using tenter transverse stretching, and obtained was a two-kind three-layer co-extruded reflecting sheet with the inorganic powder content of 0.83 g/m$^2$. The thickness, weighing and density of the obtained two-kind three-layer reflecting sheet were respectively 275 µm, 112 g/m$^2$, and 0.41 g/cm$^3$. The MD total reflection index and TD total reflection index of the reflecting sheet were respectively 98.2% and 98.1%, the average total reflection index was 98.2%, and the reflectance anisotropy was 0.1%. Further, the yellowing factor by the light resistance test was 5. Furthermore, in this Example, polypropylene was used as the resin of the surface layer portion, titanium oxide was used as the inorganic powder, and the relationship in refractive index was $(n_{1(inorganic)} - n_{2(resin)})/n_{2(resin)} = 0.81$ ($n_1$: refractive index of titanium oxide, $n_2$: refractive index of polypropylene).

Example 10

A two-kind three-layer co-extruded sheet was obtained in the same way as in Example 8 except use of 15 percent by weight of titanium oxide (TAYCA Corporation, JR600A, average particle size: 250 nm) as an inorganic powder. In this case, each raw material was supplied so that the radio of surface layer portion/inner layer portion/surface layer portion=1/12/1, and the co-extruded sheet was prepared. The thickness of the surface layer portion on the upper side of the obtained sheet was 6.1% of the entire thickness. The obtained co-extruded sheet was stretched three times in the MD direction (longitudinal direction) at the temperature of 155° C. using the roll longitudinal stretching machine, and a transverse-stretching prior sheet was cut from the stretched sheet and subjected to the stretchability test. As a result, the stretchability acceptances were 100% in both four-time stretching and six-time stretching.

Further, the co-extruded sheet obtained by co-extrusion was stretched three times in the MD direction (longitudinal direction) at the temperature of 155° C. using the roll longitudinal stretching machine, and then, stretched three times in the TD direction (transverse direction) at the temperature of 155° C. using tenter transverse stretching, and obtained was a two-kind three-layer co-extruded reflecting sheet with the inorganic powder content of 2.40 g/m$^2$. The thickness, weighing and density of the obtained two-kind three-layer reflecting sheet were respectively 446 µm, 211 g/m$^2$, and 0.47 g/cm$^3$. The MD total reflection index and TD total reflection index of the reflecting sheet were respectively 98.6% and 98.4%, the average total reflection index was 98.5%, and the reflectance anisotropy was 0.2%. Further, the yellowing factor by the light resistance test was 1. Furthermore, in this Example, polypropylene was used as the resin of the surface layer portion, titanium oxide was used as the inorganic powder, and the relationship in refractive index was $(n_{1(inorganic)} - n_{2(resin)})/n_{2(resin)} = 0.81$ ($n_1$: refractive index of titanium oxide, $n_2$: refractive index of polypropylene).

Example 11

The co-extruded sheet obtained in Example 10 was stretched three times in the MD direction (longitudinal direction) at the temperature of 155° C. using the roll longitudinal stretching machine, and then, stretched five times in the TD direction (transverse direction) at the temperature of 155° C. using tenter transverse stretching, and obtained was a two-kind three-layer co-extruded reflecting sheet with the inorganic powder content of 1.50 g/m². The thickness, weighing and density of the obtained two-kind three-layer reflecting sheet were respectively 351 μm, 142 g/m², and 0.40 g/cm³. The MD total reflection index and TD total reflection index of the reflecting sheet were respectively 98.5% and 98.4%, the average total reflection index was 98.5%, and the reflectance anisotropy was 0.1%. Further, the yellowing factor by the light resistance test was 2. Furthermore, in this Example, polypropylene was used as the resin of the surface layer portion, titanium oxide was used as the inorganic powder, and the relationship in refractive index was $(n_{1(inorganic)}-n_{2(resin)})/n_{2(resin)}=0.81$ ($n_1$: refractive index of titanium oxide, $n_2$:refractive index of polypropylene).

Example 12

The co-extruded sheet obtained in Example 10 was stretched three times in the MD direction (longitudinal direction) at the temperature of 155° C. using the roll longitudinal stretching machine, and then, stretched seven times in the TD direction (transverse direction) at the temperature of 155° C. using tenter transverse stretching, and obtained was a two-kind three-layer co-extruded reflecting sheet with the inorganic powder content of 1.05 g/m². The thickness, weighing and density of the obtained two-kind three-layer reflecting sheet were respectively 264 μm, 92 g/m², and 0.35 g/cm³. The MD total reflection index and TD total reflection index of the reflecting sheet were respectively 98.4% and 98.3%, the average total reflection index was 98.4%, and the reflectance anisotropy was 0.1%. Further, the yellowing factor by the light resistance test was 3. Furthermore, in this Example, polypropylene was used as the resin of the surface layer portion, titanium oxide was used as the inorganic powder, and the relationship in refractive index was $(n_{1(inorganic)}-n_{2(resin)})/n_{2(resin)}=0.81$ ($n_1$: refractive index of titanium oxide, $n_2$:refractive index of polypropylene).

Reference Example 7

Using 1.0 percent by weight of titanium oxide (TAYCA Corporation, JR600A, average particle size: 250 nm) as an inorganic powder, a two-kind three-layer co-extruded sheet was obtained in the same way as in Example 4. In this case, each raw material was supplied so that the radio of surface layer portion/inner layer portion/surface layer portion=1/10/1, and the co-extruded sheet was prepared. The thickness of the surface layer portion on the upper side of the obtained sheet was 7.1% of the entire thickness. The obtained co-extruded sheet was stretched three times in the MD direction (longitudinal direction) at the temperature of 155° C. using the roll longitudinal stretching machine, and a transverse-stretching prior sheet was cut from the stretched sheet and subjected to the stretchability test. As a result, the stretchability acceptances were 100% in both four-time stretching and six-time stretching.

Further, the co-extruded sheet obtained by co-extrusion was stretched three times in the MD direction (longitudinal direction) at the temperature of 155° C. using the roll longitudinal stretching machine, and then, stretched three times in the TD direction (transverse direction) at the temperature of 155° C. using tenter transverse stretching, and obtained was a two-kind three-layer co-extruded reflecting sheet with the inorganic powder content of 0.17 g/m². The thickness, weighing and density of the obtained two-kind three-layer reflecting sheet were respectively 431 μm, 211 g/m², and 0.49 g/cm³. The MD total reflection index and TD total reflection index of the reflecting sheet were respectively 98.9% and 94.1%, the average total reflection index was 96.5%, and the reflectance anisotropy was 4.8%. Further, the yellowing factor by the light resistance test was 11. Furthermore, in this Example, polypropylene was used as the resin of the surface layer portion, titanium oxide was used as the inorganic powder, and the relationship in refractive index was $(n_{1(inorganic)}-n_{2(resin)})/n_{2(resin)}=0.81$ ($n_1$: refractive index of titanium oxide, $n_2$:refractive index of polypropylene).

Reference Example 8

Using 50.0 percent by weight of titanium oxide (TAYCA Corporation, JR600A, average particle size: 250 nm) as an inorganic powder, a two-kind three-layer co-extruded sheet was obtained in the same way as in Example 4. In this case, each raw material was supplied so that the radio of surface layer portion/inner layer portion/surface layer portion=1/3/1, and the co-extruded sheet was prepared. The thickness of the surface layer portion on the upper side of the obtained sheet was 20.6% of the entire thickness. The obtained co-extruded sheet was stretched three times in the MD direction (longitudinal direction) at the temperature of 155° C. using the roll longitudinal stretching machine, and a transverse-stretching prior sheet was cut from the stretched sheet and subjected to the stretchability test. As a result, the stretchability acceptances were 20% and 20% respectively in four-time stretching and six-time stretching.

Further, the co-extruded sheet obtained by co-extrusion was stretched three times in the MD direction (longitudinal direction) at the temperature of 155° C. using the roll longitudinal stretching machine, and then, stretched three times in the TD direction (transverse direction) at the temperature of 155° C. using tenter transverse stretching, and obtained was a two-kind three-layer co-extruded reflecting sheet with the inorganic powder content of 23.0 g/m². The thickness, weighing and density of the obtained two-kind three-layer reflecting sheet were respectively 389 μm, 298 g/m², and 0.77 g/cm³. The MD total reflection index and TD total reflection index of the reflecting sheet were respectively 95.6% and 95.7%, the average total reflection index was 95.7%, and the reflectance anisotropy was −0.1%. Further, the yellowing factor by the light resistance test was 0. Furthermore, in this Example, polypropylene was used as the resin of the surface layer portion, titanium oxide was used as the inorganic powder, and the relationship in refractive index was $(n_{1(inorganic)}-n_{2(resin)})/n_{2(resin)}=0.81$ ($n_1$: refractive index of titanium oxide, $n_2$:refractive index of polypropylene).

Comparative Example 1

Using 10.0 percent by weight of calcium carbonate (Shiraishi Calcium, SOFTON 3200, average particle size: 0.7 μm) as an inorganic powder, a two-kind three-layer co-extruded sheet was obtained in the same way as in Example 4. In this case, each raw material was supplied so that the radio of surface layer portion/inner layer portion/surface layer portion=1/10/1, and the co-extruded sheet was prepared. The thickness of the surface layer portion on the upper side of the obtained sheet was 7.0% of the entire thickness. The obtained co-extruded sheet was stretched three times in the MD direction (longitudinal direction) at the temperature of 155° C. using the roll longitudinal stretching machine, and a transverse-stretching prior sheet was cut from the stretched sheet and subjected to the stretchability test. As a result, the stretchability acceptances were 40% and 20% respectively in four-time stretching and six-time stretching.

Further, the co-extruded sheet obtained by co-extrusion was stretched three times in the MD direction (longitudinal direction) at the temperature of 155° C. using the roll longitudinal stretching machine, and then, stretched three times in the TD direction (transverse direction) at the temperature of 155° C. using tenter transverse stretching, and obtained was a two-kind three-layer co-extruded reflecting sheet with the inorganic powder content of 1.50 g/m². The thickness, weighing and density of the obtained two-kind three-layer reflecting sheet were respectively 413 μm, 200 g/m², and 0.48 g/cm³. The MD total reflection index and TD total reflection index of the reflecting sheet were respectively 98.2% and 94.6%, the average total reflection index was 96.4%, and the reflectance anisotropy was 3.6%. Further, the yellowing factor by the light resistance test was 13. Furthermore, in this Example, polypropylene was used as the resin of the surface layer portion, calcium carbonate was used as the inorganic powder, and the relationship in refractive index was $(n_{1(inorganic)} - n_{2(resin)})/n_{2(resin)} = 0.06$ ($n_1$: refractive index of calcium carbonate, $n_2$: refractive index of polypropylene).

Tables 2 and 3 below show the results obtained in Examples 4 to 12, Reference Examples 3 to 8 and Comparative Example 1, and the other obtained results such as the thicknesses of the inner layer portion and surface layer portion prior to stretching, etc. in this study as described above. It is understood that stretchability is improved by co-extrusion. Further, as can be seen from the tables, by the surface layer portion containing an inorganic powder of $(n_{1(inorganic)} - n_{2(resin)})/n_{2(resin)} \geq 0.20$ in an amount of from 0.3 g/m² to 20 g/m², the reflective performance is enhanced, and the reflection anisotropy and light resistance is significantly improved.

TABLE 2

| | | | Example 4 | Example 5 | Example 6 | Reference Example 3 |
|---|---|---|---|---|---|---|
| | Preparation Method | | Multi-manifold die two-kind three-layer co-extrusion | Multi-manifold die two-kind three-layer co-extrusion | Multi-manifold die two-kind three-layer co-extrusion | Multi-manifold die two-kind three-layer co-extrusion |
| Co-extruded sheet (prior to stretching) | Inner layer portion | Inner layer portion thickness (μm) | 1337 | 1317 | 1346 | 1287 |
| | | Inner layer portion composition | PP/PC = 55/45 w % | PP/PC = 55/45 w % | PP/PC = 55/45 w % | PP/PC = 55/45 w % |
| | Surface layer portion | Surface layer portion thickness | 234/222 | 235/250 | 228/244 | 210/224 |
| | | Surface layer thickness/Total thickness | 13.1%/12.4% | 13.0%/13.9% | 12.5%/13.4% | 12.2%/13.0% |
| | | Surface layer portion composition | PP/TiO2(250 nm) = 95/5 w % | PP/TiO2(35 nm) = 90/10 w % | PP/ZnO(20 nm) = 95/5 w % | PP = 100 w % |
| | Total | Total thickness (μm) | 1793 | 1802 | 1818 | 1721 |
| | Stretchability test | four-time stretchability acceptance | 100% | 100% | 100% | 100% |
| | | Six-time stretchability acceptance | 100% | 100% | 100% | 100% |
| Draw ratio | | Longitudinal stretch ratio | 3 times | 3 times | 3 times | 3 times |
| | | Transverse stretch ratio | 3 times | 3 times | 3 times | 3 times |
| Reflection sheet | Inner layer portion | Inner layer portion thickness (μm) | 342 | 349 | 376 | 356 |
| | | Inner layer portion composition | PP/PC = 55/45 w % | PP/PC = 55/45 w % | PP/PC = 55/45 w % | PP/PC = 55/45 w % |
| | Surface layer portion (one side) | Surface layer portion thickness | 37/30 | 42/42 | 38/39 | 29/29 |
| | | Surface layer portion composition | PP/TiO2(250 nm) = 95/5 w % | PP/TiO2(35 nm) = 90/10 w % | PP/ZnO(20 nm) = 95/5 w % | PP = 100 w % |
| | | Inorganic powder content (g/m2) | 1.85 | 4.2 | 1.9 | 0 |
| | | Surface layer portion $(n_{inorganic} - n_{resin})/n_{resin}$ | 0.81 | 0.81 | 0.31 | — |
| | Total | Thickness (μm) | 409 | 433 | 453 | 414 |
| | | Weighing (g/m²) | 234 | 241 | 268 | 227 |
| | | Density (g/cm³) | 0.57 | 0.56 | 0.59 | 0.55 |
| | Reflection performance | MD total reflection index (%) | 98.6 | 97.9 | 99.1 | 99.6 |
| | | TD total reflection index (%) | 98.4 | 97.7 | 95.8 | 94.5 |
| | | Average total reflection index (%) | 98.5 | 97.8 | 97.5 | 97.1 |
| | Reflection anisotropy (MD – TD, %) | | 0.2 | 0.2 | 3.3 | 5.1 |
| | Light resistance test | Yellowing factor | 2 | 1 | 2 | 14 |

TABLE 2-continued

|  |  |  | Example 7 | Reference Example 4 | Reference Example 5 | Reference Example 6 |
|---|---|---|---|---|---|---|
|  |  | Preparation Method | Multi-manifold die two-kind three-layer co-extrusion | Feed block die two-kind three-layer co-extrusion | Single-layer extrusion | Single-layer extrusion |
| Co-extruded sheet (prior to stretching) | Inner layer portion | Inner layer portion thickness (μm) | 1328 | 1332 | 1424 | 1424 |
|  |  | Inner layer portion composition | PP/PC = 55/45 w % | PP/PC = 55/45 w % | PP/PC = 55/45 w % | PP/PC = 55/45 w % |
|  | Surface layer portion | Surface layer portion thickness | 219/225 | 222/229 | — | — |
|  |  | Surface layer thickness/Total thickness | 12.4%/12.7% | 12.5%/12.8% | — | — |
|  |  | Surface layer portion composition | PP/TiO2(250 nm) = 95/5 w % | PP = 100 w % | — | — |
|  | Total | Total thickness (μm) | 1772 | 1783 | 1424 | 1424 |
|  | Stretchability test | four-time stretchability acceptance | 100% | 100% | 20% | 100% |
|  |  | Six-time stretchability acceptance | 100% | 100% | 0% | 80% |
|  | Draw ratio | Longitudinal stretch ratio | 3 times | 3 times | 3 times |  |
|  |  | Transverse stretch ratio | 3 times | 3 times | 3 times |  |
| Reflection sheet | Inner layer portion | Inner layer portion thickness (μm) | 329 | 351 | 430 |  |
|  |  | Inner layer portion composition | PP/PC = 55/45 w % | PP/PC = 55/45 w % | PP/PC = 55/45 w % |  |
|  | Surface layer portion (one side) | Surface layer portion thickness | 29/31 | 32/32 | — |  |
|  |  | Surface layer portion composition | PP/TiO2(250 nm) = 95/5 w % | PP = 100 w % | — |  |
|  |  | Inorganic powder content (g/m2) | 1.45 | 0 | — |  |
|  |  | Surface layer portion $(n_{inorganic} - n_{resin})/n_{resin}$ | 0.81 | — | — |  |
|  | Total | Thickness (μm) | 389 | 415 | 430 |  |
|  |  | Weighing (g/m$^2$) | 217 | 225 | 190 |  |
|  |  | Density (g/cm$^3$) | 0.56 | 0.54 | 0.44 |  |
|  | Reflection performance | MD total reflection index (%) | 99.1 | 99.0 | 99.2 |  |
|  |  | TD total reflection index (%) | 98.7 | 96.5 | 93.4 |  |
|  |  | Average total reflection index (%) | 98.9 | 97.8 | 96.3 |  |
|  | Reflection anisotropy (MD − TD, %) |  | 0.4 | 2.5 | 5.8 |  |
|  | Light resistance test | Yellowing factor | 3 | 13 | 15 |  |

TABLE 3

|  |  |  | Example 8 | Example 9 | Example 10 | Example 11 |
|---|---|---|---|---|---|---|
|  |  | Preparation Method | Multi-manifold die two-kind three-layer co-extrusion | Multi-manifold die two-kind three-layer co-extrusion | Multi-manifold die two-kind three-layer co-extrusion | Multi-manifold die two-kind three-layer co-extrusion |
| Co-extruded sheet (prior to stretching) | Inner layer portion | Inner layer portion thickness (μm) | 1513 | 1513 | 1641 | 1641 |
|  |  | Inner layer portion composition | PP/PC = 55/45 w % | PP/PC = 55/45 w % | PP/PC = 55/45 w % | PP/PC = 55/45 w % |
|  | Surface layer portion | Surface layer portion thickness (μm) | 127/155 | 127/155 | 116/149 | 116/149 |
|  |  | Surface layer thickness/Total thickness | 7.1%/8.6% | 7.1%/8.6% | 6.1%/7.8% | 6.1%/7.8% |
|  |  | Surface layer portion composition | PP/TiO2(250 nm) = 90.8/9.2 w % | PP/TiO2(250 nm) = 90.8/9.2 w % | PP/TiO2(250 nm) = 85/15 w % | PP/TiO2(250 nm) = 85/15 w % |
|  | Total | Total thickness(μm) | 1794 | 1794 | 1913 | 1913 |
|  | Stretchability test | four-time stretchability acceptance | 100% | 100% | 100% | 100% |
|  |  | Six-time stretchability acceptance | 100% | 100% | 100% | 100% |
|  | Draw Ratio | Longitudinal stretch ratio | 3 times | 3 times | 3 times | 3 times |
|  |  | Transverse stretch ratio | 3 times | 6 times | 3 times | 5 times |

TABLE 3-continued

| Reflection sheet | Inner layer portion | Inner layer portion thickness (μm) | 378 | 256 | 411 | 325 |
|---|---|---|---|---|---|---|
| | | Inner layer portion composition | PP/PC = 55/45 w % | PP/PC = 55/45 w % | PP/PC = 55/45 w % | PP/PC = 55/45 w % |
| | Surface layer portion (one side) | Surface layer portion thickness (μm) | 16/18 | 9/11 | 16/18 | 10/16 |
| | | Surface layer portion composition | PP/TiO2(250 nm) = 90.8/9.2 w % | PP/TiO2(250 nm) = 90.8/9.2 w % | PP/TiO2(250 nm) = 85/15 w % | PP/TiO2(250 nm) = 85/15 w % |
| | | Inorganic powder content (g/m2) | 1.47 | 0.83 | 2.40 | 1.50 |
| | | Surface layer portion $(n_{inorganic} - n_{resin})/n_{resin}$ | 0.81 | 0.81 | 0.81 | 0.81 |
| | Total | Thickness (μm) | 411 | 275 | 446 | 351 |
| | | Weighing (g/m$^2$) | 201 | 112 | 211 | 142 |
| | | Density (g/cm$^3$) | 0.49 | 0.41 | 0.47 | 0.40 |
| | Reflection performance | MD total reflection index (%) | 98.6 | 98.2 | 98.6 | 98.5 |
| | | TD total reflection index (%) | 98.4 | 98.1 | 98.4 | 98.4 |
| | | Average total reflection index (%) | 98.5 | 98.2 | 98.5 | 98.5 |
| | Reflection anisotropy (MD − TD, %) | | 0.2 | 0.1 | 0.2 | 0.1 |
| | Light resistance test | Yellowing factor | 2 | 5 | 1 | 2 |

| | | | Example 12 | Reference Example 7 | Reference Example 8 | Comparative Example 1 |
|---|---|---|---|---|---|---|
| | | Preparation Method | Multi-manifold die two-kind three-layer co-extrusion | Multi-manifold die two-kind three-layer co-extrusion | Multi-manifold die two-kind three-layer co-extrusion | Multi-manifold die two-kind three-layer co-extrusion |
| Co-extruded sheet (prior to stretching) | Inner layer portion | Inner layer portion thickness (μm) | 1641 | 1622 | 1204 | 1576 |
| | | Inner layer portion composition | PP/PC = 55/45 w % | PP/PC = 55/45 w % | PP/PC = 55/45 w % | PP/PC = 55/45 w % |
| | Surface layer portion | Surface layer portion thickness (μm) | 116/149 | 134/141 | 417/401 | 129/147 |
| | | Surface layer thickness/Total thickness | 6.1%/7.8% | 7.1%/7.4% | 20.6%/19.8% | 7.0%/7.9% |
| | | Surface layer portion composition | PP/TiO2(250 nm) = 85/15 w % | PP/TiO2(250 nm) = 99/1 w % | PP/TiO2(250 nm) = 50/50 w % | PP/CaCO$_3$(0.7 μm) = 90/10 w % |
| | Total | Total thickness(μm) | 1913 | 1897 | 2022 | 1852 |
| Stretchability test | | four-time stretchability acceptance | 100% | 100% | 20% | 40% |
| | | Six-time stretchability acceptance | 100% | 100% | 20% | 20% |
| Draw Ratio | | Longitudinal stretch ratio | 3 times | 3 times | 3 times | 3 times |
| | | Transverse stretch ratio | 7 times | 3 times | 3 times | 3 times |
| Reflection sheet | Inner layer portion | Inner layer portion thickness (μm) | 249 | 394 | 301 | 380 |
| | | Inner layer portion composition | PP/PC = 55/45 w % | PP/PC = 55/45 w % | PP/PC = 55/45 w % | PP/PC = 55/45 w % |
| | Surface layer portion (one side) | Surface layer portion thickness (μm) | 7/8 | 17/20 | 46/42 | 15/18 |
| | | Surface layer portion composition | PP/TiO2(250 nm) = 85/15 w % | PP/TiO2(250 nm) = 99/1 w % | PP/TiO2(250 nm) = 50/50 w % | PP/CaCO$_3$(0.7 μm) = 90/10 w % |
| | | Inorganic powder content (g/m2) | 1.05 | 0.17 | 23.0 | 1.50 |
| | | Surface layer portion $(n_{inorganic} - n_{resin})/n_{resin}$ | 0.81 | 0.81 | 0.81 | 0.06 |
| | Total | Thickness (μm) | 264 | 431 | 389 | 413 |
| | | Weighing (g/m$^2$) | 92 | 211 | 298 | 200 |
| | | Density (g/cm$^3$) | 0.35 | 0.49 | 0.77 | 0.48 |
| | Reflection performance | MD total reflection index (%) | 98.4 | 98.9 | 95.6 | 98.2 |
| | | TD total reflection index (%) | 98.3 | 94.1 | 95.7 | 94.6 |
| | | Average total reflection index (%) | 98.4 | 96.5 | 95.7 | 96.4 |
| | Reflection anisotropy (MD − TD, %) | | 0.1 | 4.8 | −0.1 | 3.6 |
| | Light resistance test | Yellowing factor | 3 | 11 | 0 | 13 |

Example 13

Used as an inner layer portion raw material was a raw-material resin of a mixture of 62 percent by volume (55 percent by weight) of a polypropylene resin (Prime Polymer Co., Ltd. E-105GM) and 38 percent by volume (45 percent by weight) of a polycarbonate resin (CHIMEI-ASAHI Corporation WONDERLITE PC110). This raw-material resin was melted using the same-direction rotary two-way extruder with the cylinder diameter of 25 mm and the ratio between the cylinder and the diameter of 48 under operating conditions that the cylinder temperature was 250° C. and that the number of revolutions of the screw was 100 rpm, and supplied to the multi-manifold die via the gear pump with the temperature adjusted to 250° C. Further, used as a surface layer portion raw material was a mixture obtained by blending 85 percent by weight of the polypropylene resin (Prime Polymer Co., Ltd. E-105GM) and 15 percent by weight of titanium oxide (TAYCA Corporation, JR600A, average particle size 250: nm) as an inorganic powder. The mixture was melted using the single-way extruder with the cylinder diameter of 32 mm and the ratio between the cylinder and the diameter of 24 under operating conditions that the cylinder temperature was 210° C. and that the number of revolutions of the screw was 100 rpm, and supplied to the multi-manifold die. Herein, each raw material was supplied to the multi-manifold die so that the ratio of surface layer portion/inner layer portion/surface layer portion=1/15/1, merged, and extruded with the lip width of 400 mm and clearance of 2.0 mm. The extruded melted resin was received in a pair of pinch rollers set for 80° C., the resin was cooled and solidified while the melted resin was stretched in the MD direction, and a two-kind three-layer co-extruded sheet with a thickness of 1.9 mm was obtained.

The obtained co-extruded sheet was stretched 3.0 times in the MD direction (longitudinal direction) at the temperature of 155° C. using the roll longitudinal stretching machine. Next, the sheet was stretched 4.0 times in the TD direction (transverse direction) at the temperature of 155° C. using a tenter transverse stretching machine. Then, the distance between clips was set so that the tenter outlet times were 3.0 times in a heat treatment zone in the back inside the tenter i.e. to shrink by 25% in the transverse direction to apply relaxation heat treatment, and transverse stretching was performed. As a result, obtained was a two-kind three-layer co-extruded reflecting sheet with the inorganic powder content of 2.2 g/m² having voids in the inner layer portion. The thickness, weighing and density of the obtained two-kind three-layer reflecting sheet were respectively 502 μm, 231 g/m², and 0.46 g/cm³. The MD total reflection index and TD total reflection index of the reflecting sheet were respectively 99.3% and 99.0%, the average total reflection index was 99.2% and the reflectance anisotropy was 0.3%. Further, the yellowing factor by the light resistance test was 1. The heat shrinkage percentages of this reflecting sheet were measured, and 12% in the MD direction and 6% in the TD direction. Furthermore, in this Example, polypropylene was used as the resin of the surface layer portion, titanium oxide was used as the inorganic powder, and the relationship in refractive index was $(n_{1(inorganic)}-n_{2(resin)})/n_{2(resin)}=0.81$ ($n_1$: refractive index of titanium oxide, $n_2$: refractive index of polypropylene).

Example 14

The two-kind three-layer co-extruded sheet prepared in Example 13 was stretched 3.0 times in the MD direction (longitudinal direction) at the temperature of 155° C. using the roll longitudinal stretching machine, and next, was stretched 5.0 times in the TD direction (transverse direction) at the temperature of 155° C. using the tenter transverse stretching machine. Then, the distance between clips was set so that the tenter outlet times are 4.0 times in the heat treatment zone in the back inside the tenter i.e. to shrink by 20% in the transverse direction to apply relaxation heat treatment, and transverse stretching was performed. As a result, obtained was a two-kind three-layer co-extruded reflecting sheet with the inorganic powder content of 1.8 g/m² having voids in the inner layer portion. The thickness, weighing and density of the obtained two-kind three-layer reflecting sheet were respectively 426 μm, 174 g/m², and 0.41 g/cm³. The MD total reflection index and TD total reflection index of the reflecting sheet were respectively 99.0% and 98.7%, the average total reflection index was 98.9%, and the reflectance anisotropy was 0.3%. Further, the yellowing factor by the light resistance test was 1. The heat shrinkage percentages of this reflecting sheet were measured, and 11% in the MD direction and 11% in the TD direction. Furthermore, in this Example, polypropylene was used as the resin of the surface layer portion, titanium oxide was used as the inorganic powder, and the relationship in refractive index was $(n_{1(inorganic)}-n_{2(resin)})/n_{2(resin)}=0.81$ ($n_1$: refractive index of titanium oxide, $n_2$: refractive index of polypropylene).

Reference Example 9

Used as an inner layer portion raw material was a raw-material resin of a mixture of 62 percent by volume (55 percent by weight) of a polypropylene resin (Prime Polymer Co., Ltd. E-105GM) and 38 percent by volume (45 percent by weight) of a polycarbonate resin (CHIMEI-ASAHI Corporation WONDERLITE PC110). This raw-material resin was melted using the same-direction rotary two-way extruder with the cylinder diameter of 25 mm and the ratio between the cylinder and the diameter of 48 under operating conditions that the cylinder temperature was 250° C. and that the number of revolutions of the screw was 100 rpm, and supplied to the multi-manifold die via the gear pump with the temperature adjusted to 250° C. Further, used as a surface layer portion raw material was 100 percent by weight of the polypropylene resin (Prime Polymer Co., Ltd. E-105GM) without an adding inorganic powder. The propylene resin was melted using the single-way extruder with the cylinder diameter of 32 mm and the ratio between the cylinder and the diameter of 24 under operating conditions that the cylinder temperature was 210° C. and that the number of revolutions of the screw was 100 rpm, and supplied to the multi-manifold die. Herein, each raw material was supplied to the multi-manifold die so that the ratio of surface layer portion/inner layer portion/surface layer portion=1/6/1, merged, and extruded with the lip width of 400 mm and clearance of 2.0 mm. The extruded melted resin was received in a pair of pinch rollers set for 80° C., the resin was cooled and solidified while the melted resin was stretched in the MD direction, and a two-kind three-layer co-extruded sheet with a thickness of 1.7 mm was obtained.

The obtained co-extruded sheet was stretched 3.0 times in the MD direction (longitudinal direction) at the temperature of 155° C. using the roll longitudinal stretching machine. Next, the sheet was stretched 4.0 times in the TD direction (transverse direction) at the temperature of 155° C. using the tenter transverse stretching machine. Then, the distance between clips was set so that the tenter outlet times are 3.0 times in the heat treatment zone in the back inside the tenter i.e. to shrink by 25% in the transverse direction to apply relaxation heat treatment, and transverse stretching was performed. As a result, obtained was a two-kind three-layer co-extruded reflecting sheet having voids in the inner layer portion. The thickness, weighing and density of the obtained two-kind three-layer reflecting sheet were respectively 424 µm, 215 g/m², and 0.51 g/cm³. The MD total reflection index and TD total reflection index of the reflecting sheet were respectively 99.8% and 95.2%, the average total reflection index was 97.5%, and the reflectance anisotropy was 4.6%. Further, the yellowing factor by the light resistance test was 15. The heat shrinkage percentages of this reflecting sheet were measured, and 12% in the MD direction and 7% in the TD direction.

Example 15

The two-kind three-layer co-extruded sheet prepared in Example 13 was stretched 3.0 times in the MD direction (longitudinal direction) at the temperature of 155° C. using the roll longitudinal stretching machine, and next, stretched 3.0 times in the TD direction (transverse direction) at the temperature of 155° C. using the tenter transverse stretching machine, and a reflecting sheet was prepared without applying the relaxation heat treatment. As a result, obtained was a two-kind three-layer co-extruded reflecting sheet with the inorganic powder content of 4.5 g/m² having voids in the inner layer portion. The thickness, weighing and density of the obtained two-kind three-layer reflecting sheet were respectively 507 µm, 242 g/m², and 0.48 g/cm³. The MD total reflection index and TD total reflection index of the reflecting sheet were respectively 98.6% and 98.2%, the average total reflection index was 98.4%, and the reflectance anisotropy was 0.4%. Further, the yellowing factor by the light resistance test was 1. The heat shrinkage percentages of this reflecting sheet were measured, and 11% in the MD direction and 21% in the TD direction. When compared with Example 13 providing almost same thickness and weighing, it is understood that application of the heat relaxation treatment enables the heat shrinkage percentage to be reduced by 15%, and further enables the average total reflection index to be improved by 0.8%. Further, in this Example, polypropylene was used as the resin of the surface layer portion, titanium oxide was used as the inorganic powder, and the relationship in refractive index was $(n_{1(inorganic)} - n_{2(resin)})/n_{2(resin)} = 0.81$ ($n_1$: refractive index of titanium oxide, $n_2$: refractive index of polypropylene).

Example 16

The two-kind three-layer co-extruded sheet prepared in Example 13 was stretched 3.0 times in the MD direction (longitudinal direction) at the temperature of 155° C. using the roll longitudinal stretching machine, and next, stretched 4.0 times in the TD direction (transverse direction) at the temperature of 155° C. using the tenter transverse stretching machine, and a reflecting sheet was prepared without applying the relaxation heat treatment. As a result, obtained was a two-kind three-layer co-extruded reflecting sheet with the inorganic powder content of 3.5 g/m² having voids in the inner layer portion. The thickness, weighing and density of the obtained two-kind three-layer reflecting sheet were respectively 429 µm, 183 g/m², and 0.43 g/cm³. The MD total reflection index and TD total reflection index of the reflecting sheet were respectively 98.4% and 98.1%, the average total reflection index was 98.3%, and the reflectance anisotropy was 0.3%. Further, the yellowing factor by the light resistance test was 1. The heat shrinkage percentages of this reflecting sheet were measured, and 11% in the MD direction and 25% in the TD direction. When compared with Example 14 providing almost same thickness and weighing, it is understood that application of the heat relaxation treatment enables the heat shrinkage percentage to be reduced by 14%, and further enables the average total reflection index to be improved by 0.6%. Further, in this Example, polypropylene was used as the resin of the surface layer portion, titanium oxide was used as the inorganic powder, and the relationship in refractive index was $(n_{1(inorganic)} - n_{2(resin)})/n_{2(resin)} = 0.81$ ($n_1$: refractive index of titanium oxide, $n_2$: refractive index of polypropylene).

Reference Example 10

The two-kind three-layer co-extruded sheet prepared in Reference Example 9 was stretched 3.0 times in the MD direction (longitudinal direction) at the temperature of 155° C. using the roll longitudinal stretching machine, and next, stretched 3.0 times in the TD direction (transverse direction) at the temperature of 155° C. using the tenter transverse stretching machine, and a reflecting sheet was prepared without applying the relaxation heat treatment. As a result, obtained was a two-kind three-layer co-extruded reflecting sheet having voids in the inner layer portion. The thickness, weighing and density of the obtained two-kind three-layer reflecting sheet were respectively 414 µm, 227 g/m², and 0.55 g/cm³. The MD total reflection index and TD total reflection index of the reflecting sheet were respectively 99.6% and 94.5%, the average total reflection index was 97.1%, and the reflectance anisotropy was 5.1%. Further, the yellowing factor by the light resistance test was 14. The heat shrinkage percentages of this reflecting sheet were measured, and 12% in the MD direction and 22% in the TD direction. When compared with Example 9 providing almost same thickness and weighing, it is understood that application of the heat relaxation treatment enables the heat shrinkage percentage to be reduced by 15%, and further enables the average total reflection index to be improved by 0.4%.

Reference Example 11

A raw-material resin of a mixture of 62 percent by volume (55 percent by weight) of a polypropylene resin (Prime Polymer Co., Ltd. E-105GM) and 38 percent by volume (45 percent by weight) of a polycarbonate resin (CHIMEI-ASAHI Corporation WONDERLITE PC110) was melted using the same-direction rotary two-way extruder with the cylinder diameter of 25 mm and the ratio between the cylinder and the diameter of 48 under operating conditions that the cylinder temperature was 250° C. and that the number of revolutions of the screw was 100 rpm, and extruded from the single-layer sheet die with the lip width of 400 mm and clearance of 1.6 mm via the gear pump with the temperature adjusted to 250° C. The extruded melted resin was received in a pair of pinch rollers set for 80° C., the resin was cooled and solidified while the melted resin was stretched in the extrusion direction, and a single-layer sheet with a thickness of about 1.4 mm was prepared.

The obtained single-layer sheet was stretched 3.0 times in the MD direction (longitudinal direction) at the temperature of 155° C. using the roll longitudinal stretching machine. Next, the sheet was stretched 4.0 times in the TD direction (transverse direction) at the temperature of 155° C. using the tenter transverse stretching machine. Then, the distance between clips was set so that the tenter outlet times are 3.0 times in the heat treatment zone in the back inside the tenter i.e. to shrink by 25% in the transverse direction to apply relaxation heat treatment, and transverse stretching was performed. As a result, obtained was a single-layer reflecting sheet having voids in the inner layer portion. The thickness, weighing and density of the obtained single-layer reflecting sheet were respectively 444 µm, 182 g/m², and 0.41 g/cm³. The MD total reflection index and TD total reflection index of the reflecting sheet were respectively 99.8% and 94.4%, the average total reflection index was 97.1%, and the reflectance anisotropy was 5.4%. Further, the yellowing factor by the light resistance test was 15. The heat shrinkage percentages of this reflecting sheet were measured, and 11% in the MD direction and 7% in the TD direction.

Reference Example 12

The single-layer sheet prepared in Reference Example 11 was stretched 3.0 times in the MD direction (longitudinal direction) at the temperature of 155° C. using the roll longitudinal stretching machine, and then, stretched 3.0 times in the TD direction (transverse direction) at the temperature of 155° C. using the tenter transverse stretching machine, and a reflecting sheet was prepared without applying the relaxation heat treatment. As a result, obtained was a single-layer reflecting sheet having voids in the inner layer portion. The thickness, weighing and density of the obtained single-layer reflecting sheet were respectively 430 µm, 190 g/m², and 0.44 g/cm³. The MD total reflection index and TD total reflection index of the reflecting sheet were respectively 99.2% and 93.4%, the average total reflection index was 96.3%, and the reflectance anisotropy was 5.8%. Further, the yellowing factor by the light resistance test was 15. The heat shrinkage percentages of this reflecting sheet were measured, and 10% in the MD direction and 22% in the TD direction. When compared with Example 11 providing almost same thickness and weighing, it is understood that application of the heat relaxation treatment enables the heat shrinkage percentage to be reduced by 15%, and further enables the average total reflection index to be improved by 0.8%.

Table 4 below shows the results obtained in Examples 13 to 16 and Reference Examples 9 to 12, and the other obtained results such as the thicknesses of the inner layer portion and surface layer portion prior to stretching, etc. As can be seen from theses results, by applying the heat relaxation treatment, dimension stability is drastically improved, while the reflective performance is greatly improved as compared with the reflecting sheets with the thickness and weighing of the similar orders. Further, as can be seen from the table, by the surface layer portion containing an inorganic powder of $(n_{1(inorganic)} - n_{2(resin)})/n_{2(resin)} \geq 0.20$ in an amount of from 0.3 g/m² to 20 g/m², the reflective performance is enhanced, and the reflection anisotropy and light resistance is significantly improved.

TABLE 4

| | | | Example 13 | Example 14 | Reference Example 9 | Example 15 |
|---|---|---|---|---|---|---|
| | | Preparation method | Two-kind three-layer co-extrusion | Two-kind three-layer co-extrusion | Two-kind three-layer co-extrusion | Two-kind three-layer co-extrusion |
| Co-extruded sheet (prior to stretching) | Inner layer portion | Inner layer portion thickness (µm) | 1721 | 1721 | 1287 | 1721 |
| | | Inner layer portion composition | PP/PC = 55/45 w % | PP/PC = 55/45 w % | PP/PC = 55/45 w % | PP/PC = 55/45 w % |
| | Surface layer portion | Surface layer portion thickness (µm) | 102/122 | 102/122 | 210/224 | 102/122 |
| | | Surface layer portion composition | PP/TiO2(250 nm) = 85/15 w % | PP/TiO2(250 nm) = 85/15 w % | PP = 100 w % | PP/TiO2(250 nm) = 85/15 w % |
| | Total | Total thickness (µm) | 1945 | 1945 | 1721 | 1945 |
| Stretchability condition | | Longitudinal stretch ratio (155° C.) | 3 times | 3 times | 3 times | 3 times |
| | | Transverse stretch ratio (155° C.) | 4 times | 5 times | 4 times | 3 times |
| Heat relaxation | | Heat relaxation condition(155° C.) | Transverse 25% shrinkage treatment | Transverse 25% shrinkage treatment | Transverse 25% shrinkage treatment | Without treatment |
| Reflection Sheet | | Inner layer portion thickness (µm) | 474 | 403 | 367 | 478 |
| | | Surface layer portion thickness (µm) | 13/15 | 11/12 | 28/29 | 14/15 |
| | | Surface layer portion inorganic powder content (g/m²) | 2.2 | 1.8 | 0 | 4.5 |
| | | Surface layer portion $(n_{inorganic} - n_{resin})/n_{resin}$ | 0.81 | 0.81 | — | 0.81 |
| | Total | Thickness (µm) | 502 | 426 | 424 | 507 |
| | | Weighing (g/m²) | 231 | 174 | 215 | 242 |
| | | Density (g/cm³) | 0.46 | 0.41 | 0.51 | 0.48 |
| | Reflection performance | MD total reflection index (%) | 99.3 | 99.0 | 99.8 | 98.6 |
| | | TD total reflection index (%) | 99.0 | 98.7 | 95.2 | 98.2 |
| | | Average total reflection index (%) | 99.2 | 98.9 | 97.5 | 98.4 |
| | Reflection anisotropy (MD − TD, %) | | 0.3 | 0.3 | 4.6 | 0.4 |
| | Light resistance test | Yellowing factor | 1 | 1 | 15 | 1 |
| | heat shrinkage percentages (%) | MD | 12 | 11 | 12 | 11 |
| | | TD | 6 | 11 | 7 | 21 |

TABLE 4-continued

|  |  |  | Example 16 | Reference Example 10 | Reference Example 11 | Reference Example 12 |
|---|---|---|---|---|---|---|
|  | Preparation method |  | Two-kind three-layer co-extrusion | Two-kind three-layer co-extrusion | Single-layer extrusion | Single-layer extrusion |
| Co-extruded sheet (prior to stretching) | Inner layer portion | Inner layer portion thickness (μm) | 1721 | 1287 | 1424 | 1424 |
|  |  | Inner layer portion composition | PP/PC = 55/45 w % | PP/PC = 55/45 w % | PP/PC = 55/45 w % | PP/PC = 55/45 w % |
|  | Surface layer portion | Surface layer portion thickness (μm) | 102/122 | 210/224 | — | — |
|  |  | Surface layer portion composition | PP/TiO2(250 nm) = 85/15 w % | PP = 100 w % | — | — |
|  | Total | Total thickness (μm) | 1945 | 1721 | 1424 | 1424 |
| Stretchability condition | Longitudinal stretch ratio (155° C.) |  | 3 times | 3 times | 3 times | 3 times |
|  | Transverse stretch ratio (155° C.) |  | 4 times | 3 times | 4 times | 3 times |
| Heat relaxation | Heat relaxation condition(155° C.) |  | Without treatment | Without treatment | Transverse 25% shrinkage treatment | Without treatment |
| Reflection Sheet | Inner layer portion thickness (μm) |  | 407 | 356 | 444 | 430 |
|  | Surface layer portion thickness (μm) |  | 11/11 | 29/29 | — | — |
|  | Surface layer portion inorganic powder content (g/m$^2$) |  | 3.5 | 0 | — | — |
|  | Surface layer portion ($n_{inorganic} - n_{resin}$)/$n_{resin}$ |  | 0.81 | — | — | — |
|  | Total | Thickness (μm) | 429 | 414 | 444 | 430 |
|  |  | Weighing (g/m$^2$) | 183 | 227 | 182 | 190 |
|  |  | Density (g/cm$^3$) | 0.43 | 0.55 | 0.41 | 0.44 |
| Reflection performance | MD total reflection index (%) |  | 98.4 | 99.6 | 99.8 | 99.2 |
|  | TD total reflection index (%) |  | 98.1 | 94.5 | 94.4 | 93.4 |
|  | Average total reflection index (%) |  | 98.3 | 97.1 | 97.1 | 96.3 |
|  | Reflection anisotropy (MD − TD, %) |  | 0.3 | 5.1 | 5.4 | 5.8 |
| Light resistance test | Yellowing factor |  | 1 | 14 | 15 | 15 |
| heat shrinkage percentages (%) | MD |  | 11 | 12 | 11 | 10 |
|  | TD |  | 25 | 22 | 7 | 22 |

<Die Used in Forming Processing of the Fine Structure Surface and Press Forming Method>

The die used in forming processing of the fine structure surface and press forming method will be described in Reference Example 13, Example 17 and Comparative Examples 2 and 3.

Figure 17:
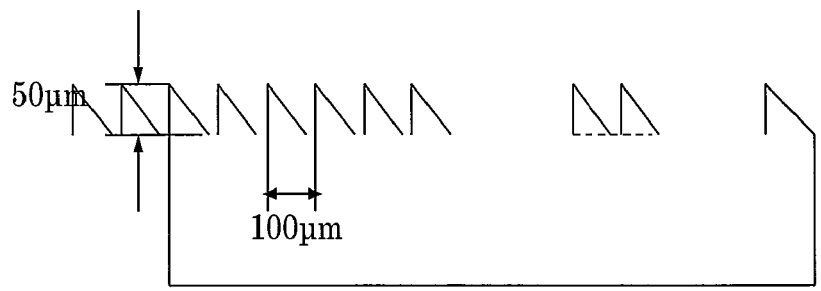
FIG. 17 is a view showing a section of a die used in shaping forming of the invention in Examples.

FIG. 17 is a schematic view showing a section of the forming die used in the Examples. As shown in FIG. 3, the shape of a shaping surface is that the cross-sectional shape including the vertex is a triangle having a vertex angle of 63° C., a length of the bottom of 100 μm and a height of 50 μm, and that such a shape is arranged in the form of a prism regularly in the surface with the same form in one direction in the surface. Used as a die was a flat-plate shape with a shaping surface of 100 mm×100 mm.

Using a compression former with the press surface of 30 cm square, the upper press surface was in a cooling state of 25° C., and the lower press surface was heated to 150° C. The above-mentioned forming die was set on the lower press surface, and after preheating sufficiently with heat of the press surface, a reflecting sheet cut in 120 mm×120 mm prior to forming was set on the die surface and compressed. The compression forming was performed under conditions that the compression time was 5 minutes and that the compression pressure was 50 kg/cm$^2$.

Reference Example 13

As an inner layer portion, a raw-material resin of a mixture of 62 percent by volume (55 percent by weight) of a polypropylene resin (Prime Polymer Co., Ltd. E-105GM) and 38 percent by volume (45 percent by weight) of a polycarbonate resin (CHIMEI-ASAHI Corporation WONDERLITE PC110) was melted using the same-direction rotary two-way extruder with the cylinder diameter of 25 mm and the ratio between the cylinder and the diameter of 48 under operating conditions that the cylinder temperature was 250° C. and that the number of revolutions of the screw was 100 rpm, and introduced to a two-kind three-layer laminate die with the lip width of 400 mm via the gear pump with the temperature adjusted to 250° C. As a surface layer portion, a polypropylene resin (Prime Polymer Co., Ltd. Prime TPO resin E-2900) was melted using a single-way extruder with the cylinder diameter of 30 mm at cylinder 210° C., and was introduced to the two-kind three-layer laminate die via the gear pump with the temperature adjusted to 210° C. In the laminate die, two kinds of resins were laminated and extruded from a sheet die with the lip clearance of 2.0 mm. The extruded melted resin was received in a pair of cooling pinch rollers set for 80° C., the resin was cooled and solidified while the melted resin was stretched in the extrusion direction, and a laminate original sheet with a thickness of 1.9 mm was prepared. The obtained laminate sheet was a three-layer laminate sheet where the inner layer portion was 1.4 mm, and the surface layer portion was 0.25 mm on each of the front and back sides. In addition, the isotactic index (mmmm pentad %) of the polypropylene resin used in the surface layer portion was 66 mole % by 13C-NMR measurement.

The obtained sheet was stretched three times in the stretching direction (MD direction) at the temperature of 155° C. using the roll longitudinal stretching machine, and then, stretched three times in the width direction (TD direction) at the temperature of 155° C. using tenter transverse stretching. Thus obtained was a white sheet stretched by 3×3. The average total reflection index of the white sheet was 97.0%, and the weighing and density of the inner layer portion were respectively 175 g/m$^2$ and 0.46 g/cm$^3$. The total thickness including the surface layer portions was 440 μm. For the thickness of each layer, the surface layer portion was 33 μm, the inner layer portion was 380 μm, and the back-side surface layer portion was 27 μm.

The obtained white sheet was cut into squares of 120 mm×120 mm, compression shaping was formed using the die with the shaping surface as shown in FIG. 17, and obtained was a reflecting sheet with the shaping surface transferred to the surface layer portion. The obtained formed component was a uniform formed component without forming unevenness in the same shape as the die shape.

The weighing of the inner surface portion of the obtained formed component was 175 g/m$^2$, the density of the component was 0.65 g/cm$^3$, the average total reflection index was 96.7% on the shaped surface side, and the reflectance high as a reflecting sheet was maintained after shaping forming. Further, when the angle of reflection of reflected light with respect to incident light was measured using a varied-angle fast spectrophotometer, the strong reflected light was observed in the direction along the shape of the shaped surface, and it is understood that the fine shaping enables the direction of reflected light to be controlled.

Example 17

A white sheet stretched by 3×3 was obtained by stretching in the longitudinal direction and transverse direction, in the same way as in Reference Example 13 except of the surface layer portion where 5.0 percent by weight of titanium oxide (TAYCA Corporation, MS500SAX, average particle size: 35 nm) was added to a polypropylene resin (Prime Polymer Co., Ltd. E-2900) and beforehand pelletized. The average total reflection index of the white sheet was 98.4%, and the weighing and density of the inner layer portion were respectively 178 g/m$^2$ and 0.46 g/cm$^3$. The total thickness including the surface layer portions was 445 μm. For the thickness of each layer, the surface layer portion was 32 μm, the inner layer portion was 390 μm, and the back-side surface layer portion was 23 μm. In addition, the surface layer portion contained 1.6 g/m$^2$ of titanium oxide.

The obtained white sheet was similarly cut into squares of 120 mm×120 mm, compression shaping was performed using the die with the shaping surface as shown in FIG. 17, and obtained was a reflecting sheet with the shaping surface transferred to the surface layer portion. The obtained formed component was a uniform formed component without forming unevenness in the same shape as the die shape.

The weighing of the inner surface portion of the obtained formed component was 175 g/m$^2$, the density of the component was 0.66 g/cm$^2$, and the average total reflection index was 98.0% on the shaped surface side. The reflectance high as a reflecting sheet was maintained after shaping forming, and further, the average total reflection index was improved by 1.3% by the surface layer portion containing titanium oxide. Moreover, similarly, when the angle of reflection of reflected light with respect to incident light was measured using the varied-angle fast spectrophotometer, the strong reflected light was observed in the direction along the shape of the shaped surface.

Comparative Example 2

An original sheet with a thickness of 1.7 mm was prepared using the same polymers and composition as those in the inner layer portion of the reflecting sheet of Reference Example 13 with only the inner layer as a layer structure. Next, as in Reference Example 13, the sheet was stretched in the longitudinal direction and the transverse direction, and a white sheet stretched by 3×3 was obtained. The average total reflection index of the white sheet was 97.5%, the thickness was 470 μm, and the weighing and density of were respectively 220 g/m$^2$ and 0.47 g/cm$^3$.

The obtained white sheet was similarly cut into squares of 120 mm×120 mm, compression shaping was formed using the die with the shaping surface as shown in FIG. 17, and obtained was a reflecting sheet with the shaping surface transferred to the surface layer portion. The obtained formed component had the shaped surface with approximately the same shape as the die shape. However, the flow of the resin was insufficient, portions around the vertex of the triangle were curbed, each side was partially curbed, etc. and the component was a non uniform component.

In addition, the weighing of the obtained formed component was 220 g/m$^2$, the density of the component was 0.7 g/cm$^3$, the average total reflection index was 97.0% on the shaped surface side, and thus, the component had a high value as the reflectance after shaping forming.

Comparative Example 3

An inner layer portion was prepared in the same way as in Reference Example 13 except use of a resin of a mixture of 83.4 percent by volume (50 percent by weight) of a polypropylene resin (Prime Polymer Co., Ltd. E-105GM) and 16.6 percent by volume (50 percent by weight) of barium sulfate (true specific gravity 4.5) with an average particle size of 0.8 μm, a surface layer portion was prepared in the same way as in Example 1, and obtained was a laminate original sheet with a thickness of 1.9 mm that was the same as in Example 1. The obtained laminate sheet was a three-layer laminate sheet with the inner layer portion of 1.4 mm and the surface layer portion of 0.25 mm on each of the front and back sides.

Next, as in Reference Example 13, the sheet was stretched in the longitudinal direction and the transverse direction, and a white sheet stretched by 3×3 was obtained. The average total reflection index of the white sheet was 95.2%.

The obtained white sheet was similarly cut into squares of 120 mm×120 mm, compression shaping was formed using the die with the shaping surface as shown in FIG. 17, and obtained was a reflecting sheet with the shaping surface transferred to the surface layer portion. The obtained shaped surface was a relatively excellent formed surface, but compression was large by voids inside being collapsed, the thickness of the formed sheet was 220 μm. Further, creases occurred partially due to heat shrinkage, and non-uniform portions also appeared partially in the shaped surface. The average total reflection index on the shaped surface side of the formed component was 91.5% and degraded greatly.

<Die Used in Preparing the Reflecting Sheet Having Asperities>

The die used in preparing the reflecting sheet having asperities will be described in Reference Examples 14 and 15, Example 18 and Comparative Example 4.

Figure 18:
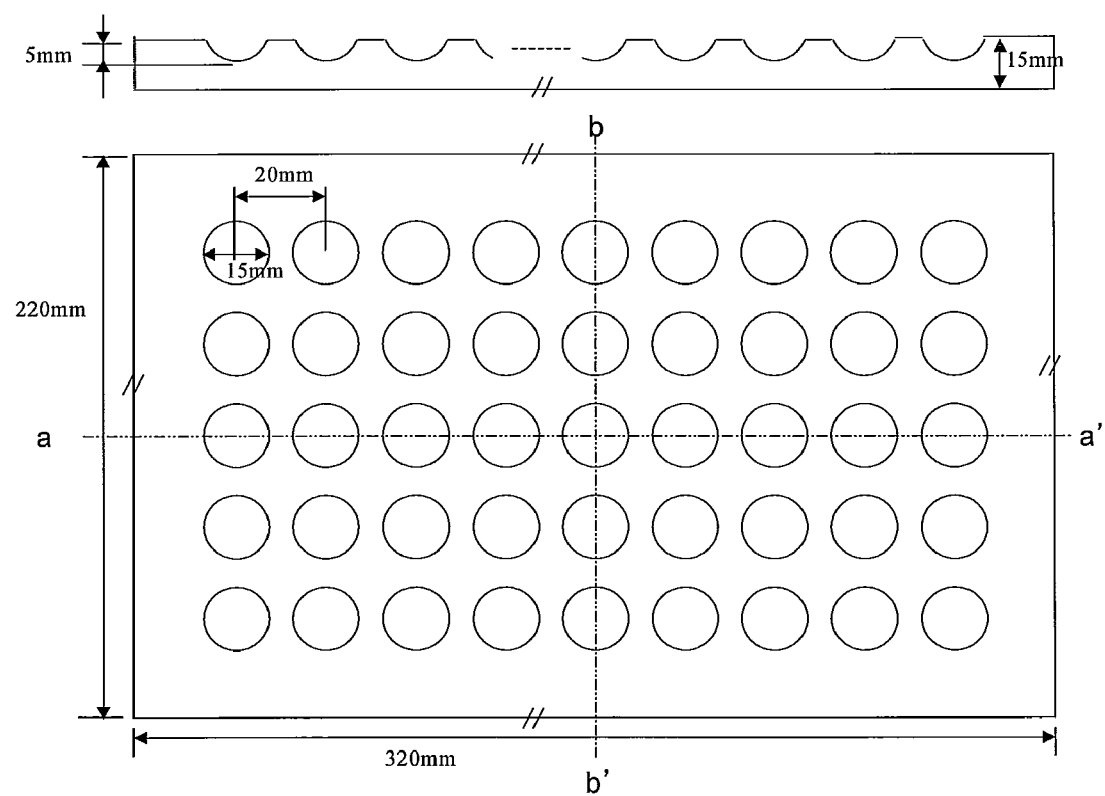
FIG. 18 is a schematic view showing a shape and structure of the die used in manufacturing reflecting sheet formed components of the invention in Reference Example 14.

FIG. 18 is a schematic view of the vacuum forming die used in the Examples. Each arc-shaped concave portion was provided with a suction opening for vacuum forming. Arrangement and shapes of each arc were the same in a-a' cross section and b-b' cross section.

Reference Example 14

A raw-material resin of a mixture of 62 percent by volume (55 percent by weight) of a polypropylene resin (Prime Polymer Co., Ltd. E-105GM) and 38 percent by volume (45 percent by weight) of a polycarbonate resin (CHIMEI-ASAHI Corporation WONDERLITE PC110) was melted using the same-direction rotary two-way extruder with the cylinder diameter of 25 mm and the ratio between the cylinder and the diameter of 48 under operating conditions that the cylinder temperature was 250° C. and that the number of revolutions of the screw was 100 rpm, and extruded from a sheet die with the lip width of 400 mm and the clearance of 1.7 mm via the gear pump with the temperature adjusted to 250° C. The extruded melted resin was received in a pair of cooling pinch rollers set for 80° C., the resin was cooled and solidified while the melted resin was stretched in the extrusion direction, and an original sheet with a thickness of 1.5 mm was obtained.

The obtained sheet was stretched three times in the extrusion direction (MD direction) at the temperature of 155° C. using the roll longitudinal stretching machine, and next, stretched three times in the width direction (TD direction) at the temperature of 155° C. using tenter transverse stretching, and obtained was a white sheet stretched by 3×3. The average total reflection index of the white sheet was 97.0%, the weighing and density were respectively 220 g/m$^2$ and 0.48 g/cm$^3$, and the thickness was 460 μm.

The obtained white sheet was cut into rectangles of 350 mm×250 mm, each side was fixed with a metal frame, and the sheet was set on the vacuum forming die as shown in FIG. 18 heated to 155° C. The sheet was set on the die for 12 seconds, moved to an oven of 155° C., and by opening a vacuum valve 10 seconds later, underwent vacuum forming. The die was removed from the oven 15 seconds later, and the formed component was cooled rapidly using an air gun, and was removed from the die. The obtained formed component was a uniform formed component without creases having semispherical concave portions with the same shape as the shape of the die.

The weighing and density of the obtained formed component were respectively 200 g/m$^2$ and 0.44 g/cm$^3$, and the average total reflection indexes of the sheet were 96.8% on the convex surface side and 96.6% on the concave surface side. It is understood that the reflectance high as a sheet was maintained after providing the concave portions.

Figure 19:
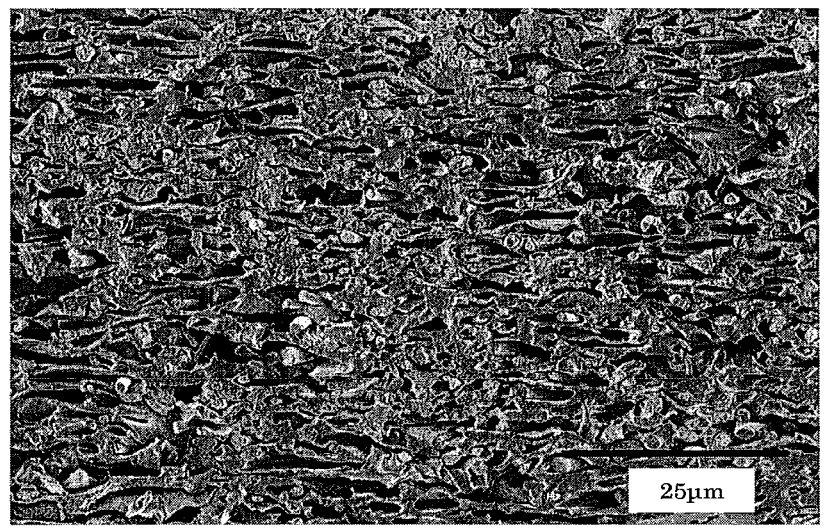
FIG. 19 is a SEM photograph of the center portion of the section of a convex portion of the reflecting sheet obtained in Reference Example 14.

FIG. 19 is a SEM photograph of the center portion of the section of the convex portion of the reflecting sheet obtained in this Example. In the photograph were observed voids, the polycarbonate resin forming island phases dispersed in rod form, and the polypropylene resin forming the sea phase to surround the island phases.

Reference Example 15

The original sheet obtained in Reference Example 14 was similarly stretched three times in the MD direction at the temperature of 155° C. using the roll longitudinal stretching machine, and was next stretched six times in the TD direction at the temperature of 155° C. using tenter transverse stretching, and obtained was a white sheet stretched by 3×6. The average total reflection index of the white sheet was 96.5%, the weighing and density were respectively 95 g/m$^2$ and 0.50 g/cm$^3$, and the thickness was 190 μm.

The obtained white sheet was cut into rectangles of 350 mm×250 mm as in Reference Example 14, and vacuum forming was performed using the same die. The obtained formed component was a uniform formed component without creases having semispherical concave portions with the same shape as the shape of the die.

The weighing and density of the obtained formed component were respectively 90 g/m$^2$ and 0.55 g/cm$^3$, and the average total reflection indexes of the sheet were 95.7% on the convex surface side and 96.0% on the concave surface side. It is understood that the reflectance high as a sheet was maintained after providing the concave portions.

Example 18

The resin with the same component as in Reference example 14 was used using the extruder in Reference Example 14 as a main extruder. Used as a sub-extruder was the single-way extruder with the cylinder diameter of 32 mm and the ratio between the cylinder and the diameter of 24. Co-extrusion was performed using a beforehand palletized mixture resin of 98 percent by volume (90 percent by weight) of a polypropylene resin (Prime Polymer Co., Ltd. E-105GM) and 2 percent by volume (10 percent by weight) of a zinc oxide powder (Sakai Chemical Industry Co., Ltd. Trade name: Nanofine-50SD). The cylinder temperature of the sub-extruder was 210° C., and the number of revolutions of the screw was 60 rpm to perform extrusion. As a laminate die, a two-kind three-layer feed block die was used, the lip width of the die outlet was 300 mm, and the clearance was 2.0 mm. The melted resin extruded from the die was similarly received in cooling pinch rollers set for 80° C., and prepared was a laminate original sheet with an entire thickens of 1.8 mm. In a layer structure of the obtained original sheet, a core layer as a reflecting sheet was 1340 μm, and the surface layer portion was 230 μm on each of the front and back sides.

The obtained laminate sheet was stretched three times in the stretching direction (MD direction) at the temperature of 155° C. using the roll longitudinal stretching machine, and was next stretched three times in the width direction (TD direction) at the temperature of 155° C. using tenter transverse stretching, and obtained was a white sheet stretched by 3×3. The average total reflection index of the white sheet was 96.8%, the thickness of the core layer as a reflecting sheet was 390 μm, and the surface layer portion was 25 μm on each of the front and back sides. The weighing and density of the reflecting sheet were respectively 180 g/m$^2$ and 0.46 g/cm$^3$.

The obtained white sheet was cut into rectangles of 350 mm×250 mm as in Reference Example 14, and vacuum forming was performed using the same die. The obtained formed component was a uniform formed component with the same shape as the shape of the die without creases.

The weighing and density of the obtained formed component were respectively 175 g/m$^2$ and 0.50 g/cm$^3$, and the average total reflection indexes of the sheet were 96.1% on the convex surface side and 96.4% on the concave surface side. It is understood that the reflectance high as a sheet was maintained after providing the concave portions.

Comparative Example 4

A raw-material resin of a mixture of 83.4 percent by volume (50 percent by weight) of a polypropylene resin (Prime Polymer Co., Ltd. E-105GM) and 16.6 percent by volume (50 percent by weight) of barium sulfate (true specific gravity 4.5) with an average particle size of 0.8 µm was melted using the two-way extruder in Example 1 under operating conditions that the cylinder temperature was 250° C. and that the number of revolutions of the screw was 100 rpm, and extruded from a single-layer die with the lip width of 400 mm and the clearance of 1.7 mm via the gear pump with the temperature adjusted to 250° C. The extruded melted resin was similarly received in a pair of pinch rollers set for 80° C., cooled and solidified, and a sheet with a thickness of 1.5 mm was prepared.

The obtained sheet was stretched three times in the extrusion direction (MD direction) at the temperature of 155° C. using the roll longitudinal stretching machine, and next stretched three times in the width direction (TD direction) at the temperature of 155° C. using tenter transverse stretching, and obtained was a white sheet stretched by 3×3. The average total reflection index of the white sheet was 95.0%, the weighing and density were respectively 410 g/m$^2$ and 1.24 g/cm$^3$, and the thickness was 330 µm.

The obtained white sheet was cut into rectangles of 350 mm×250 mm as in Reference Example 14, and vacuum forming was performed using the same die with the same operation except the forming temperature of 150° C. In the obtained formed component, creases occurred partially, the concave portion was stretched and thinner, the transparency obviously increases, and it was understood that the reflective performance apparently deteriorated as compared with the flat portions.

<Die Used in Preparing the Reflecting Sheet Having a Plurality of Concave Portions and Hole Portions to Expose Emitters>

Figure 20:
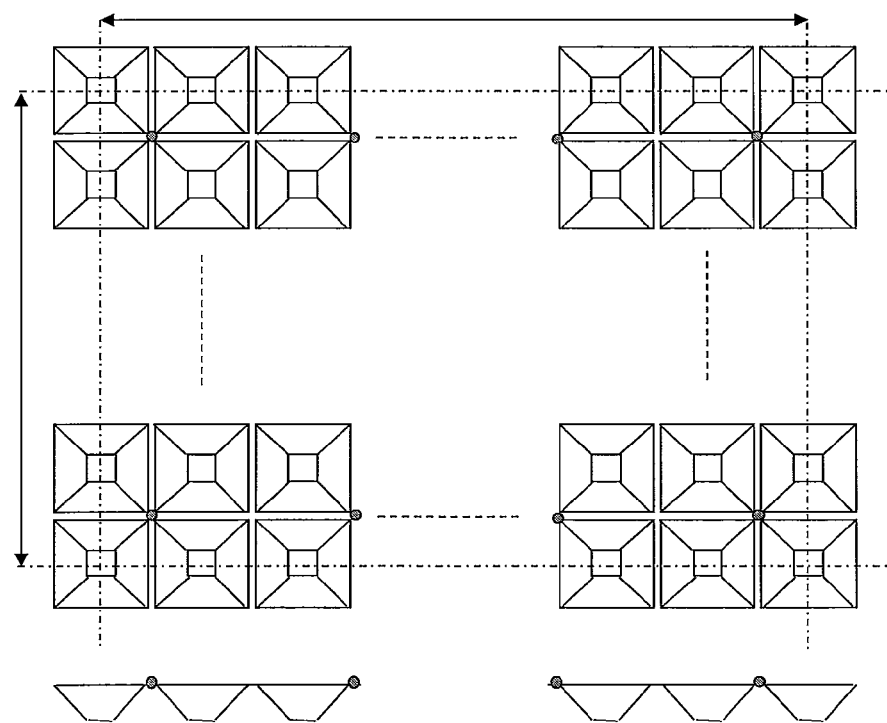
FIG. 20 is a schematic view of a die used in forming the reflecting sheet according to the invention.

FIG. 20 shows a schematic view of the vacuum forming die used in the Examples. Each opening portion is a square with 25 mm sides, the bottom is a square with 8 mm sides, and the die is comprised of 12 opening portions in the transverse direction and 8 opening portions in the longitudinal direction. The widths of the ridge lines are all 1.2 mm. The semi-ellipse-shape bulge portion with a diameter of the bottom of 1.6 mm and a height of 1.6 mm is provided in every two positions where the ridge lines intersect one another. Each side surface of the reflecting surface and bottom of the concave portion are provided with suction openings for vacuum forming. In addition, a die of the same dimensions except no bulge portions was prepared to compare.

<LED Backlight Used in Implementation of the Reflecting Sheet Having a Plurality of Concave Portions and Hole Portions to Expose Emitters>

Used was an LED backlight with 12×8 OPTEK Technology LED lamps with RGB as a single package installed in the positions to place LEDs in the above-mentioned die.

Reference Example 16

A raw-material resin of a mixture of 62 percent by volume (55 percent by weight) of a polypropylene resin (Prime Polymer Co., Ltd. E-105GM) and 38 percent by volume (45 percent by weight) of a polycarbonate resin (CHIMEI-ASAHI Corporation WONDERLITE PC110) was melted using the same-direction rotary two-way extruder with the cylinder diameter of 25 mm and the ratio between the cylinder and the diameter of 48 under operating conditions that the cylinder temperature was 250° C. and that the number of revolutions of the screw was 100 rpm, and extruded from the sheet die with the lip width of 400 mm and the clearance of 1.7 mm via the gear pump with the temperature adjusted to 250° C. The extruded melted resin was received in a pair of cooling pinch rollers set for 80° C., the resin was cooled and solidified while the melted resin was stretched in the extrusion direction, and an original sheet with a thickness of 1.5 mm was prepared.

Figure 21:
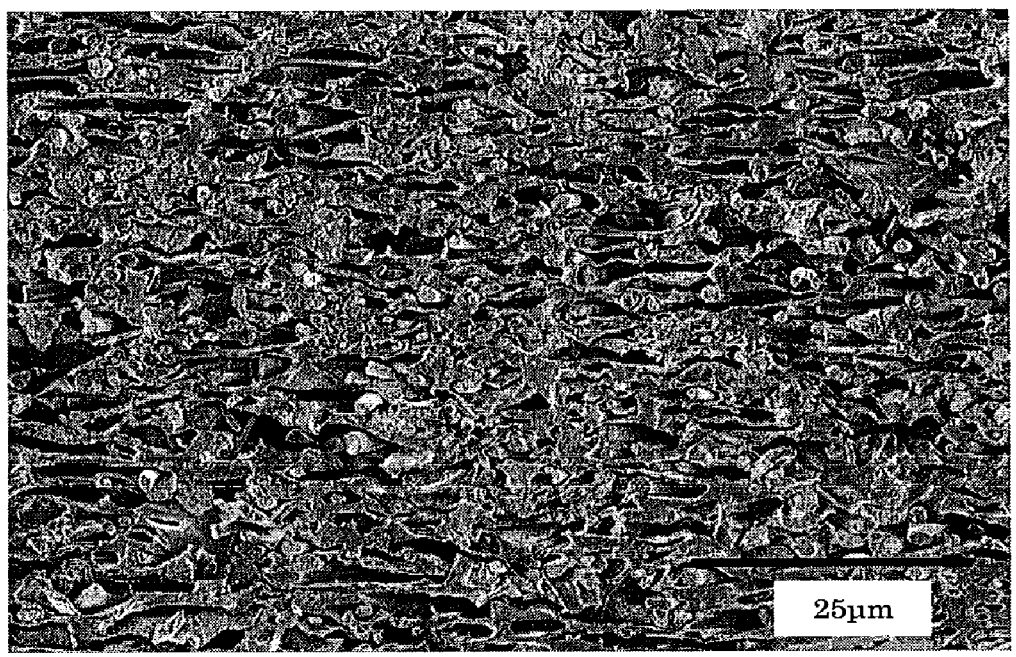
FIG. 21 is a SEM photograph of the section of a white sheet of Reference Example 16.

The obtained sheet was stretched three times in the extrusion direction (MD direction) at the temperature of 155° C. using the roll longitudinal stretching machine, and next stretched three times in the width direction (TD direction) at the temperature of 155° C. using tenter transverse stretching, and obtained was a white sheet stretched by 3×3. The average total reflection index of the white sheet was 97.0%, the weighing and density were respectively 220 g/m$^2$ and 0.48 g/cm$^3$, and the thickness was 460 µm. The white sheet was cut in cross section perpendicular to the MD direction for SEM observation, and the structure having hole portions inside was observed (FIG. 21).

The obtained white sheet was cut into rectangles of 400 mm×300 mm, each side was fixed with a metal frame, and the sheet was set on the vacuum forming die as shown in FIG. 20 heated to 155° C. The sheet was set on the die for 12 seconds, moved to the oven of 155° C., and by opening the vacuum valve 10 seconds later, underwent vacuum forming. The die was removed from the oven 15 seconds later, and the formed component was cooled rapidly using an air gun, and was removed from the die. The obtained formed component was a uniform formed component with the same shape as the shape of the die without creases.

A hole of 7.5 mm×7.5 mm square for the LED lamp was made in the center portion in the bottom of the each concave portion of the obtained shaped component, and the component was set on the LED backlight. Further, a diffusion plate with a thickness of 2 mm used in commercially available liquid crystal display devices was stacked on the shaped component. After lighting the lamp, the light passed through the diffusion plate was diffused almost uniformly, lamp images were not in sight absolutely, and images of lattice-shaped ridge lines and the bulge portions of the reflecting sheet were reduced greatly, and were suppressed to the extent of being ignored.

Comparative Example 5

The sheet obtained in Reference Example 16 was similarly cut into rectangles 400 mm×300 mm, vacuum forming was performed using the die without bulge portions prepared to compare, and obtained an excellent shaped component without the bulge portions.

Similarly, holes were made for LED lamps, and the component was set on the LED backlight. Further, a diffusion plate with a thickness of 2 mm was similarly stacked on the shaped component. After lighting the lamp, the light passed through the diffusion plate was diffused almost uniformly, lamp images were also of a level of being hard in sight, but images of the lattice-shaped ridge lines of the reflecting sheet were clearly observed, and it was observed that the ridge lines were the shade.

Example 19

The resin with the same component as in Reference example 14 was used using the extruder in Reference Example 16 as a main extruder. Used as a sub-extruder was the single-way extruder with the cylinder diameter of 32 mm and the ratio between the cylinder and the diameter of 24. Co-extrusion was performed using a beforehand palletized mixture resin of 98 percent by volume (90 percent by weight) of a polypropylene resin (Prime Polymer Co., Ltd. E-105GM)

and 2 percent by volume (10 percent by weight) of titanium oxide (TAYCA Corporation, Trade Name: JR600-A, average particle size: 250 nm, true specific gravity: 4.2). The cylinder temperature of the sub-extruder was 210° C., and the number of revolutions of the screw was 60 rpm to perform extrusion. As a laminate die, the two-kind three-layer feed block die was used, the lip width of the die outlet was 300 mm, and the clearance was 2.0 mm. The melted resin extruded from the die was similarly received in cooling pinch rollers set for 80° C., and prepared was a laminate original sheet with an entire thickens of 1.8 mm. In a layer structure of the obtained original sheet, a core layer as a reflecting sheet was 1340 μm, and the surface layer portion was 230 μm on each of the front and back sides.

The obtained laminate sheet was stretched three times in the extrusion direction (MD direction) at the temperature of 155° C. using roll longitudinal stretching machine, and was next stretched three times in the width direction (TD direction) at the temperature of 155° C. using tenter transverse stretching, and obtained was a white sheet stretched by 3×3. The average total reflection index of the white sheet was 96.8%, the thickness of the core layer was 390 μm, and the surface layer portion was 25 μm on each of the front and back sides. The weighing and density of the sheet were respectively 180 g/m² and 0.46 g/cm³.

The obtained white sheet was cut into rectangles of 400 mm×300 mm as in Reference Example 16, and each side was fixed with a metal frame, and the sheet was set on the vacuum forming die as shown in FIG. 20 heated to 155° C. The sheet was set on the die for 12 seconds, moved to the oven of 155° C., and by opening the vacuum valve 10 seconds later, underwent vacuum forming. The die was removed from the oven 15 seconds later, and the formed component was cooled rapidly using an air gun, and was removed from the die. The obtained formed component was a uniform formed component with the same shape as the shape of the die without creases.

A hole of 7.5 mm×7.5 mm square for the LED lamp was made in the center portion in the bottom of the each concave portion of the obtained shaped component as in Example 19, and the component was set on the LED backlight. Further, a diffusion plate with a thickness of 2 mm used in commercially available liquid crystal display devices was stacked on the shaped component. After lighting the lamp, the light passed through the diffusion plate was diffused almost uniformly, lamp images were not in sight absolutely, and images of the lattice-shaped ridge lines and the bulge portions of the reflecting sheet were reduced greatly, and were suppressed to the extent of being ignored.

INDUSTRIAL APPLICABILITY

The reflecting sheet of the invention suppresses anisotropy in reflectance, exhibits high reflectance, is low in yellowing due to light, provided with weight reduction, and can be suitably used in a backlight of the liquid crystal display device.

The invention claimed is:
1. A reflecting sheet including at least a surface layer portion and an inner layer portion,
wherein the surface layer portion contains at least 0.3 g/m² to 20 g/m² of an inorganic powder and a polyolefin resin (C), the inner layer portion contains a polyolefin resin (A) and at least one kind of resins (B) incompatible with the polyolefin resin (A) at temperatures enabling stretching of the polyolefin resin (A), the surface layer portion meets $(n_1-n_2)/n_2 \geqq 0.20$ ($n_1$: refractive index of the inorganic powder, $n_2$: refractive index of the polyolefin resin (C)), and the inner layer portion has voids; and
an average total reflection index is 90% or more, and assuming that the total reflection index is $R_1$ in the direction in which the total reflection index is the maximum and that the total reflection index is $R_2$ in the direction perpendicular to the direction of $R_1$, the sheet has anisotropy of the total reflection index of 2.0% or less, the anisotropy being a difference between $R_1$ and $R_2$.

2. The reflecting sheet according to claim 1, wherein the inorganic powder includes zinc oxide and/or titanium oxide.

3. The reflecting sheet according to claim 1, wherein the modulus of elasticity of the resins (B) is higher the modulus of elasticity of the polyolefin resin (A).

4. The reflecting sheet according to claim 1, wherein the resins (B) include polycarbonate resins.

5. The reflecting sheet according to claim 1, wherein the polyolefin resin (A) is a polypropylene resin.

6. The reflecting sheet according to claim 1, wherein the polyolefin resin (C) is a polypropylene resin.

7. The reflecting sheet according to claim 1, wherein a content of the polyolefin resin (A) in the inner layer portion ranges from 30 percent to 80 percent by weight, and a content of the resins (B) in the inner layer portion ranges from 20 percent to 70 percent by weight.

8. The reflecting sheet according to claim 1, wherein the surface layer portion contains 80 percent by volume or more of the polyolefin resin (C).

9. The reflecting sheet according to claim 1, wherein a density ranges from 0.1 g/cm³ to 0.75 g/cm³.

10. The reflecting sheet according to claim 9, wherein the density ranges from 0.15 g/cm³ to 0.5 g/cm³.

11. The reflecting sheet according to claim 1, wherein the average total reflection index is 95% or more.

12. The reflecting sheet according to claim 1, wherein a structure of the reflecting sheet is a three-layer structure of surface layer portion/inner layer portion/surface layer portion.

13. The reflecting sheet according to claim 1, wherein entire weighing of the reflecting sheet ranges from 10 g/m² to 500 g/m².

14. The reflecting sheet according to claim 1, wherein a thickness of the surface layer portion ranges from 2 μm to 90 μm.

15. The reflecting sheet according to claim 1, wherein a yellowing factor is 10 or less in a high pressure mercury lamp light resistance test.

16. The reflecting sheet according to claim 1, wherein a heat shrinkage percentage at 150° C. for 30 minutes is 15% or less in each of the longitudinal direction (MD) and the transverse direction (TD).

17. The reflecting sheet according to claim 1, wherein the surface layer portion has a fine three-dimensional structure surface.

18. The reflecting sheet according to claim 17, wherein an isotactic index (mmmm pentad %) of the polyolefin resin (C) in the surface layer portion ranges from 55 mole % to 85 mole %.

19. The reflecting sheet according to claim 17, wherein the fine three-dimensional structure surface is a reflecting surface to control reflection directions.

20. The reflecting sheet according to claim 17, wherein a section including a vertex of a single structure constituting the fine three-dimensional structure surface is substantially a triangle, and a vertex angle ranges from 30° to 150°.

21. The reflecting sheet according to claim 20, wherein a base of the triangle ranges from 10 μm to 1000 μm, and a height of the triangle ranges from 10 μm to 150 μm.

22. The reflecting sheet according to claim 17, wherein the fine three-dimensional structure surface is formed by heat forming.

23. The reflecting sheet according to claim 1, wherein the reflecting sheet has convex portions at least on one of main surfaces.

24. The reflecting sheet according to claim 23, wherein a shape of each of the convex portions includes at least a part of a spherical form or a poly-sided pyramid form, and a form where the vertex of a poly-sided pyramid is made flat or arc form.

25. The reflecting sheet according to claim 23, wherein the shape is obtained by heat forming.

26. The reflecting sheet according to claim 1, wherein the reflecting sheet has a plurality of concave portions and ridge lines among the concave portions, each of the concave portions has a bottom having a hole portion to expose an emitter, and reflecting surfaces connecting the bottom and the ridge lines, and the reflecting sheet has a plurality of bulge portions on the ridge lines.

27. The reflecting sheet according to claim 26, wherein each of the bulge portions is formed of a part of a semi-sphere, a sphere or an elliptic sphere.

28. The reflecting sheet according to claim 26, wherein the bulge portions are provided in positions where the ridge lines intersect one another.

29. The reflecting sheet according to claim 26, wherein a height of each of the bulge portions ranges from $1/20$ to $1/2$ a depth of each of the bulge portions.

30. The reflecting sheet according to claim 26, wherein a width of each of the ridge lines ranges from $1/100$ to $1/5$ the maximum width of each of the concave portions.

31. The reflecting sheet according to claim 26, wherein the shape of each of the concave portions is a polygon in a planar view.

32. The reflecting sheet according to claim 26, wherein a shape of each of the concave portions is a rectangle in a planar view, and each of the bulge portions is provided in a position where the ridge lines intersect one another.

33. A manufacturing method of a reflecting sheet having at least a surface layer portion and an inner layer portion, comprising the steps of:
(i) co-extruding a resin component (a) containing a polyolefin resin (A) and at least one kind of resins (B) incompatible with the polyolefin resin (A) at temperatures enabling stretching of the polyolefin resin (A), and a resin composition (b) containing at least a polyolefin resin (C) and an inorganic powder, and
(ii) performing two-way stretching on a sheet obtained in step (i) to cleave,
wherein $(n_1-n_2)/n_2 \geq 0.20$ ($n_1$: refractive index of the inorganic powder, $n_2$: refractive index of the polyolefin resin (C)) is met,
wherein the surface layer portion contains at least 0.3 g/m² to 20 g/m² of the inorganic powder and the polyolefin resin (C), the inner layer portion contains the polyolefin resin (A) and the least one kind of resins (B), and the inner layer portion has voids; and
an average total reflection index is 90% or more, and assuming that the total reflection index is $R_1$ in the direction in which the total reflection index is the maximum and that the total reflection index is $R_2$ in the direction perpendicular to the direction of $R_1$, the sheet has anisotropy of the total reflection index of 2.0% or less, the anisotropy being a difference between $R_1$ and $R_2$.

34. The manufacturing method of the reflecting sheet according to claim 33, wherein the reflecting sheet has a three-layer structure, the resin composition (b) is supplied to a die as a raw material of the surface layer portion, and the resin composition (a) is supplied to the die as a raw material of the inner layer portion to perform co-extrusion.

35. The manufacturing method of the reflecting sheet according to claim 33, wherein the inorganic powder is contained in an amount of from 2 percent to 70 percent by weight relative to the resin composition (b) in the surface layer portion.

36. The manufacturing method of the reflecting sheet according to claim 33, wherein the inorganic powder includes zinc oxide and/or titanium oxide.

37. The manufacturing method of the reflecting sheet according to claim 33, wherein the modulus of elasticity of the resins (B) is higher the modulus of elasticity of the polyolefin resin (A).

38. The manufacturing method of the reflecting sheet according to claim 33, wherein the resins (B) are polycarbonate resins.

39. The manufacturing method of the reflecting sheet according to claim 33, wherein the polyolefin resin (A) is a polypropylene resin.

40. The manufacturing method of the reflecting sheet according to claim 33, wherein the polyolefin resin (C) is a polypropylene resin.

41. The manufacturing method of the reflecting sheet according to claim 33, wherein the polyolefin resin (A) is in an amount of from 30 percent to 80 percent by weight relative to the resin composition (a).

42. The manufacturing method of the reflecting sheet according to claim 33, wherein a thickness of the surface layer portion of the sheet obtained in step (i) ranges from 10 μm to 400 μm, and a thickness of the inner layer portion ranges from 50 μm to 4000 μm.

43. The manufacturing method of the reflecting sheet according to claim 33, wherein a thickness of the surface layer portion of the sheet obtained in step (i) ranges from 1% to 20% of the thickness of the sheet obtained in step (i).

44. The manufacturing method of the reflecting sheet according to claim 33, wherein a stretch ratio in the two-way stretching is 1.5 time or more in each of the MD direction and the TD direction, and an area stretch ratio ranges from 3 times to 50 times.

45. The manufacturing method of the reflecting sheet according to claim 33, further comprising the step of:
(iii) applying heat shrinkage of 10% or more in at least one of the longitudinal direction (MD) and the transverse direction (TD) to the sheet obtained in step (ii).

46. The manufacturing method of the reflecting sheet according to claim 45, wherein heat shrinkage of 20% or more is applied to the sheet obtained in step (ii) in at least one direction of the sheet.

47. The manufacturing method of the reflecting sheet according to claim 45 or 46, wherein the two-way stretching is longitudinal-transverse successive two-way stretching, the relationship in stretch ratio between the longitudinal direction (MD) and the transverse direction (TD) is MD≦TD, and after performing transverse stretching, relaxation heat treatment is applied to the sheet to cause heat shrinkage of 10% or more in the transverse direction relative to the transverse stretch ratio at temperatures near a transverse stretching temperature.

48. The manufacturing method of the reflecting sheet according to claim 47, wherein after performing the transverse stretching, relaxation heat treatment is applied to cause heat shrinkage of 20% or more in the transverse direction relative to the transverse stretch ratio at temperatures near the transverse stretching temperature.

49. A reflecting sheet including at least a surface layer portion and an inner layer portion,
wherein the surface layer portion contains at least 0.3 g/m² to 20 g/m² of an inorganic powder and a polyolefin resin (C), the inner layer portion contains a polyolefin resin (A) and at least one kind of resins (B) incompatible with the polyolefin resin (A) at temperatures enabling stretching of the polyolefin resin (A), the surface layer portion meets $(n_1-n_2)/n_2 \geq 0.20$ ($n_1$: refractive index of the inorganic powder, $n_2$: refractive index of the polyolefin resin (C)), and the inner layer portion has voids; and
a yellowing factor of said reflecting sheet is 10 or less in a high pressure mercury lamp light resistance test.

50. A reflecting sheet including at least a surface layer portion and an inner layer portion,
wherein the surface layer portion contains at least 0.3 g/m² to 20 g/m² of an inorganic powder and a polyolefin resin (C), the inner layer portion contains a polyolefin resin (A) and at least one kind of resins (B) incompatible with the polyolefin resin (A) at temperatures enabling stretching of the polyolefin resin (A), the surface layer portion meets $(n_1-n_2)/n_2 \geq 0.20$ ($n_1$: refractive index of the inorganic powder, $n_2$: refractive index of the polyolefin resin (C)), and the inner layer portion has voids; and
a heat shrinkage percentage at 150° C. for 30 minutes of said reflecting sheet is 15% or less in each of the longitudinal direction (MD) and the transverse direction (TD).

51. A reflecting sheet including at least a surface layer portion and an inner layer portion,
wherein the surface layer portion contains at least 0.3 g/m² to 20 g/m² of an inorganic powder and a polyolefin resin (C), the inner layer portion contains a polyolefin resin (A) and at least one kind of resins (B) incompatible with the polyolefin resin (A) at temperatures enabling stretching of the polyolefin resin (A), the surface layer portion meets $(n_1-n_2)/n_2 \geq 0.20$ ($n_1$: refractive index of the inorganic powder, $n_2$: refractive index of the polyolefin resin (C)), and the inner layer portion has voids; and
the surface layer portion has a fine three-dimensional structure surface, and an isotactic index (mmmm pentad %) of the polyolefin resin (C) in the surface layer portion ranges from 55 mole % to 85 mole %.

52. The reflecting sheet according to claim 51, wherein the fine three-dimensional structure surface is a reflecting surface to control reflection directions.

53. The reflecting sheet according to claim 51, wherein a section including a vertex of a single structure constituting the fine three-dimensional structure surface is substantially a triangle, and a vertex angle ranges from 30° to 150°.

54. The reflecting sheet according to claim 51, wherein a base of the triangle ranges from 10 μm to 1000 μm, and a height of the triangle ranges from 10 μm to 150 μm.

55. The reflecting sheet according to claim 53, wherein the fine three-dimensional structure surface is formed by heat forming.

56. A reflecting sheet including at least a surface layer portion and an inner layer portion,
wherein the surface layer portion contains at least 0.3 g/m² to 20 g/m² of an inorganic powder and a polyolefin resin (C), the inner layer portion contains a polyolefin resin (A) and at least one kind of resins (B) incompatible with the polyolefin resin (A) at temperatures enabling stretching of the polyolefin resin (A), the surface layer portion meets $(n_1-n_2)/n_2 \geq 0.20$ ($n_1$: refractive index of the inorganic powder, $n_2$: refractive index of the polyolefin resin (C)), and the inner layer portion has voids; and
the surface layer portion has a fine three-dimensional structure surface, and section including a vertex of a single structure constituting the fine three-dimensional structure surface is substantially a triangle, and a vertex angle ranges from 30° to 150°.

57. The reflecting sheet according to claim 56, wherein a base of the triangle ranges from 10 μm to 1000 μm, and a height of the triangle ranges from 10 μm to 150 μm.

58. The reflecting sheet according to claim 56, wherein the fine three-dimensional structure surface is formed by heat forming.

59. A reflecting sheet including at least a surface layer portion and an inner layer portion,
wherein the surface layer portion contains at least 0.3 g/m² to 20 g/m² of an inorganic powder and a polyolefin resin (C), the inner layer portion contains a polyolefin resin (A) and at least one kind of resins (B) incompatible with the polyolefin resin (A) at temperatures enabling stretching of the polyolefin resin (A), the surface layer portion meets $(n_1-n_2)/n_2 \geq 0.20$ ($n_1$: refractive index of the inorganic powder, $n_2$: refractive index of the polyolefin resin (C)), and the inner layer portion has voids; and
said reflecting sheet has convex portions at least on one of main surfaces and shape of each of the convex portions includes at least a part of a spherical form or a poly-sided pyramid form, and a form where the vertex of a poly-sided pyramid is made flat or arc form.

60. The reflecting sheet according to claim 59, wherein the shape is obtained by heat forming.

61. A reflecting sheet including at least a surface layer portion and an inner layer portion,
wherein the surface layer portion contains at least 0.3 g/m² to 20 g/m² of an inorganic powder and a polyolefin resin (C), the inner layer portion contains a polyolefin resin (A) and at least one kind of resins (B) incompatible with the polyolefin resin (A) at temperatures enabling stretching of the polyolefin resin (A), the surface layer portion meets $(n_1-n_2)/n_2 \geq 0.20$ ($n_1$: refractive index of the inorganic powder, $n_2$: refractive index of the polyolefin resin (C)), and the inner layer portion has voids;
said reflecting sheet has a plurality of concave portions and ridge lines among the concave portions, each of the concave portions has a bottom having a hole portion to expose an emitter, and reflecting surfaces connecting the bottom and the ridge lines, and the reflecting sheet has a plurality of bulge portions on the ridge lines; and
a height of each of the bulge portions ranges from 1/20 to 1/2 a depth of each of the bulge portions.

62. The reflecting sheet according to claim 61, wherein each of the bulge portions is formed of a part of a semi-sphere, a sphere or an elliptic sphere.

63. The reflecting sheet according to claim 61, wherein the bulge portions are provided in positions where the ridge lines intersect one another.

64. A reflecting sheet including at least a surface layer portion and an inner layer portion,
wherein the surface layer portion contains at least 0.3 g/m² to 20 g/m² of an inorganic powder and a polyolefin resin (C), the inner layer portion contains a polyolefin resin (A) and at least one kind of resins (B) incompatible with the polyolefin resin (A) at temperatures enabling stretching of the polyolefin resin (A), the surface layer portion meets $(n_1-n_2)/n_2 \geq 0.20$ ($n_1$: refractive index of the inorganic powder, $n_2$: refractive index of the polyolefin resin (C)), and the inner layer portion has voids;

said reflecting sheet has a plurality of concave portions and ridge lines among the concave portions, each of the concave portions has a bottom having a hole portion to expose an emitter, and reflecting surfaces connecting the bottom and the ridge lines, and the reflecting sheet has a plurality of bulge portions on the ridge lines; and a width of each of the ridge fines ranges from $\frac{1}{100}$ to $\frac{1}{5}$ the maximum width of each of the concave portions.

65. The reflecting sheet according to claim 64, wherein each of the bulge portions is formed of a part of a semi-sphere, a sphere or an elliptic sphere.

66. The reflecting sheet according to claim 64, wherein the bulge portions are provided in positions where the ridge lines intersect one another.

67. A reflecting sheet including at least a surface layer portion and an inner layer portion, wherein the surface layer portion contains at least 0.3 g/m² to 20 g/m² of an inorganic powder and a polyolefin resin (C), the inner layer portion contains a polyolefin resin (A) and at least one kind of resins (B) incompatible with the polyolefin resin (A) at temperatures enabling stretching of the polyolefin resin (A), the surface layer portion meets $(n_1-n_2)/n_2 \geqq 0.20$ ($n_1$: refractive index of the inorganic powder, $n_2$: refractive index of the polyolefin resin (C)), and the inner layer portion has voids;

said reflecting sheet has a plurality of concave portions and ridge lines among the concave portions, each of the concave portions has a bottom having a hole portion to expose an emitter, and reflecting surfaces connecting the bottom and the ridge lines, and the reflecting sheet has a plurality of bulge portions on the ridge lines; and the shape of each of the concave portions is a polygon in a planar view.

68. The reflecting sheet according to claim 67, wherein each of the bulge portions is formed of a part of a semi-sphere, a sphere or an elliptic sphere.

69. The reflecting sheet according to claim 67, wherein the bulge portions are provided in positions where the ridge lines intersect one another.

70. A reflecting sheet including at least a surface layer portion and an inner layer portion, wherein the surface layer portion contains at least 0.3 g/m² to 20 g/m² of an inorganic powder and a polyolefin resin (C), the inner layer portion contains a polyolefin resin (A) and at least one kind of resins (B) incompatible with the polyolefin resin (A) at temperatures enabling stretching of the polyolefin resin (A), the surface layer portion meets $(n_1-n_2)/n_2 \geqq 0.20$ ($n_1$: refractive index of the inorganic powder, $n_2$: refractive index of the polyolefin resin (C)), and the inner layer portion has voids;

said reflecting sheet has a plurality of concave portions and ridge lines among the concave portions, each of the concave portions has a bottom having a hole portion to expose an emitter, and reflecting surfaces connecting the bottom and the ridge lines, and the reflecting sheet has a plurality of bulge portions on the ridge lines; and a shape of each of the concave portions is a rectangle in a planar view, and each of the bulge portions is provided in a position where the ridge lines intersect one another.

71. The reflecting sheet according to claim 70, wherein each of the bulge portions is formed of a part of a semi-sphere, a sphere or an elliptic sphere.

\* \* \* \* \*